US012373466B2

(12) United States Patent
Bai et al.

(10) Patent No.: US 12,373,466 B2
(45) Date of Patent: Jul. 29, 2025

(54) ANOMALY DETECTION THROUGH CLUSTERING OF TIME-SERIES DATA SUBSEQUENCES AND DETERMINATION OF ADAPTIVE THRESHOLDING

(71) Applicant: Splunk Inc., San Francisco, CA (US)

(72) Inventors: Houwu Bai, San Jose, CA (US); Kristal Curtis, San Francisco, CA (US); William Deaderick, Austin, TX (US); Tanner Gilligan, San Bruno, CA (US); Poonam Yadav, San Francisco, CA (US); Om Rajyaguru, San Diego, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/222,863

(22) Filed: Jul. 17, 2023

(65) Prior Publication Data

US 2025/0028737 A1  Jan. 23, 2025

(51) Int. Cl.
  *G06F 16/28* (2019.01)
  *G06F 16/2458* (2019.01)
(52) U.S. Cl.
  CPC ........ *G06F 16/285* (2019.01); *G06F 16/2462* (2019.01); *G06F 16/2477* (2019.01)
(58) Field of Classification Search
  CPC . G06F 16/285; G06F 16/2462; G06F 16/2477
  See application file for complete search history.

(56) References Cited

U.S. PATENT DOCUMENTS

| 7,937,344 B2 | 5/2011 | Baum et al. |
| 8,112,425 B2 | 2/2012 | Baum et al. |
| 8,751,529 B2 | 6/2014 | Zhang et al. |
| 8,788,525 B2 | 7/2014 | Neels et al. |
| 9,215,240 B2 | 12/2015 | Merza et al. |

(Continued)

OTHER PUBLICATIONS

Alam et al, "Adaptable Anomaly Detection in Traffic Flow Time Series", IEEE, pp. 1-9 (Year: 2019).*

(Continued)

*Primary Examiner* — Jared M Bibbee
(74) *Attorney, Agent, or Firm* — Rutan & Tucker, LLP; Kyle M. St. James

(57) ABSTRACT

Computerized methodologies are disclosed that are directed to detecting anomalies within a time-series data set. An aspect of the anomaly detection process includes determining one or more seasonality patterns that correspond to a specific time-series data set by evaluating a set of candidate seasonality patterns (e.g., hourly, daily, weekly, day-start off-sets, etc.). The evaluation of a candidate seasonality pattern may include dividing the time-series data set into a collection of subsequences based on the particular candidate seasonality pattern. Further, the collection of subsequences may be divided into clusters and a silhouette score may be computed to measure the clustering quality of the candidate seasonality pattern. In some instances, the candidate seasonality pattern having the highest silhouette score is selected and utilized in anomaly detection process. In other instances, a plurality of seasonality patterns may be combined forming a time policy, where the time policy is utilized in anomaly detection process.

20 Claims, 31 Drawing Sheets

(56) References Cited

U.S. PATENT DOCUMENTS

| | | | |
|---|---|---|---|
| 9,286,413 | B1 | 3/2016 | Coates et al. |
| 10,127,258 | B2 | 11/2018 | Lamas et al. |
| 2013/0179381 | A1* | 7/2013 | Kawabata ............... G06N 5/02 706/46 |
| 2016/0219067 | A1* | 7/2016 | Han ................... H04L 63/1425 |
| 2019/0098106 | A1 | 3/2019 | Mungel et al. |
| 2021/0294818 | A1 | 9/2021 | Savalle et al. |
| 2022/0218261 | A1* | 7/2022 | Jiang ................... G06F 16/2379 |
| 2023/0367665 | A1* | 11/2023 | Capano ............... G06F 11/3452 |
| 2023/0368069 | A1* | 11/2023 | Xu ....................... G06N 3/045 |
| 2024/0265273 | A1* | 8/2024 | Sun ....................... G06N 5/022 |

OTHER PUBLICATIONS

Bai, K. et al. "Anomaly Detection System and Method for Implementing a Data Regularity Check and Adaptive Thresholding," filed Jul. 17, 2023, U.S. Appl. No. 18/222,870 including its prosecution history.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

Carraso, David, "Exploring Splunk," published by CITO Research, New York, NY, Apr. 2012.

Splunk Cloud 8.0.2004 User Manual, available online, retrieved May 20, 2020 from docs.splunk.com.

Splunk Enterprise 8.0.0 Overview, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

PCT/US2024/038419 filed Jul. 17, 2024, International Search Report and Written Opinion dated Oct. 22, 2024.

* cited by examiner

TIME-SERIES DATA SET : A. WILLIAMS LOG INS [10/6/20 12:00:00 - 8:00:00]

| | | |
|---|---|---|
| 10/6/20 - 12:04:16 | 10/6/20 - 2:59:57 | 10/6/20 - 5:17:17 |
| 10/6/20 - 12:05:50 | 10/6/20 - 3:10:10 | 10/6/20 - 5:37:21 |
| 10/6/20 - 12:45:32 | 10/6/20 - 3:12:14 | 10/6/20 - 5:40:40 |
| 10/6/20 - 12:58:16 | 10/6/20 - 3:27:09 | 10/6/20 - 6:01:21 |
| 10/6/20 - 1:31:17 | 10/6/20 - 3:41:12 | 10/6/20 - 6:11:11 |
| 10/6/20 - 1:34:01 | 10/6/20 - 3:44:41 | 10/6/20 - 6:37:18 |
| 10/6/20 - 1:39:16 | 10/6/20 - 3:51:27 | 10/6/20 - 7:15:21 |
| 10/6/20 - 1:57:01 | 10/6/20 - 3:59:51 | 10/6/20 - 7:15:32 |
| 10/6/20 - 2:16:09 | 10/6/20 - 4:15:07 | 10/6/20 - 7:31:47 |
| 10/6/20 - 2:41:07 | 10/6/20 - 4:27:19 | 10/6/20 - 7:50:16 |
| 10/6/20 - 2:45:16 | 10/6/20 - 4:41:27 | 10/6/20 - 7:51:34 |
| 10/6/20 - 2:51:16 | 10/6/20 - 4:59:01 | 10/6/20 - 7:59:09 |

AGGREGATE COUNT TIME-SERIES DATA SET [30 MIN INTERVALS]

| | |
|---|---|
| 12:00:00 - 12:30:00 = 12:30:00, 2 | 5:00:00 - 5:30:00 = 5:30:00, 1 |
| 12:30:01 - 01:00:00 = 1:00:00, 2 | 5:30:00 - 6:00:00 = 6:00:00, 2 |
| 1:00:01 - 1:30:00 = 1:30:00, 0 | 6:00:00 - 6:30:00 = 6:30:00, 2 |
| 1:30:01 - 2:00:00 = 2:00:00, 4 | 6:30:00 - 7:00:00 = 7:00:00, 1 |
| 2:00:01 - 2:30:00 = 2:30:00, 1 | 7:00:00 - 7:30:00 = 7:30:00, 2 |
| 2:30:01 - 3:00:00 = 3:00:00, 4 | 7:30:00 - 8:00:00 = 8:00:00, 4 |
| 3:00:01 - 3:30:00 = 3:30:00, 3 | |
| 3:30:01 - 4:00:00 = 4:00:00, 4 | |
| 4:00:01 - 4:30:00 = 4:30:00, 2 | |
| 4:30:01 - 5:00:00 = 5:00:00, 2 | |

*FIG. 4B*

ANOMALY DETECTION THROUGH CLUSTERING OF TIME-SERIES DATA SUBSEQUENCES AND DETERMINATION OF ADAPTIVE THRESHOLDING

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it. Although the availability of vastly greater amounts of diverse data on diverse data systems provides opportunities to derive new insights, it also gives rise to technical challenges to search and analyze the data in a performant way.

One example of such data may be referred to as time-series data that is recorded in chronological order where each data point comprising the time-series data is associated with a specific timestamp. Time-series data may be machine-generated data, such as logs, metrics, events, and other types of data from various sources in various industries such as information technology (IT) operations, cybersecurity, finance, and more. Some technology platforms, such as that provided by Splunk Inc., enables searching, visualizing, and analyzing time-series data to understand server performance, identify patterns, troubleshoot issues, or track trends over time.

BRIEF DESCRIPTION OF THE DRAWINGS

Illustrative examples are described in detail below with reference to the following figures:

FIG. 4B illustrates a first table listing an example time-series data set and a second table listing an example aggregated time-series data set derived from the time-series data set of the first table where the aggregation process is implemented by the anomaly detection subsystem of FIGS. 1A-1C according to some examples;

DETAILED DESCRIPTION

Figure 1A:
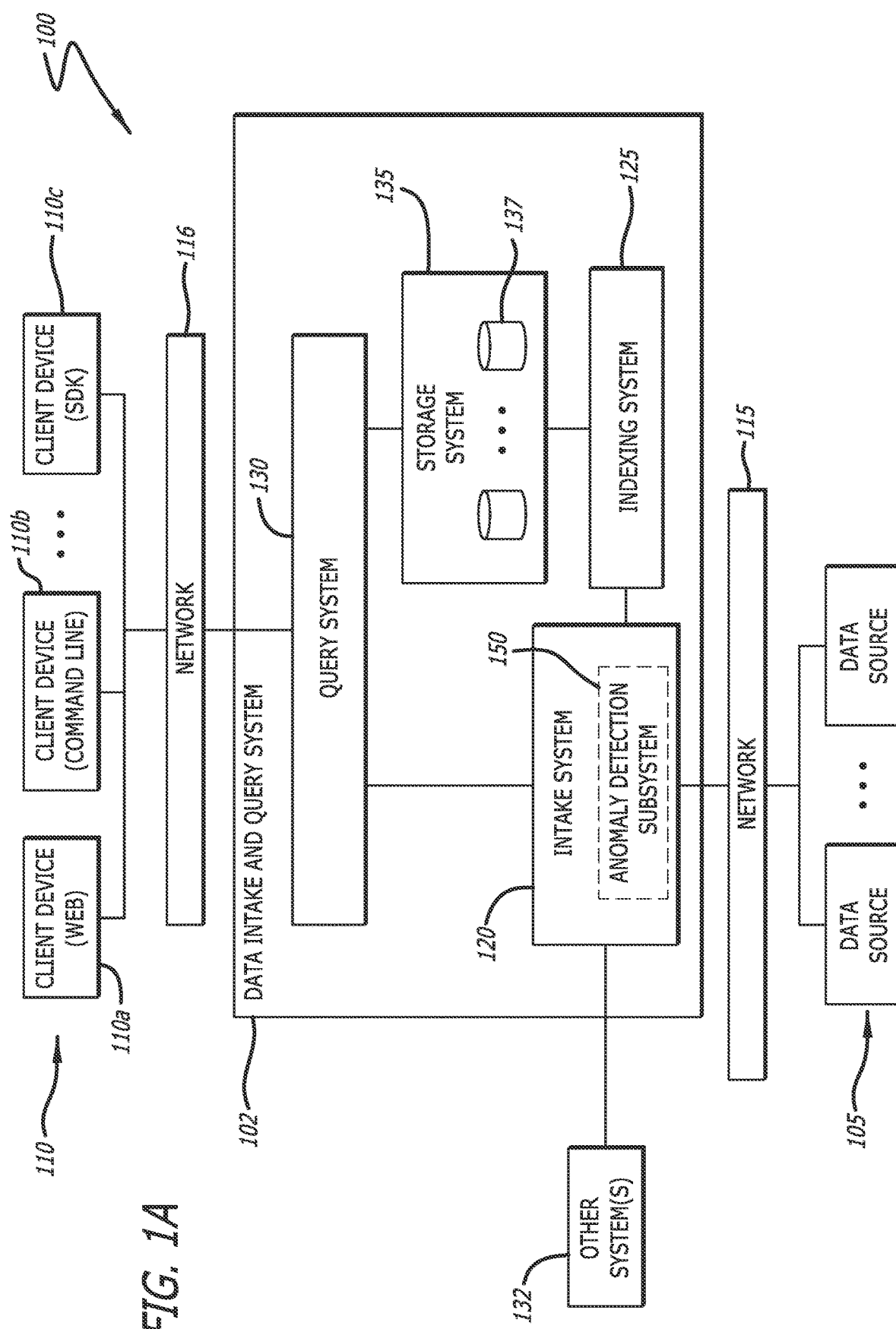
FIG. 1A is a block diagram illustrating an embodiment of a data processing environment including a data intake and query system including an anomaly detection subsystem according to some examples.

As noted above, storing massive quantities of minimally processed or unprocessed data ("raw data") for later retrieval and analysis is becoming increasingly more feasible as storage capacity becomes more inexpensive and plentiful with one example of such data being referred to as time-series data. Further, some technology platforms, such as that provided by Splunk Inc., enables searching, visualizing, and analyzing time-series data to understand server performance, identify patterns, troubleshoot issues, or track trends over time.

As the ability to collect and store massive quantities of raw data, and especially time-series data, has improved, it has become increasingly important to closely monitor the operability and health of deployed data systems. Currently, network administrators or other viewers struggle with monitoring such data to determine performance of a system or an individual metric, such as a key performance indicator (KPI). In an attempt to automate the monitoring of time-series data, system administrators often establish rules for automatically generating alerts, such as when certain data values exceed a particular threshold. However, such primitive monitoring may lead to an overwhelming number of alerts, a minimal number of alerts that fail to highlight particular events within the time-series data as well as numerous false positives or false negatives.

Stated differently, system administrators often struggle with the detection of anomalies within time-series data. An anomaly may be an unexpected value for a particular data point, where expectations of the value of a data point may be based on the normal historical behavior of similar data points, which may be based on parameters pertaining to the collection of the data point such as sourcetype, time of day, day of week, etc.

To further increase the difficulty of anomaly detection, the parameters pertaining to the collection of time-series data may vary greatly across time-series data sets, where these parameters may collectively form a "seasonality pattern" (and where a plurality of seasonality patterns may be combined to form a "time-policy") such that detected anomalies within time-series data may be highly dependent on the seasonality pattern of the time-series data. In some examples, a seasonality pattern may define a set of parameters corresponding to values of data points comprising the time-series data set indicating an expected pattern of the values of the data points.

More broadly, a seasonality pattern may refer to a recurring and predictable pattern that occurs at regular intervals within a given time-series data set and represents a systematic variation in the data that repeats over specific time periods, such as, for example, hourly, daily, weekly, monthly, or yearly cycles. Seasonality can be observed in various industries, including sales data, weather data, economic indicators, and many others. Seasonality patterns often exhibit consistent and predictable fluctuations, influenced by factors like holidays, seasons, working days, or other recurring events. These patterns can have a significant impact on the overall behavior of the times-series data set and need to be considered when analyzing and forecasting the data.

The presence of seasonality can affect data analysis and modeling approaches. It is essential to identify and understand the seasonality pattern to properly interpret the data and make accurate predictions and detect anomalies. Some techniques for determining seasonality in time-series analysis include calculating an autocorrelation function (ACF) and partial autocorrelation function (PCF), computing a moving average of the time-series data set, and applying statistical tests such as the Seasonal Decomposition of Time Series or the Seasonal-Trend decomposition using LOESS (STL) test.

By understanding and accounting for seasonality, analysts and data scientists can gain insights into the regular patterns and make more accurate predictions or decisions based on the time-series data. However, the detection of seasonality within a time-series data set often proves complex, is computationally-expensive, and is resource intensive.

Disclosed herein is a system implemented in a technology environment and computerized methodologies performed by the system on ingested data, specifically time-series data, resulting in detection of anomalous data points within the time-series data. More specifically, a first novel methodology includes performing an anomaly detection process on a time-series data set by first analyzing the time-series data set to determine the regularity of the data points of the time-series data set and determining whether a data aggregation process is to be performed based on the regularity of the data points. Determining the regularity of the data points may involve analyzing the time intervals between neighboring data points to determine whether at least a predetermined percentage of time intervals represents a single, repeating time interval. The data aggregation process may involve performing a statistical function (e.g., count, average, median, etc.) on a subset of data points representing a particular time block. For instance, a statistical function may be applied on all data points occurring within 30 minute time blocks. The data aggregation process generates a time-series data set comprised of data points that occur at regular intervals, which improves anomaly detection.

A second novel methodology includes determination of a seasonality pattern that corresponds to a specific time-series data set by determining a set of candidate seasonality patterns (e.g., hourly, daily, weekly, day-start off-sets, etc.) and, for each candidate seasonality pattern, dividing the time-series data set into a collection of subsequences based on a particular seasonality pattern. Further, the collection of subsequences are divided into clusters, a silhouette score is computed to measure the clustering quality of each candidate seasonality pattern, and the candidate seasonality pattern having the highest silhouette score is selected.

Additionally, the silhouette score for the selected seasonality pattern may be compared to a threshold score to determine whether the selected seasonality pattern sufficiently tracks the time-series data set enabling accurate generation of upper and/or lower thresholds that represent historically normal behavior (e.g., normal behavior being defined as values adhering to the upper and/or lower thresholds such as being below an upper threshold and above a lower threshold). For instance, some time-series data sets may include data points that occur so randomly that a seasonality pattern does not fit the time-series data set. As a result, e.g., when the silhouette score does not satisfy the threshold comparison, a set of heuristics may be utilized in anomaly detection.

However, when the silhouette score does satisfy the threshold comparison, the selected seasonality pattern may be utilized in anomaly detection. More specifically, a third novel method includes generation of upper and/or lower thresholds that represent historically normal behavior, which may be referred to as an anomaly band (e.g., data points lying outside of the band are considered anomalous). As noted above, when determining a silhouette score for a seasonality pattern candidate, the time-series data set is divided into a collection of subsequences. After selection of a candidate seasonality pattern, its corresponding collection of subsequences may be further divided into segments (smaller blocks of time). Additionally, neighboring segments may be combined based on the mean and standard deviation of the values of the data points within each segment. For each segment or set of combined segments, an anomaly band is determined with the upper band set to (mean+multiplier*standard deviation) and the lower band set to (mean-multiplier*standard deviation). As noted above, data points of the time-series data set that lie outside of the anomaly band are considered anomalous.

Overview of Technology Environment

Referring to FIG. 1A, a block diagram illustrating an embodiment of a data processing environment 100 including a data intake and query system 102 including an anomaly detection subsystem 150 is shown. The data processing environment 100 features one or more data sources 105 (generically referred to as "data source(s)") and client devices 110a, 110b, 110c (generically referred to as "client device(s) 110") in communication with the data intake and query system 102 via networks 115 and 116, respectively. The networks 115, 116 may correspond to portions the same network or may correspond to different networks. Further, the networks 115, 116 may be implemented as private and/or public networks, one or more LANs, WANs, BLUETOOTH®, cellular networks, intranetworks, and/or internetworks using any of wired, wireless, terrestrial microwave, satellite links, etc., and may include the internet.

Each data source 105 broadly represents a distinct source of data that can be consumed by the data intake and query system 102. The data source(s) 105 may be positioned within the same geographic area or within different geographic areas such as different regions of a public cloud network. Examples of a data source 105 may include, without limitation or restriction, components or services that provide data files, directories of files, data sent over a network, event logs, registries, streaming data, etc. Herein, according to one embodiment of the disclosure, the data source(s) 105 provide streaming data (also referred to as a "data stream") to an intake system 120 via the network 115, where the data stream may be time-series data and be processed by the anomaly detection subsystem 150. According to one embodiment of the disclosure, the receipt of the time-series data by the intake system 120 may actuate (initiate or begin) operations of the anomaly detection subsystem 150 to conduct perform one or more methodologies or sub-methodologies including a data regularity check process, a data aggregation process, a seasonality pattern detection process, and/or an anomaly detection process.

The client device(s) 110 can be implemented using one or more computing devices in communication with the data intake and query system 102 and represent some of the different ways in which computing devices can submit queries to the data intake and query system 102. For example, a first client device 110a may be configured to communicate with the data intake and query system 102 over the network 116 via an internet (web) portal. In contrast, a second client device 110b may be configured to communicate with the data intake and query system 102 via a command line interface while a third client device 110c may be configured to communicate with the data intake and query system 102 via a software developer kit (SDK). As illustrated, the client device(s) 110 can communicate with and submit queries to the data intake and query system 102 in accordance with a plurality of different communication schemes. Sometimes, the queries can be used to actuate operations of the anomaly detection subsystem 150 as well.

The data intake and query system 102 may be configured to process and store data received from the data source(s) 105 and execute queries on the data in response to requests received from the client device(s) 110, perhaps requests as to detecting data drift. In the illustrated embodiment, the data intake and query system 102 includes the intake system 120, an indexing system 125, a query system 130, and/or a storage system 135 including one or more data stores 137. The data intake and query system 102 may include systems, subsystems, and components, other than the systems 120, 125, 130, 135 described herein.

As mentioned, the data intake and query system 102 may be configured to receive or subsequently consume (ingest) data from different sources 105. In some cases, various data sources 105 may be associated with one or more indexes, hosts, sources, sourcetypes, or users. The data intake and query system 102 may be configured to concurrently receive and process the data from data sources 105.

Figure 1B:
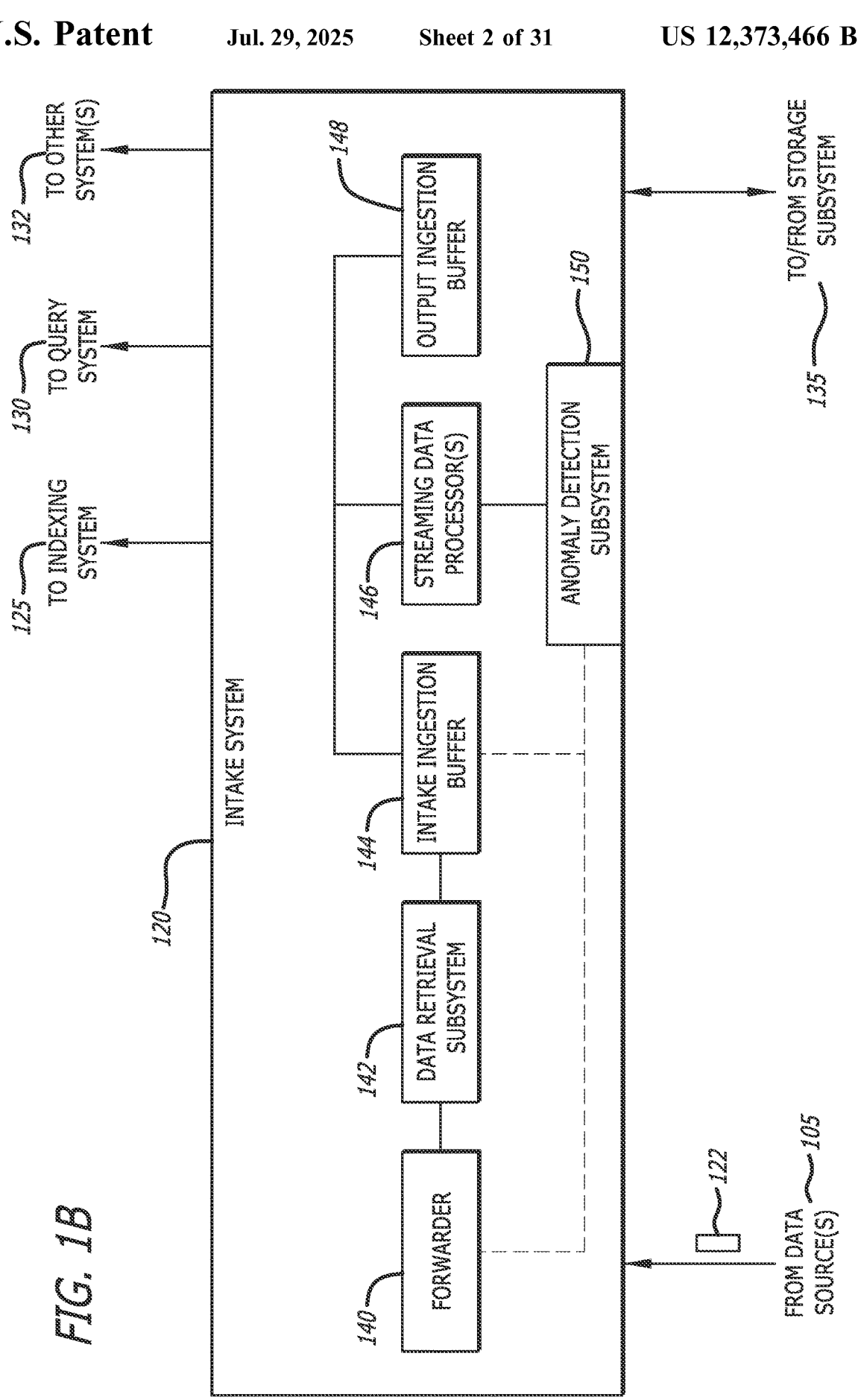
FIG. 1B is a block diagram illustrating an embodiment of the operational flow of information between subsystems within the intake system of the data intake and query system of FIG. 1A, including the anomaly detection subsystem according to some examples.

As will be described in greater detail herein, as illustrated in FIG. 1B, the intake system 120 may be configured to (i) receive data from the data source(s) 105, (ii) perform one or more preliminary processing operations on the data, and/or (iii) communicate the data to the indexing system 125, the query system 130, or other systems 132 (which may include, for example, data processing systems, telemetry systems, real-time analytics systems, data stores, databases, etc., any of which may be operated by an operator of the data intake and query system 102 or a third party).

In particular, the intake system 120 may be configured to receive data 122 from the data source(s) 105 in a variety of formats or structures. In some embodiments, the received data 122 may correspond to streaming data as raw machine data, structured or unstructured data, correlation data, data files, directories of files, data sent over a network, event logs, sensor data, image and/or video data, etc. The intake system 120 can process the data 122 based on the form in which it is received. In some cases, the intake system 120 can utilize one or more rules to process the data 122 and to make the processed data available to downstream systems (e.g., the indexing system 125, query system 130, etc.).

Illustratively, the intake system 120 can enrich the received data 122. For example, the intake system 120 may add one or more fields to the data 122 received from the data sources 105, such as fields denoting the host, source, source-type, or index associated with the incoming data. In certain embodiments, the intake system 120 can perform additional processing on the data 122, such as transforming structured data into unstructured data (or vice versa), identifying timestamps associated with the data, removing extraneous data, parsing data, indexing data, separating data, categorizing data, routing data based on criteria relating to the data being routed, and/or performing other data transformations, etc. As described herein, the intake system 120 can perform seasonality pattern detection and detect anomalies based on the detected seasonality pattern as described below.

The intake system 120 features one or more streaming data processors 146 for processing, where the streaming data processor(s) 146 can be configured in operate in accordance with one or more rules to transform data and republish the data to one or both of an intake ingestion buffer 144 and an output ingestion buffer 148. In particular, the intake system 120 can function to conduct preliminary processing of data ingested at the data intake and query system 102. As such, the intake system 120 illustratively includes a forwarder 140 that obtains data from one of the data source(s) 105, parses the data in accordance with one or more rules (e.g., data extraction rule(s), TA(s), etc.), and transmits the data to a data retrieval subsystem 142. The data retrieval subsystem 142 may be configured to convert or otherwise format data provided by the forwarder 140 into an appropriate format for inclusion at an intake ingestion buffer 144 and transmit the data to the intake ingestion buffer 144 for further processing.

Thereafter, the streaming data processor(s) 146 may obtain data from the intake ingestion buffer 144, process the data, and republish the data to either the intake ingestion buffer 144 (e.g., for additional processing) or to the output ingestion buffer 148, such that the data is made available to downstream components or systems such as the indexing system 125, query system 130 or other systems 132. In this manner, the intake system 120 may repeatedly or iteratively process data according to one or more rules, such as extraction rules (e.g., regex rules that may involve parsing) for example, where the data is formatted for use on the data intake and query system 102 or any other system. As discussed below, the intake system 120 may be configured to conduct such processing rapidly (e.g., in "real-time" with little or no perceptible delay), while ensuring resiliency of the data.

Additionally, as shown in FIG. 1B, the anomaly detection subsystem 150 is configured to operate in concert with the streaming data processor(s) 146 to analyze ingested time-series data to detect a seasonality pattern that fits the variability in a time-series data set (e.g., time-series data over a given time period), determine an anomaly band in accordance with the seasonality pattern, and detect one or more anomalies within the time-series data set. In addition, prior to the detection of a seasonality pattern fitting the time-series data, the anomaly detection subsystem 150 may assess the regularity of the time-series data set, e.g., to determine whether the time-series data set includes regularly occurring data points, which otherwise may be stated as determining whether the time-series data set is comprised of data points occurring at regular intervals within a tolerance of some missing data points. In instances the regularity of the time-series data set does not meet a predefined threshold, e.g., greater than or equal to a percentage of the data points comprising the time-series data set do not occur at a regular interval. In such instances, the anomaly detection subsystem 150 may perform a data aggregation process resulting in a new time-series data set based on an aggregation of data points comprising the ingested data. Each of these processes will be discussed in detail below.

Figure 1C:
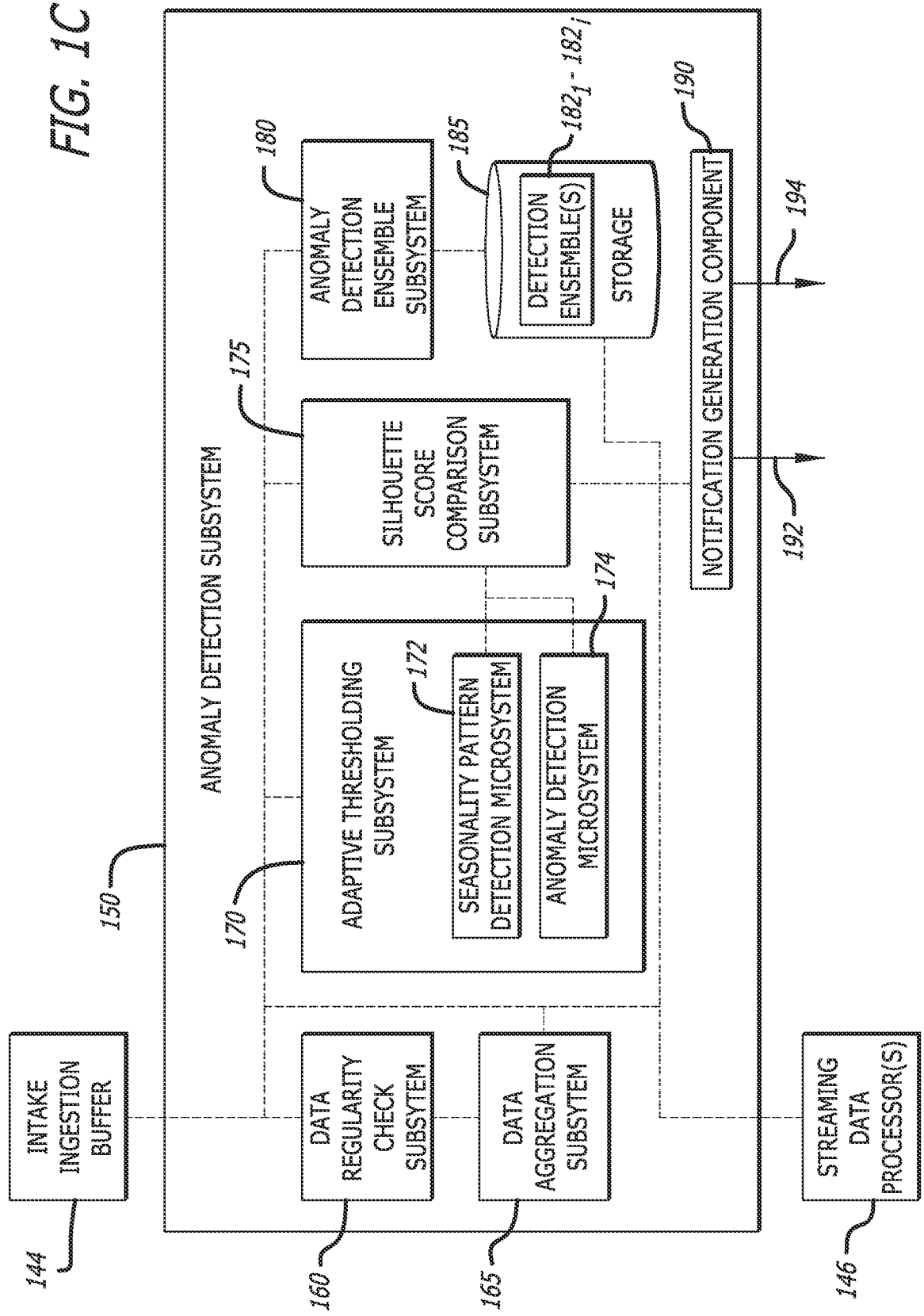
FIG. 1C is a block diagram illustrating an embodiment of the components forming the anomaly detection subsystem deployed within the intake system of FIG. 1B according to some examples.

Referring now to FIG. 1C, a block diagram illustrating an embodiment of components forming the anomaly detection subsystem 150 deployed within the intake system 120 of FIG. 1B is shown according to some examples. The anomaly detection subsystem 150 includes a logic such as a data regularity check subsystem 160, a data aggregation subsystem 165, an adaptive thresholding subsystem 170 that includes a seasonality pattern detection microsystem 172 and an anomaly detection microsystem 174, a silhouette score comparison subsystem 175, an anomaly detection ensemble subsystem, and a notification generation component 190. The anomaly detection subsystem 150 also includes a storage 185 configured to store at least one or more detection ensembles $182_1$-$182_i$ that may include heuristics and/or machine learning models that are configured to be processed or executed by the anomaly detection ensemble subsystem 180 in connection with one or more processors.

The anomaly detection subsystem 150 features logic that may, in some examples or implementations, be divided into subsystems or microsystems such that certain tasks or operations may be encapsulated into a particular module. For instance, the anomaly detection subsystem 150 may include a data regularity check subsystem 160 configured to receive time-series data or a time-series data set from the intake ingestion buffer 144 and perform a data regularity check process. Details as to the data regularity check process are discussed at least with respect to FIGS. 2-3. When the data regularity check process results in a determination that a data aggregation process, the time-series data set is provided to a data aggregation subsystem 165 that is configured to perform a data aggregation process, the details of which are described at least with respect to FIGS. 2-4.

The anomaly detection subsystem 150 may also feature an adaptive thresholding subsystem 170 that is configured to receive a time-series data set (or time-series data) and perform at least a seasonality pattern detection process, which may be performed by a seasonality pattern detection microsystem 172. A silhouette score may be computed by the seasonality pattern detection microsystem 172 and provided to the silhouette score comparison subset system 175, which is configured to compare the silhouette score of a seasonality pattern to a threshold. The silhouette score may be computed as follows:

For a data point o in a set D, the silhouette score s of the data point o is defined as:

$$s = (b - a)/\max(b, a)$$

where:
- a is defined as the average distance between o and all other data points in the same cluster to which o belongs;
- b is defined as the minimum, with respect to clusters, of the average distance between o and points in a cluster to which o does not belong;

The value of the silhouette score s is between −1 and 1. When s is positive, it can be re-written as: s=1−a/b. As s approaches 1, the cluster containing o is compact and is far away from other clusters. When s is negative, the silhouette score indicates that o is closer to data points of other clusters than to that of the same cluster of o, which indicates that the quality of the clustering is low. In some examples, to measure the overall clustering quality, the mean or median of the silhouette scores of data points in the set D may be used.

Based on the threshold comparison, an anomaly detection process is performed on the time-series data set. In one example when the silhouette score satisfies the threshold comparison (e.g., the silhouette score is greater than or equal to the threshold), an anomaly detection microsystem 174 of the adaptive thresholding subsystem 170 is configured to perform a first anomaly detection process by determining an anomaly band based on the seasonality pattern and detecting data points of the time-series data set that lie outside of the anomaly band. Detail as to the anomaly detection process performed by the anomaly detection microsystem is discussed below at least with respect to FIGS. 2, 3 and 5-12D. In other examples, when the silhouette score does not satisfy the threshold comparison, a second anomaly detection process is performed by the anomaly detection ensemble subsystem 180, which may include application of a set of heuristics to the time-series data set. A set of heuristics may be referred to as a "detection ensemble," and a plurality of detection ensembles $182_1$-$182_i$ (collectively or individually, "a detection ensemble 182") may be stored in the storage 185. The anomaly detection ensemble subsystem 180 may retrieve a detection ensemble 182, where, in some instances, selection of a detection ensemble may be dependent on the time-series data set (e.g., the fields comprising the time-series data set), the source from which the time-series data set was obtained, the field/metric of the time-series data set on which the anomaly detection process is being performed, etc.

Following performance of an anomaly detection process, the results may be stored in the storage 185 and/or provided to a system administrator or other user via the notification generation component 190. The results may be an alert message 194 such as a text message, email, etc., and/or a graphical user interface 192.

Operational Flow of Anomaly Detection Process

Figure 2:
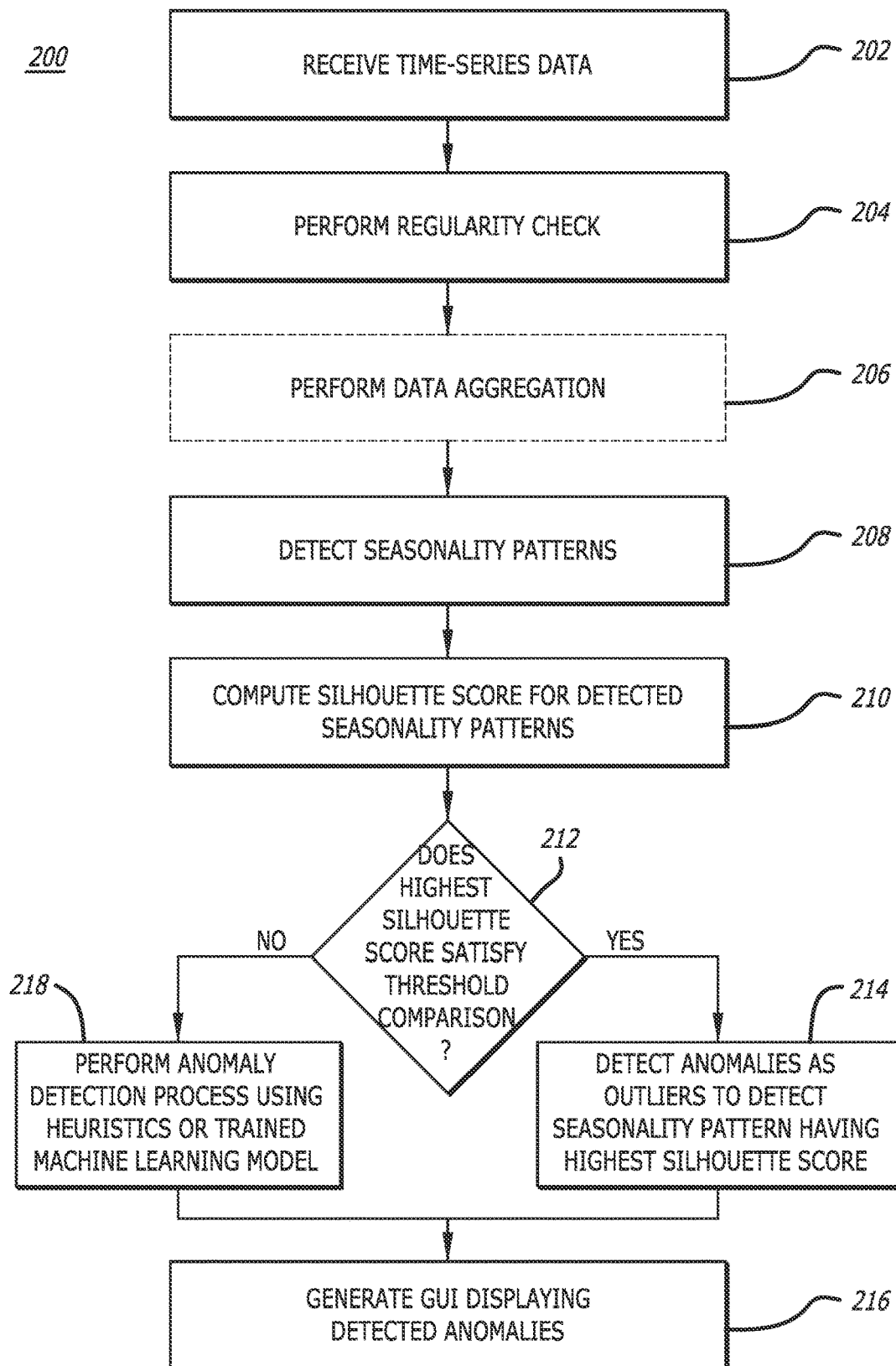
FIG. 2 is a flow diagram illustrating an embodiment of an anomaly detection process implemented by the anomaly detection subsystem of FIGS. 1A-1C according to some examples.

Referring to FIG. 2, a flow diagram illustrating an embodiment of an anomaly detection process implemented by the anomaly detection subsystem of FIGS. 1A-1C is shown according to some examples. FIG. 2 illustrates an example process 200 for detecting anomalies within a time-series data set including a data regularity check, optionally a data aggregation subprocess, and a seasonality pattern detection process. The example process 200 may be implemented, for example, by a computing device that comprises one or more processors and non-transitory computer-readable medium. The non-transitory computer readable medium may store instructions that, when executed by the processor(s), cause the processor(s) to perform the operations of the illustrated process 200.

Each block illustrated in FIG. 2 represents an operation of the process 200. It should be understood that not every operation illustrated in FIG. 2 is required. In fact, certain operations may be optional to complete aspects of the method 200. The method 200 begins with an operation of obtaining time-series data, namely a time-series data set, which includes time-series data over a given time period (block 202). Once the time-series data set is obtained, a data regularity check is performed (block 204). Details as to the data regularity check are discussed further with respect to at least FIG. 3.

Based on the result of the data regularity check, an optional data aggregation process may be performed (block 206). The data aggregation is detailed below at least with respect to FIGS. 4A-4B. Briefly, the data aggregation process includes operations of applying a statistical function to partitioned intervals of the time-series data (e.g., a count function, a determination of one of mean, median, or mode, etc.), which results in a new, aggregated time series data set having data points that occur at regular intervals.

When the data regularity check results in a determination that the percentage of data points occurring at a regular interval satisfies a predetermined threshold, a seasonality pattern detection subprocess is performed (block 208). As discussed below, in one example, the seasonality pattern detection subprocess performs operations that include the partition of the time-series data set into one or more sets of subsequences, where each set of subsequences represents a candidate seasonality pattern. For a given set of subsequences, the subsequences are divided into two or more clusters. A silhouette score is then computed for each subsequence such that a mean, median, or mode of all subsequences within the given set of subsequences may be used as the silhouette score of the set of subsequences (block 210). The silhouette score of the set of subsequences represents a quality of the clustering of the set of subsequences. A high silhouette score indicates that the given set of subsequences is a good seasonality pattern candidate. As an example, a first set of subsequences may refer to daily subsequences, e.g., the time-series data set is divided into subsequences of 24 hour blocks, and a second set of subsequences may refer to half-day subsequences, e.g., the time-series data set is divided into subsequences of 12 hour blocks. Additional detail regarding the use of silhouette scoring to determine a seasonality pattern is discussed below at least with respect to FIGS. 5 and 9-10B.

Referring to the set of subsequences having the highest silhouette score, the silhouette score is compared to a threshold (block 212). When the silhouette score satisfies the threshold comparison, the seasonality pattern represented by the set of subsequences is utilized in an anomaly detection process (block 214). As discussed in further detail below at least with respect to FIGS. 8 and 11-12D, the anomaly detection process may include determination of an anomaly band based on the detected seasonality pattern and detection of anomalies based on the data points that lie outside of the anomaly band (e.g., outliers or outlying data points). Following the anomaly detection process, a graphical user interface (GUI) is generated and displayed (rendered) that illustrates any detected anomalies (block 216). As shown in FIG. 6B, the GUI may illustrate a preview of the time-series data set, the time-series data set with the anomalous data points emphasized or highlighted (e.g., varying color, larger/smaller size, outlined, bold, etc.), and/or a textual representation such as the listing of anomalous data points.

When the silhouette score does not satisfy the threshold comparison, one or more heuristics are utilized in performing an anomaly detection process (block 218). Following the anomaly detection process utilizing one or more heuristics, the same GUI may be generated and displayed (rendered) that illustrates any detected anomalies (block 216). In some examples, the GUI may indicate which anomaly detection methodology was utilized; however, such is not necessary.

Figure 3:
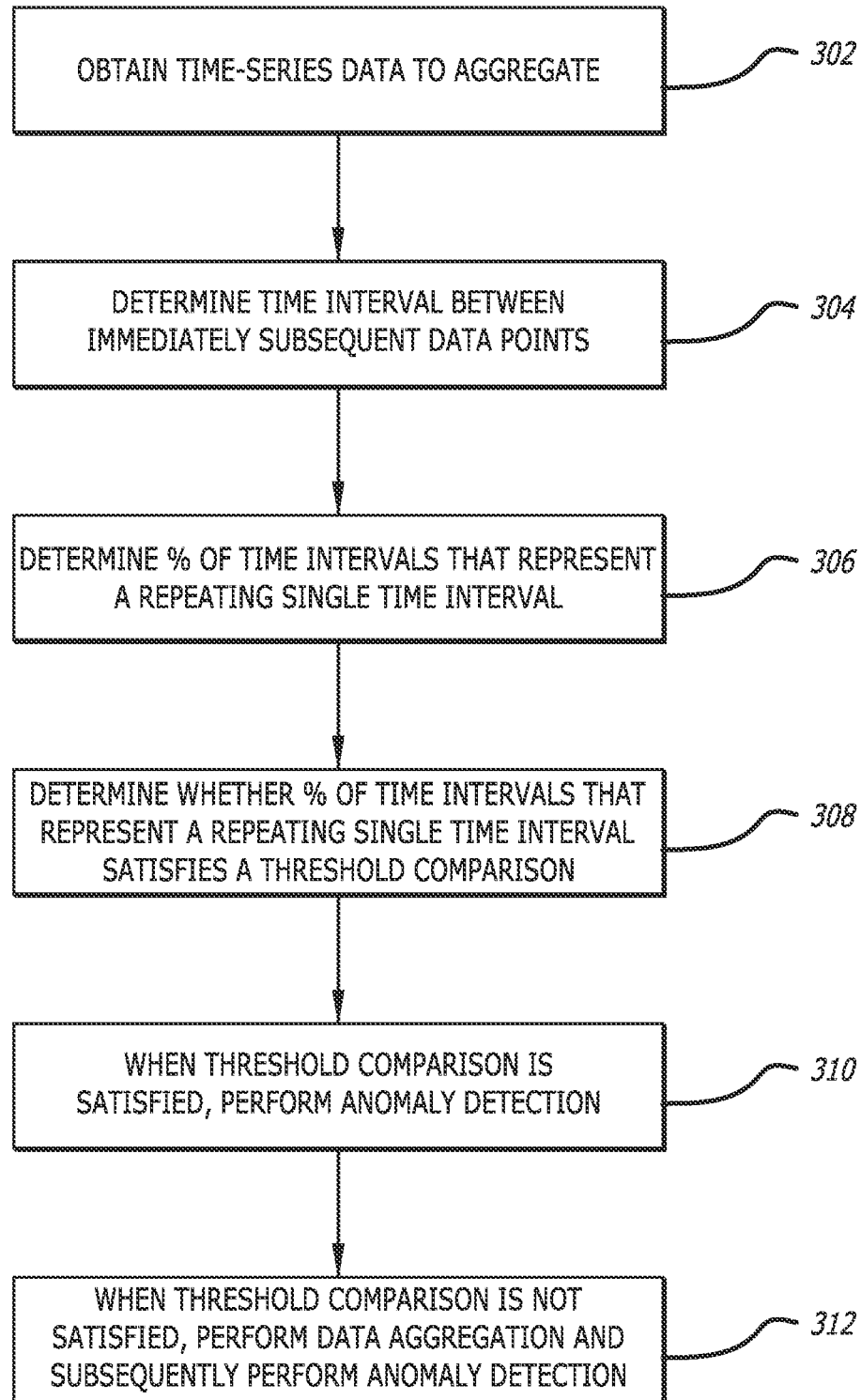
FIG. 3 is a flow diagram illustrating an embodiment of a data regularity check process implemented by the anomaly detection subsystem of FIGS. 1A-1C according to some examples.

Referring to FIG. 3, a flow diagram illustrating an embodiment of a data regularity check process implemented by the anomaly detection subsystem of FIGS. 1A-1C is shown according to some examples. FIG. 3 illustrates an example process 300 for determining whether a threshold level of data points comprising a time-series data set occur at a regular interval. The example process 300 may be implemented, for example, by a computing device that comprises one or more processors and non-transitory computer-readable medium. The non-transitory computer readable medium may store instructions that, when executed by the processor(s), cause the processor(s) to perform the operations of the illustrated process 300.

Each block illustrated in FIG. 3 represents an operation of the process 300. It should be understood that not every operation illustrated in FIG. 3 is required. In fact, certain operations may be optional to complete aspects of the method 300. The method 300 begins with an operation of obtaining time-series data, namely a time-series data set, which includes time-series data over a given time period (block 302). Once the time-series data set is obtained, the time interval between each neighboring point is determined and recorded, where neighboring points refer to consecutive points based on a timestamp of each data point (block 304).

Next, the percentage of time intervals that represent a regular (singular and repeating) time interval is determined and the percentage is compared to a predetermined threshold (blocks 306, 308). When the threshold is satisfied, an anomaly detection may be performed on the time-series data set (block 310). However, when the threshold comparison is not satisfied, a data aggregation process may be performed (block 313), where detail as to the operations of data aggregation process is discussed below with respect to at least FIG. 4A.

Figure 4A:
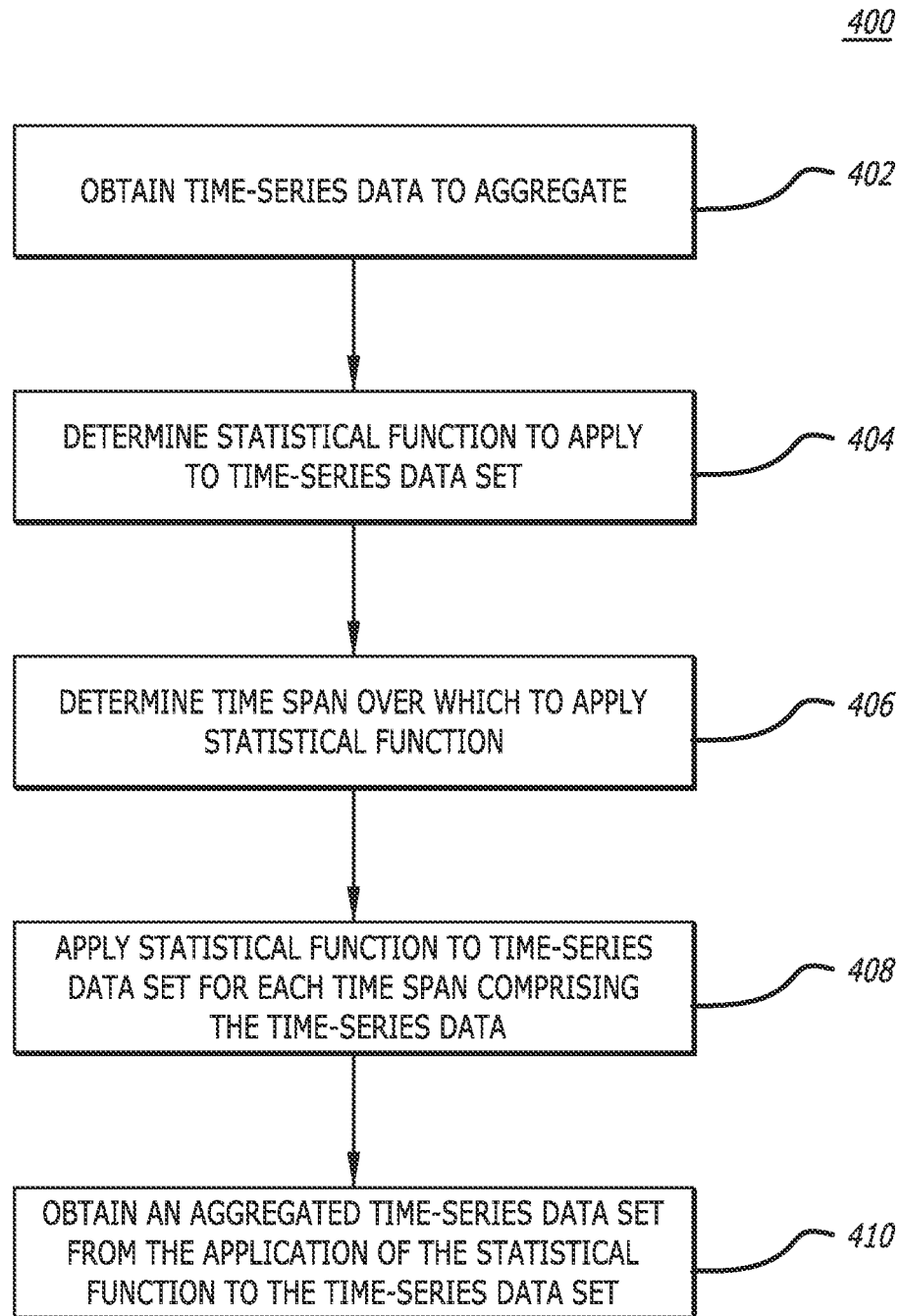
FIG. 4A is a flow diagram illustrating an embodiment of a data aggregation process implemented by the anomaly detection subsystem of FIGS. 1A-1C according to some examples.

FIG. 4A is a flow diagram illustrating an embodiment of a data aggregation process implemented by the anomaly detection subsystem of FIGS. 1A-1C is shown according to some examples. FIG. 4A illustrates an example process 400 for aggregating data points comprising a time-series data set creating a new time-series data set having data points that occur at a regular interval. The example process 400 may be implemented, for example, by a computing device that comprises one or more processors and non-transitory computer-readable medium. The non-transitory computer readable medium may store instructions that, when executed by the processor(s), cause the processor(s) to perform the operations of the illustrated process 400.

Each block illustrated in FIG. 4A represents an operation of the process 400. It should be understood that not every operation illustrated in FIG. 4A is required. In fact, certain operations may be optional to complete aspects of the method 400. The method 400 begins with an operation of obtaining time-series data, namely a time-series data set, which includes time-series data over a given time period (block 402). Additionally, a statistical function to apply to the time-series data set is determined or obtained (block 404). In some embodiments, the statistical function may be determined via user input, e.g., as seen in FIG. 6B, which illustrates "count" as the statistical function to be applied. In other instances, the anomaly detection subsystem 150 may analyze the time-series data set and automatically select a statistical function, e.g., using or more rule sets or heuristics. Examples of statistical functions that may include, but are not limited or restricted to, count, distinct count, estimated distinct count, average, sum, maximum, minimum, variance (a measure of the spread of values within a data set), etc.

In addition to determining or obtaining the statistical function to be applied to the time-series data set, a time interval is similarly determined or obtained (block 406). The time interval may be determined or obtained in the same manner as the statistical function. For example, the time interval may be determined via user input, e.g., as seen in FIG. 6B, which illustrates a "30 m" (30 minute) time interval to be utilized, where the term "bucket span" refers to a time interval. The options provided and/or available in the drop-down pertaining to bucket span (e.g., drop 622) may be filtered intelligently according to the time-series data set. In particular, only time intervals over which less than a predetermined number of data would result, e.g., bucket spans where less than 50,000 points would result. For example, taking into account a time-series data set that includes data points for a two-month period, a bucket span of 1 minute would result in approximately 87,600 data points and thus not be provided as an option. Instead, a 5 minute bucket span may be suggested while additional, longer bucket spans may be provided as options.

In some implementations, one or more various time intervals may be provided to the user via the GUI for selection such that the options satisfy certain criteria. The criteria may include, (1) at least 10 data points exist after aggregation, (2) no more than 50,000 data points exist after aggregation, and (3) no more than a predetermined percentage (e.g., X %, where X may be 5, 10, 15, etc.) of the data was "filled" through aggregation (e.g. if data having a 1-minute resolution is aggregated to a 1-second resolution, the aggregation process is "filling" 59/60 values).

Once the time series-data set, the statistical function to be applied, and the time interval to be utilized have been obtained and/or determined, the statistical function is applied to the time-series data set according to the time-interval resulting in a new "aggregated" time-series data set (block 410). A detailed example as to the generation of an aggregated time-series data set is illustrated in FIG. 4B and follows the operations discussed with respect to FIG. 4A.

FIG. 4B illustrates a first table listing an example time-series data set and a second table listing an example aggregated time-series data set derived from the time-series data set of the first table where the aggregation process is implemented by the anomaly detection subsystem of FIGS. 1A-1C according to some examples. FIG. 4B illustrates two tables: table 420 being a listing of an example time-series data set and table 430 being a listing of an example aggregated time-series data set derived from the time-series data set of the first table. It should be noted that the listings set forth in tables 420, 430 are merely for illustrative purposes and do not include the numerous fields that other time-series data sets typically include. It should be understood that the aggregation process described herein with respect to the listings within tables 420, 430 is applicable to other time-series data sets having a greater number of fields.

Table 420 provides a listing of data points having fields [date, time] within the time-series data set for Oct. 6, 2020 from 12:00:00-08:00:00 (see reference number 421). The listing of data points is spread across three columns 422a-422c, where each data point may represent an event occurring at that time, e.g., log-ins to a computing device by A. Williams. In some examples, the time-series data set of table 420 may be obtained by the intake system 120 for analysis by the anomaly detection subsystem 150. As described above with respect to FIG. 2, a data regularity check may be performed on the time-series data set of table 420 resulting in an indication that an aggregation process is to be performed.

Briefly recalling the data regularity check and taking data points within box 424 as an example subset, the data regularity check may include determining the time interval between neighboring points. As can be seen from the example subset of data points within box 424, the data points do not occur at a regular time interval. As a result, the data regularity check may conclude that an aggregation process is to be performed on the time-series data set of table 420 to generate a new, aggregated time-series data set that is comprising of (or in instances, consists of) data points occurring at a regular interval.

FIG. 4B illustrates the use of the "count" function as the statistical function and a 30 minute time interval, which includes determining a count of data points occurring within each 30 minute time interval, e.g., 12:00:00-12:29:59, 12:30:00-12:59:59, etc. As shown in the table 430, the new aggregated time-series data set includes 16 data points spread across two columns 432a, 432b. Each data point within the table 430 has the fields [timestamp, count]. Thus, the new, aggregated time-series data set provided in the table 430 includes data points occurring at a regular interval of 30 minutes. The aggregation process is an important pre-process step in the anomaly detection process as performed on a time-series data set, especially when the detection of anomalies is performed based on a detected seasonality pattern for the time-series data set. Specifically, when the time-series data set is comprised of at least a threshold number of points that do not occur at a regular interval (e.g., data points occur at varying intervals with respect to neighbors points and/or there are numerous missing points in what would otherwise be a set of data points occurring at a regular interval but for the missing points).

Figure 5:
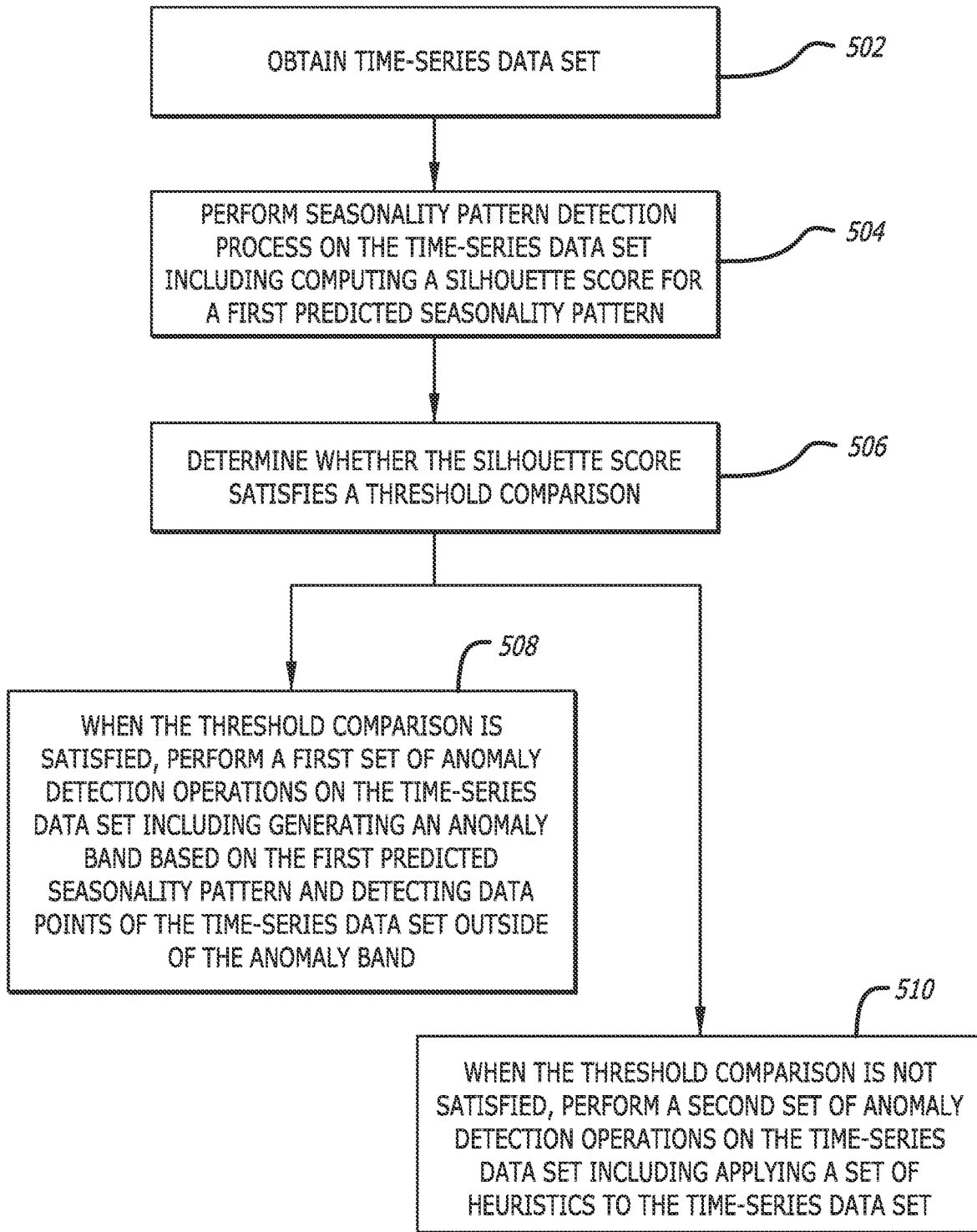
FIG. 5 is a flow diagram illustrating an embodiment of a sample deployment of the anomaly detection subsystem of FIGS. 1A-1C according to some examples.

FIG. 5 is a flowchart illustrating an example process 500 illustrating an embodiment of a sample deployment of the anomaly detection subsystem of FIGS. 1A-1C is shown according to some examples. The example process 500 can be implemented, for example, by a computing device that comprises a processor and a non-transitory computer-readable medium. The non-transitory computer readable medium can be storing instructions that, when executed by the processor, can cause the processor to perform the operations of the illustrated process 500. Alternatively or additionally, the process 500 can be implemented using a non-transitory computer-readable medium storing instructions that, when executed by one or more processors, case the one or more processors to perform the operations of the process 500 of FIG. 5.

Each block illustrated in FIG. 5 represents an operation of the process 500. It should be understood that not every operation illustrated in FIG. 5 is required. In fact, certain operations may be optional to complete aspects of the method 500. The method 500 begins with an operation of obtaining a time-series data set (block 502). Obtaining the time-series data set may include performing a search query as discussed above based on user input, such as through execution of a pipelined search query received as user input to a graphical user interface (GUI), e.g., as discussed below and illustrated with respect to FIGS. 6A-6D.

The method 500 continues with performing a seasonality pattern detection process on the time-series data set to detect a corresponding seasonality pattern (block 504). In some examples, a set of seasonality patterns have been predefined and the seasonality pattern detection process includes (i) treating a predefined seasonality pattern as a candidate for dividing the time-series data set into a collection of subsequences, (ii) dividing the collection of subsequences into clusters, and (iii) computing a silhouette score of the clustering, which represents a quality of the clustering. Thus, one novel aspect of the inventive concepts discussed herein is the treatment of seasonality pattern detection as a clustering problem and using the silhouette score of a clustering to select the seasonality pattern that corresponds to the time-series data set. More specifically, a silhouette score may be computed for each of a plurality of predefined seasonality patterns such that the seasonality pattern having the highest silhouette may be selected as the corresponding seasonality pattern.

Once a seasonality pattern has been selected for the time-series data set (a first predefined seasonality pattern) and a silhouette score has been computed for the first predefined seasonality pattern, the silhouette score is compared to a threshold (block 506). For example, a determination may be made as to whether the silhouette score satisfies a threshold comparison, e.g., is greater than or equal to a threshold, is greater than, or is less than depending on the threshold. When the silhouette score satisfies the threshold comparison, a first set of anomaly detection operations is performed on the time-series data set including generating an anomaly band based on the seasonality pattern and detecting data points of the time-series data set that are outside of the anomaly band (block 508). However, when the silhouette score does not satisfy the threshold comparison, a second set of anomaly operations is performed on the time-series data set that includes applying a set of heuristics to the time-series data set (block 510).

Additional aspects of the method 500 may include, prior to obtaining the time-series data set, performing a data regularity check that includes operations of: (i) determining a time interval between subsequent data points of the time-series data set, (ii) determining a percentage of the time intervals that represent a single, repeating time interval, and (iii) determining whether the percentage satisfies a threshold comparison. In response to determining that the percentage does not satisfy the threshold comparison, performing a data aggregation process including operations of: (i) determining a statistical function to apply to the time-series data set, (ii) determining a time interval over which to apply the statistical function, (iii) aggregating blocks of data points of the time-series data set by applying the statistical function to the blocks of data points, wherein a first block of data points corresponds to data points of the time-series data set within a first time block that has a length of time equal to the time interval. Further, computing the silhouette score for the detected seasonality pattern may include (i) computing a silhouette score for data points comprising the time-series data set, and (ii) determining a mean or a medium of the silhouette scores for the data points.

In some instances, the data points comprising the time-series data set are clustered using a machine learning technique, and wherein computing a silhouette score for a first data point of the data points comprising the time-series data set includes: determining, for each cluster, an average distance between the first data point and data points belonging to clusters to which the first data point does not belong, and dividing (a) a difference between (i) a minimum of the average distances between the first data point and the data points belonging to the clusters to which the first data point does not belong, and (ii) an average distance between the first data point and the other data points belonging to the cluster to which the first data point does belong, by (b) a maximum of (i) the minimum of the average distances between the first data point and the data points belonging to the clusters to which the first data point does not belong, and (ii) the average distance between the first data point and the other data points belonging to the cluster to which the first data point does belong. In some examples, the anomaly band includes an upper threshold and a lower threshold relative to the time-series data set. In some examples, the time-series data set includes time-series data over a defined time period.

Example Graphical User Interfaces Facilitating the Anomaly Detection Process

FIGS. 6A-6D illustrate a graphical user interface (GUI) configured to receive user input pertaining an anomaly detection process implemented by the anomaly detection subsystem of FIGS. 1A-1C and provide graphical results thereof is shown according to some examples. The GUI 600 may be generated and configured for display on the display screen of various network devices such as computer (e.g., desktop monitor, laptop, etc.), a tablet and/or a mobile device (e.g., cellular device). In particular, logic (e.g., software code) may be generated that, when executed by one or more processors, results in the display of GUI 600. For example, logic may be provided in a programming language such as JAVASCRIPT® or PYTHON®, among others. The base amount of logic may result in display of certain display boxes such as display boxes 602, 608, and 614 as well as user interface elements included therein. Upon receipt of user input, the logic may be executed specifically in view of the user input (e.g., as input or as a parameter to execution thereof) resulting in generation of specific display elements or text (e.g., indicator 612 and, in some embodiments, options within the dropdown 616). Thus, the GUI 600 is configured to update automatically based on execution of logic in view of user input.

Figure 6A:
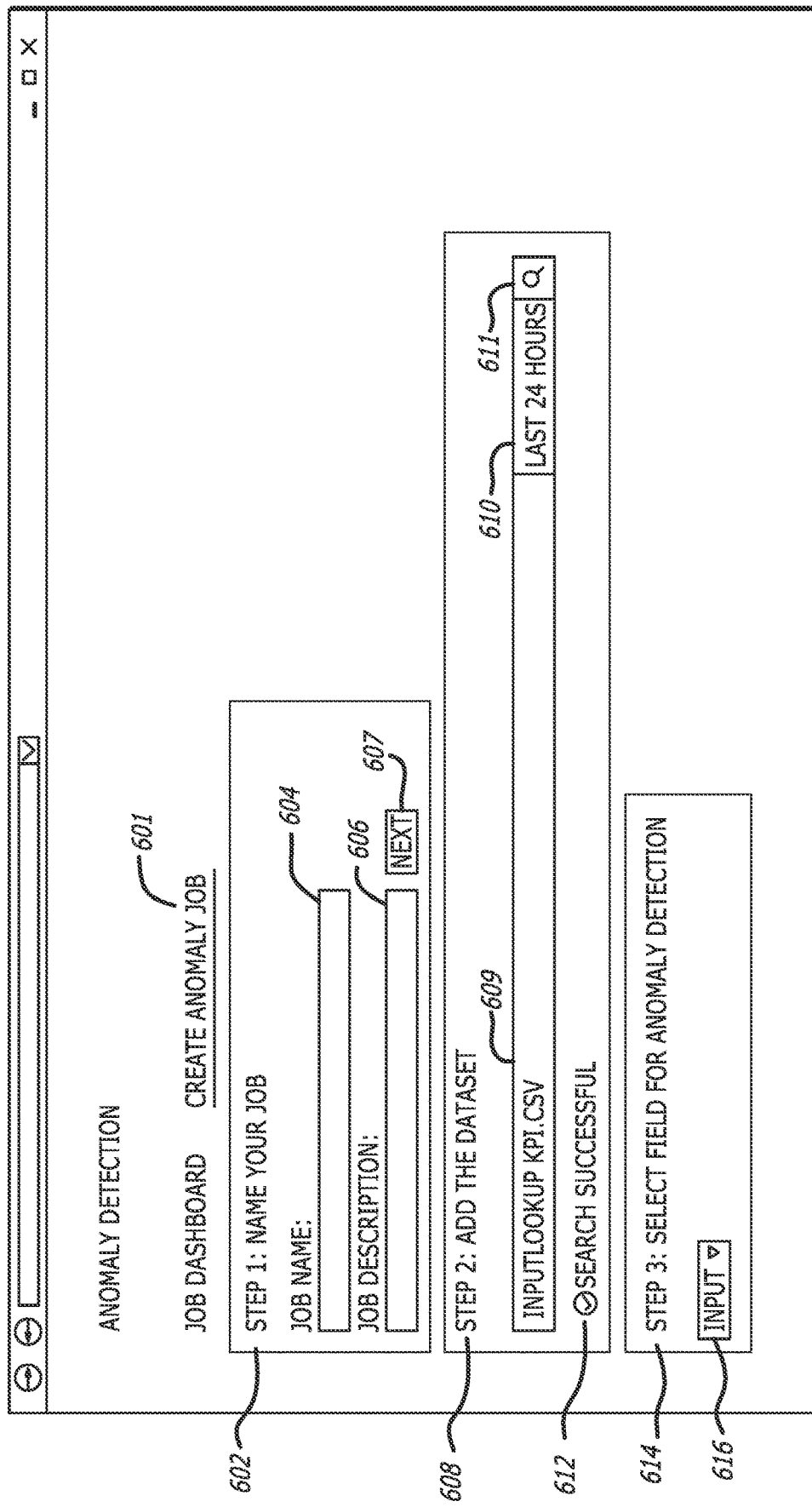
FIGS. 6A-6D illustrate a graphical user interface (GUI) configured to receive user input pertaining an anomaly detection process implemented by the anomaly detection subsystem of FIGS. 1A-1C and provide graphical results thereof according to some examples.
Figure 6B:
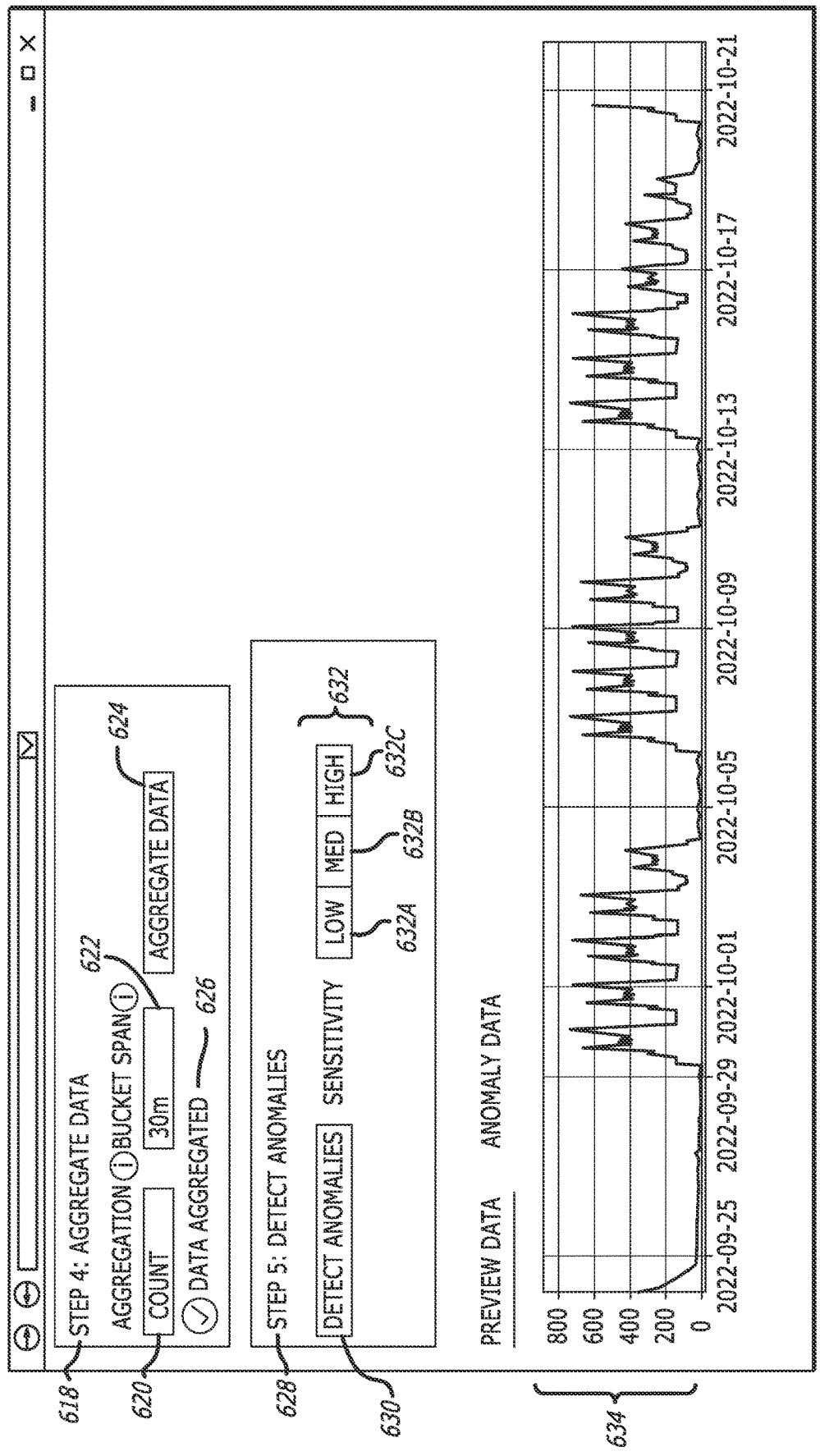

With reference now to FIG. 6A, the execution of such logic may result in the display of certain display screens such as the "Create Anomaly Job" 601 display screen and display elements such as the display box 602 ("Step 1: Name Your Job") that includes user interface elements 604, 606 (text boxes configured to receive user input), and button 607 ("Next"), display box 608 ("Step 2: Add the Dataset") that includes the user elements 609, 610, 611 (text box, dropdown, and search button respectively) as well as indicator 612 (indicating whether a search query performed using the text of the text box 609 within the time period selected via dropdown 610 was successful), and display box 614 ("Step 3: Select Field for Anomaly Detection") that includes a dropdown 616 configured to receive user input indication selection of a field of the dataset obtained through the search query performed using the text (e.g., a search query or a pipelined search query) of textbox 609.

As discussed above with respect to FIG. 1C, the anomaly detection subsystem 150 includes several logic modules or components (although such may be formatted as a single logic module). As shown in FIG. 1C and described with respect thereto, intake ingestion buffer 144 may obtain a time-series data set and provide such to the data regularity check subsystem, where display elements of display boxes 602, 608 may correspond to performing a search query by the data intake and query system 102 resulting in provision of a particular time-series data set to the anomaly detection subsystem 150.

Referring again to FIG. 6A, following retrieval of the time-series data set identified by user input at text box 609 over the time period identified by user input at dropdown 610, the anomaly detection subsystem 150 may identify fields of the time-series data set, where such fields are provided for user selection via the dropdown 616 (within display box 614). The parsing of the time-series data set to identify fields present therein may be performed by one or more of the logic modules of FIG. 1B and/or the data regularity check subsystem 160 and/or the adaptive threshold subsystem 170.

With reference now to FIG. 6B, the execution of such logic may result in the display of additional display boxes such as the display box 618 ("Step 4: Aggregate Data") that includes user interface elements 620, 622 (dropdowns 620, 622), button 624 ("Aggregate data"), and indicator 626 (indicating whether a data aggregation procedure performed on the data obtained in Step 2 applying the statistical function selected via dropdown 620 over the bucket span selected via dropdown 622 was successful), and display box 628 ("Step 5: Detect Anomalies") that includes the button 630 (initiate or begin an anomaly detection process) and user elements 632 (selection of a sensitivity for the anomaly detection being low 632a, medium 632b, or high 632c). Adjusting the sensitivity results in an adjustment of the anomaly band (discussed below) and an adjustment in the number of data points categorized as anomalous. For instance, a selection of high sensitivity typically results in a greater number of data points categorized as anomalous than a selection of medium sensitivity. Thresholds of different severity levels may be heuristically, empirically, and configurably derived from the anomaly boundary. For example, the anomaly boundary corresponding to the variation range of history normal behavior (discussed below) can be marked as the threshold of severity level "normal" (medium). Based on the anomalies identified by the anomaly boundary, the threshold that separates the top-N anomalies from other anomalies can be labeled as the threshold of severity level "critical" (high), where $N \geq 1$. Additionally, among the anomalies identified by the anomaly boundary, those anomalies that are just marginally beyond the anomaly boundary can be used to derive the threshold of severity level "low."

FIG. 6B also illustrates that the GUI 600 may display at least a subset of the time-series data set 634, e.g., under a "Preview Data" tab. In instances in which data aggregation is performed, the time-series data set 634 that is displayed may correspond to either the originally obtained time-series data set (e.g., to provide a user a visual display of the variance in the selected data) or the new, aggregated time-series data set.

More specifically, as described with respect to at least FIGS. 2-4B, the time-series data set obtained as a result of the performance of the search query identified by user input at textbox 609, a data aggregation process may be performed following a data regularity check. The data regularity check may be performed automatically by the data regularity check subsystem 160 upon receipt of the time-series data set by the anomaly detection subsystem 150 and operate in accordance with FIG. 3. When the data regularity check indicates that data aggregation is to be performed, the time-series data set is provided to the data aggregation subsystem 165, which operates in accordance with FIG. 4A. In particular, the data aggregation procedure may obtain certain parameters from user input via user elements of display box 618. Additionally, the anomaly detection process is discussed throughout the specification and at least with respect to FIGS. 2, 3, and 8-12D.

Figure 6C:
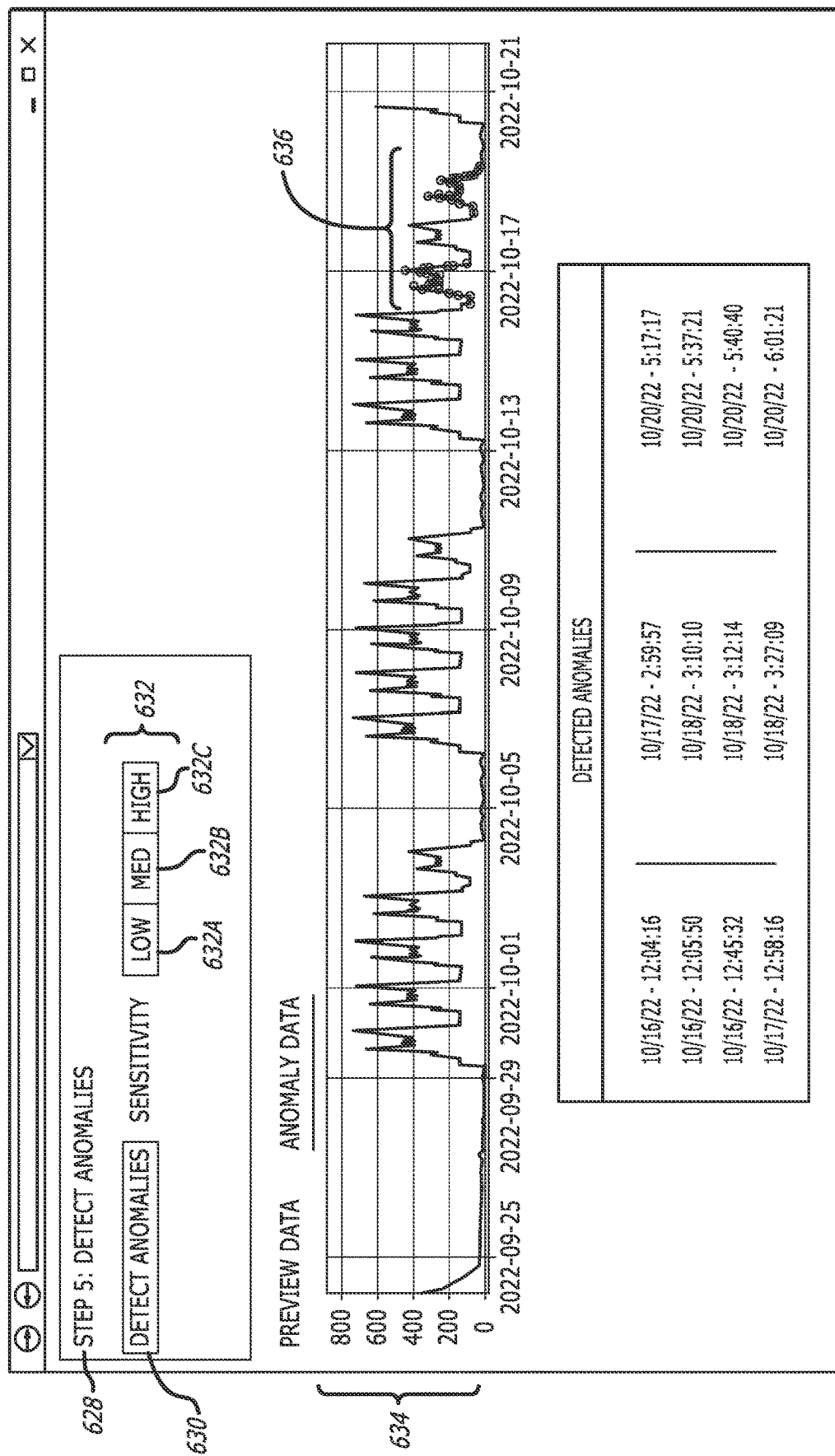
Figure 6D:
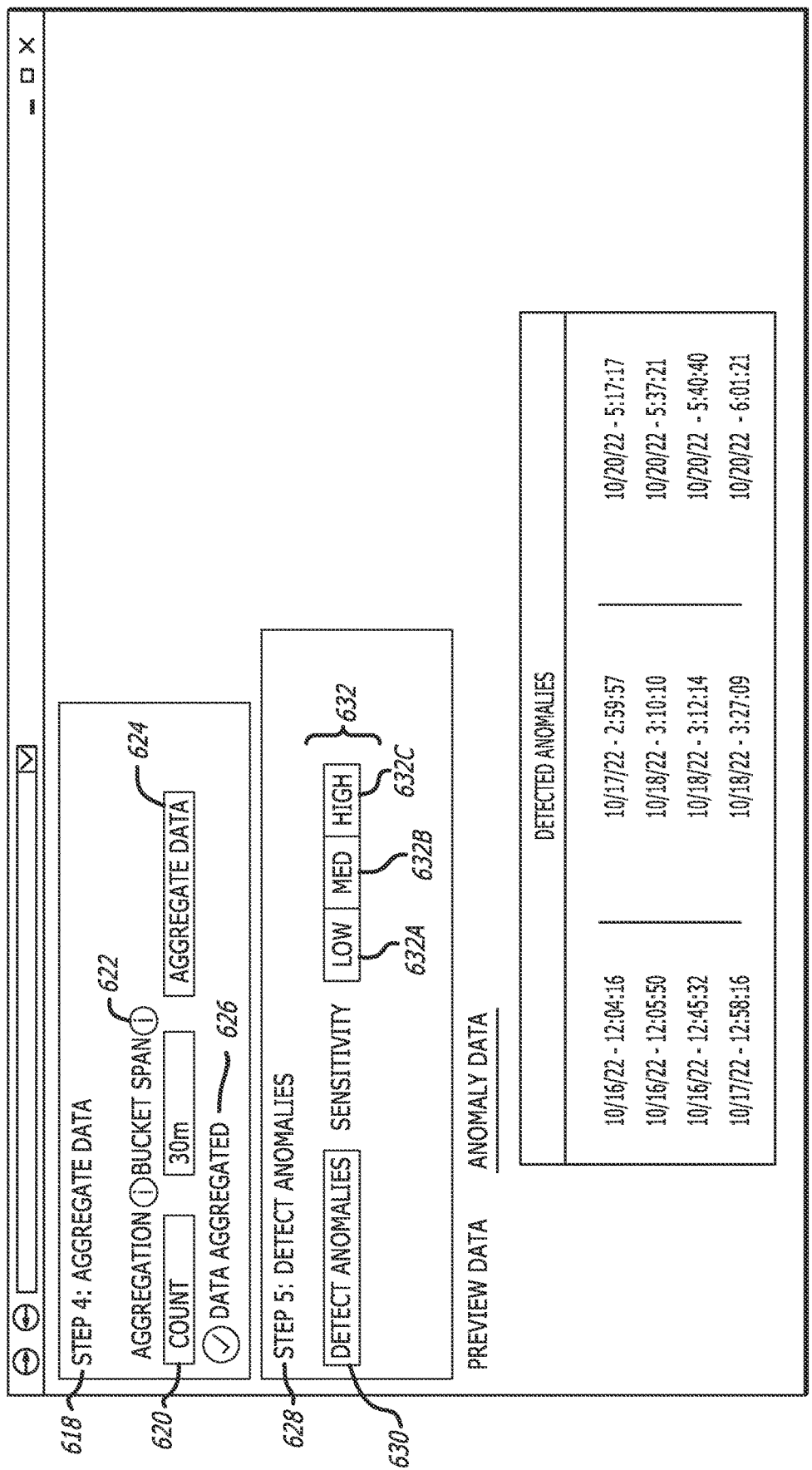

Referring now to FIGS. 6C-D, the GUI 600 displays a preview of the time-series data set (preview 634) in FIG. 6C while FIG. 6D illustrates detected anomalies 636 following the anomaly detection process. Additionally, data points of the time-series data set 634 that were identified as the anomalies 636 may be provided in a textual listing, wherein fields of the data points may be provided (FIG. 6D). As shown in FIG. 6D, fields such as a date and time of the detected anomalous data points may be provided. In addition, other fields may be displayed. Thus, the GUI 600 provides a practical tool that enables anomaly detection within a time-series data set. A system administrator or other use may monitor the operations and status of multiple (tens, hundreds, thousands, etc.) network devices (computing devices, computing components, sensors, etc.) through machine-learning techniques (e.g., at least the clustering process within the anomaly detection process as discussed herein) through the GUI 600. By providing specific input to select a particular time-series data set, the anomaly detection subsystem 150 may perform a data regularity check, a data aggregation process if needed, an anomaly detection process, and display the results via graphical representation or textual listing.

Figure 7:
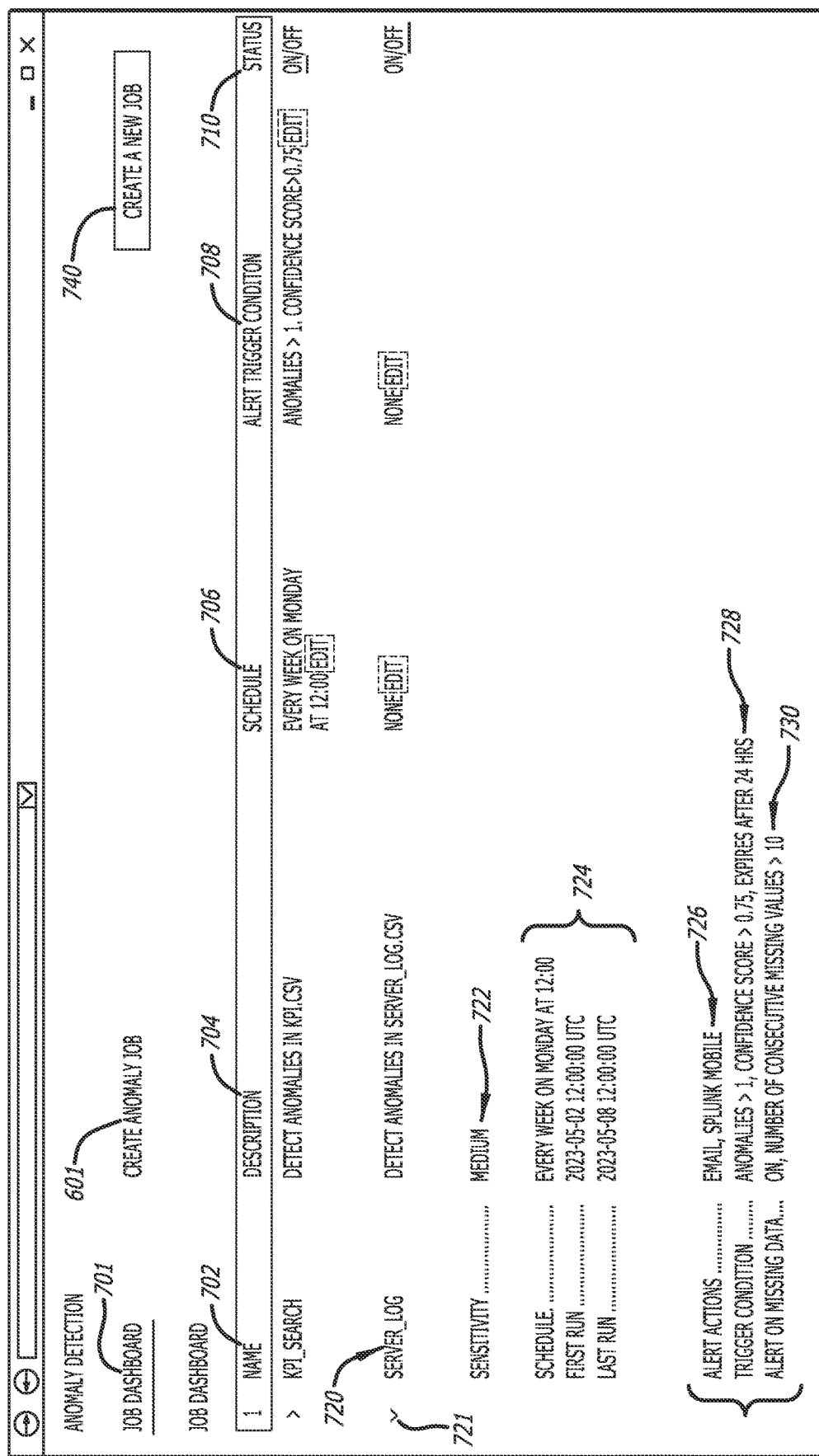
FIG. 7 illustrates a graphical user interface (GUI) configured to display identifying data and meta data corresponding to anomaly detection instances ("jobs") and receive user input pertaining to edits to one or more anomaly detection jobs according to some examples.

FIG. 7 illustrates a graphical user interface (GUI) configured to display identifying data and meta data corresponding to anomaly detection instances ("jobs") and receive user input pertaining to edits to one or more anomaly detection jobs is shown according to some examples. The execution of logic resulting in the generation of the GUI 600 may alternatively result in the generation of the GUI 700, which provides a "Jobs Dashboard," e.g., a listing or other visual representation of anomaly detection processes that have either been executed and/or are scheduled to be executed (e.g., scheduled for a future execution and/or a reoccurring execution).

The GUI 700 displays an alternative display screen as that displayed by the GUI 600 of FIGS. 6A-6D. Specifically, the GUI 700 includes the display screen "Job Dashboard" 701, which may comprise a listing of anomaly detection tasks ("jobs") that have run and/or are scheduled to be run (executed). The listing may be displayed as a table having a set of rows and columns, where the rows represent a job and the columns represent fields (e.g., parameters or metadata of a job). The columns may include fields such as: name 702; description 704; schedule 706; alert trigger condition 708; status 710; etc. As an explanation of one example job, the job 720 has been displayed (unhidden) via user interface element 721 to show additional metadata and parameters. For instance, the name 702 of the job 720 may be "server_log" having a description 704 of "detect anomalies in server_log.csv." The job 720 may not be a reoccurring job and thus not have a schedule 706 (contrast to the job named "KPI_search" above) and not have an alert trigger condition, which may indicate that the results of the anomaly detection are logged in storage or displayed on a GUI but no explicit alert is provided to a system administrator. Additionally, the status may be set to "off" as the job 720 is not currently set as a reoccurring job. Additional parameters of the job 720 include a sensitivity level 722, a breakdown of past runs and future runs, if applicable (724), as well as a listing of actions taken on satisfaction of an alert trigger condition, the alert trigger condition(s), and alerts to be provided on missing data, if applicable (726, 728, 730 respectively).

Advantages of the GUI 700 include the ability for a system administrator or other user to see a listing of all anomaly detection jobs is a single location, view high-level components of a job (name, description, schedule, alert trigger condition, status, etc.) and view numerous additional parameters of each job following selection of an option to uncover such. Further, the GUI 700 illustrates the ability to directly edit the parameters of a job directly from the listing provided by GUI 700, e.g., per the "edit" icons, whereby selection thereof may provide a redirect to a new/separate webpage and/or a generation of a pop-up. Finally, the GUI 700 enables a system administrator to quickly add a new job via button 740, selection of which enables a user to populate a new row in the listing.

Figure 8:
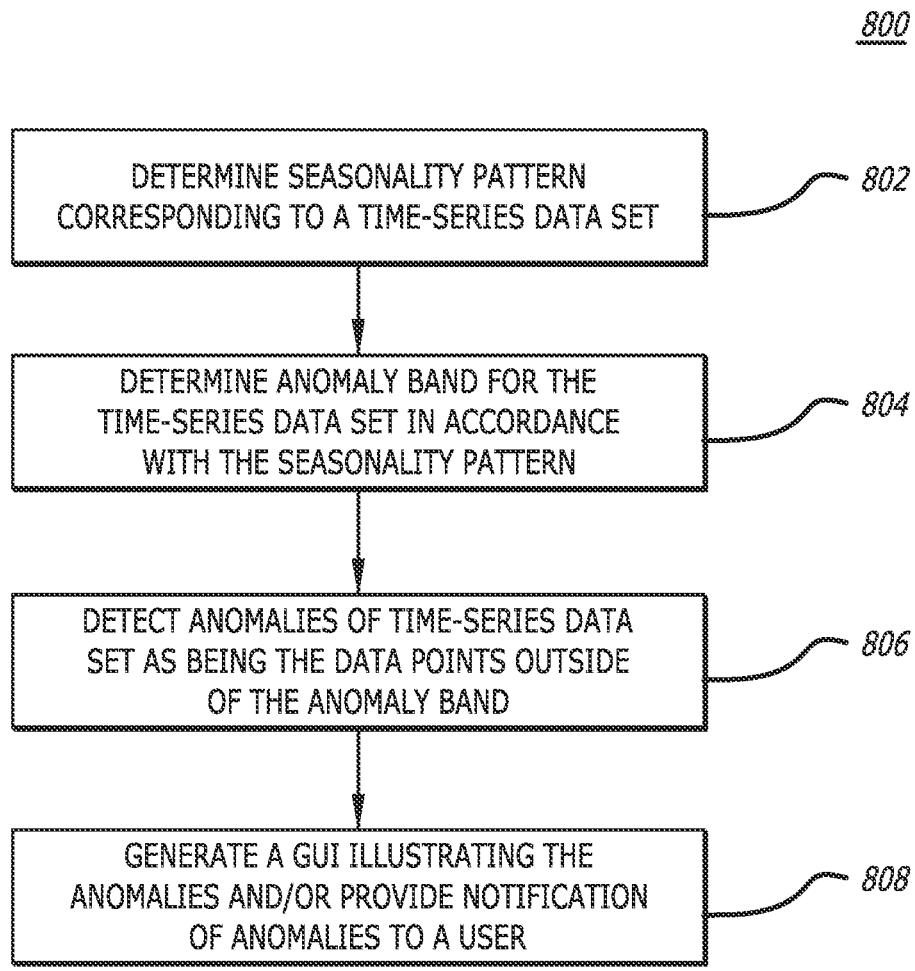
FIG. 8 is a flow diagram illustrating an embodiment of an anomaly detection process implemented by the anomaly detection subsystem of FIGS. 1A-1C including detection of a seasonality pattern to determine an anomaly band of a time-series data set according to some examples.

Operational Flow of Anomaly Detection Process Using Silhouette-Based Seasonality Pattern Detection FIG. 8 is a flow diagram illustrating an embodiment of an anomaly detection process implemented by the anomaly detection subsystem of FIGS. 1A-1C including detection of a seasonality pattern to determine an anomaly band of a time-series data set is shown according to some examples. FIG. 8 illustrates an example process 800 for detecting anomalies including the use of a seasonality pattern detection process and determination of an anomaly band based on the seasonality pattern. The example process 800 may be implemented, for example, by a computing device that comprises one or more processors and non-transitory computer-readable medium. The non-transitory computer readable medium may store instructions that, when executed by the processor(s), cause the processor(s) to perform the operations of the illustrated process 800.

Each block illustrated in FIG. 8 represents an operation of the process 800. It should be understood that not every operation illustrated in FIG. 8 is required. In fact, certain operations may be optional to complete aspects of the method 800. The method 800 begins with an operation of detecting a seasonality pattern that corresponds to a time-series data set, namely time-series data over a given time period (block 802). Details as to the seasonality pattern detection process are discussed further with respect to at least FIG. 9. Following detection of the seasonality pattern that corresponds to the time-series data set, an anomaly band is determined for the time-series data set in accordance with the seasonality pattern (block 804). Details as to anomaly band determination process are discussed further with respect to at least FIGS. 13-14D.

Once the anomaly band has been determined for the time-series data set in accordance with the detected seasonality pattern, anomalies within the time-series data set may be detected as being the data points lying outside of the anomaly band (block 806). The detected anomalies may then be displayed via a graphical user interface (GUI) and/or provided to a system administrator or other user via one or more notifications (e.g., email, text, GUI pop-up, etc.). Illustrative examples of displaying detected anomalies may be seen in at least FIGS. 6B and 12A-12D.

Figure 9:
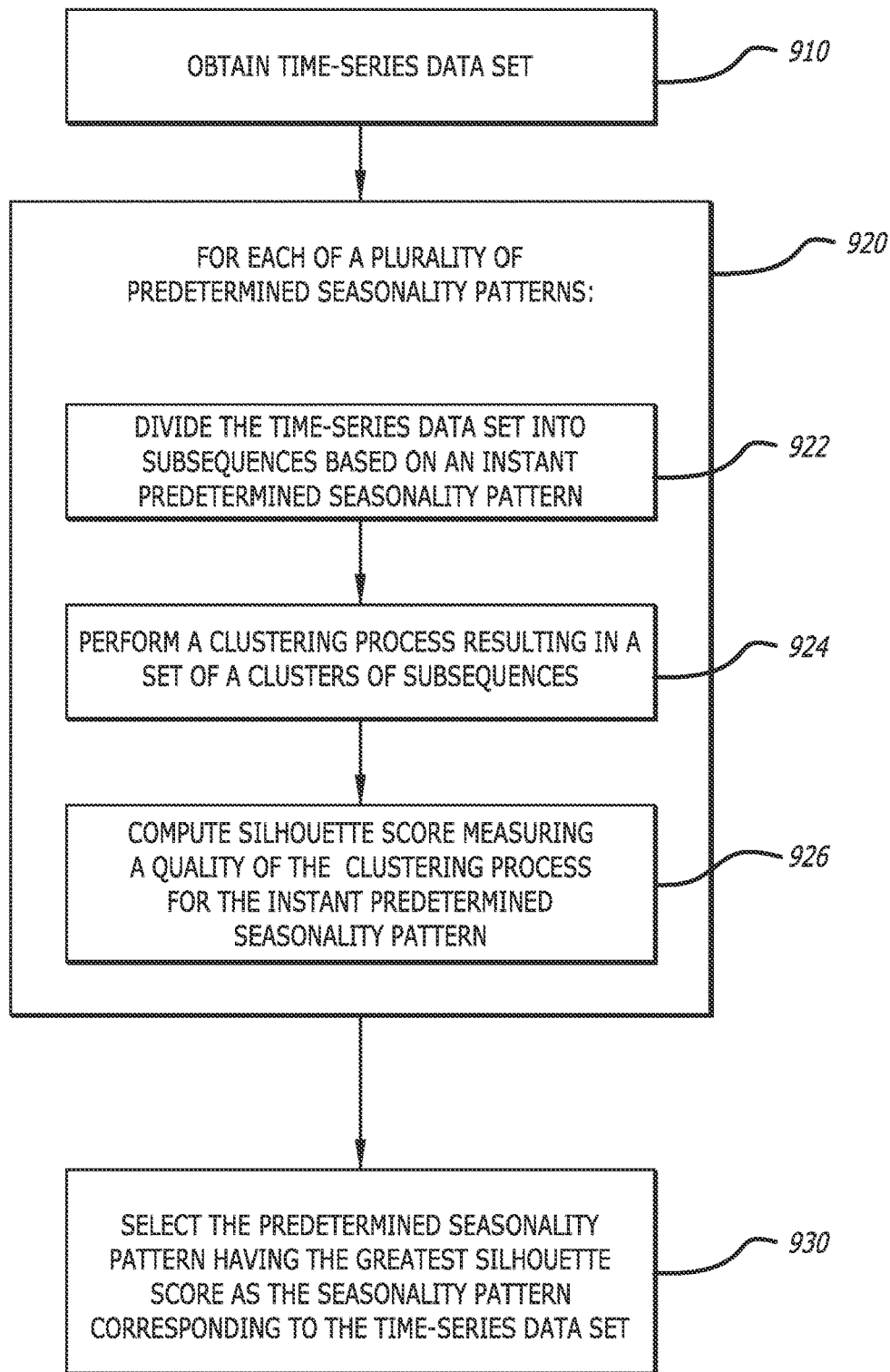
FIG. 9 is a flow diagram illustrating an embodiment of a seasonality pattern detection process implemented by the anomaly detection subsystem of FIGS. 1A-1C according to some examples.

FIG. 9 is a flowchart illustrating an example process 900 illustrating a seasonality pattern detection process implemented by the anomaly detection subsystem of FIGS. 1A-1C is shown according to some examples. The example process 900 can be implemented, for example, by a computing device that comprises a processor and a non-transitory computer-readable medium. The non-transitory computer readable medium can be storing instructions that, when executed by the processor, can cause the processor to perform the operations of the illustrated process 900. Alternatively or additionally, the process 900 can be implemented using a non-transitory computer-readable medium storing instructions that, when executed by one or more processors, case the one or more processors to perform the operations of the process 900 of FIG. 9.

Each block illustrated in FIG. 9 represents an operation of the process 900. It should be understood that not every operation illustrated in FIG. 9 is required. In fact, certain operations may be optional to complete aspects of the method 900. The method 900 begins with an operation of obtaining a time-series data set (block 910). Obtaining the time-series data set may include performing a search query as discussed above based on user input, such as through execution of a pipelined search query received as user input to a graphical user interface (GUI), e.g., as discussed below and illustrated with respect to FIGS. 6A-6D.

In some examples as discussed throughout the disclosure, the seasonality pattern detection may involve evaluating a set of predetermined seasonality patterns against the time-series data set, where each of the set of determined seasonality patterns are associated with a silhouette score based on the evaluation. The method 900 includes the evaluation of the set of predetermined seasonality patterns (block 920), which includes, for each of the set of predetermined seasonality patterns: (i) dividing the time-series data set into subsequences based on an instant predetermined seasonality pattern (block 922), (ii) performing a clustering process resulting in a set of clusters of subsequences, where the clustering is based on each predetermined seasonality pattern (e.g., time-series data set divided into subsequences of 24-hr time periods based on a 24-hr block pattern, and may be clustered according to "on/off" days when a work week pattern is being evaluated, e.g., clustered according to Saturday/Sunday and Monday-Friday (block 924), and (iii) computing a silhouette score measuring a quality of the ML based clustering process (block 926). The method 900 continues with selecting the predetermined seasonality pattern having the greatest silhouette score as the seasonality pattern corresponding to the time-series data set (block 930). As discussed below, a combination of seasonality patterns may be utilized forming a time policy, and the combination of seasonality patterns may dictate the clustering as well. One advantage of clustering the subsequences according to a seasonality pattern under evaluation is the avoidance of the use of resource-intensive machine learning techniques.

One manner of detecting anomalies within a time-series data set is to determine one or more thresholds that indicate a historically normal values for the time-series data set. As discussed above, the process of establishing such thresholds is complex and often results thresholds that are either too loose or too tight providing false negatives and false positives, respectively.

Disclosed herein is an example methodology for determining thresholds, e.g., upper and lower thresholds, which together form a band ("an anomaly band"). Such a methodology aims to determine an upper and/or lower threshold on a time-series data set by distinguishing abnormal behavior from normal behavior. One problem solved by the methodology is establishing the normal behavior of the time-series data set from the available history of the time-series data set given that the available historical values may contain un-identified outliers or anomalies.

The methodology described herein (the "silhouette-based" methodology) is configured to evaluate one or more seasonality patterns and establish history normal behavior of the time-series data set. In particular, the silhouette-based methodology evaluates a set of predetermined seasonality patterns and computes a silhouette score for each to indicate the quality of the fit of the seasonality pattern. The predetermined seasonality pattern having the highest silhouette score is determined to be the seasonality pattern corresponding to the time-series data set.

As discussed above with respect to FIG. 9, the silhouette-based methodology evaluates a set of predetermined seasonality patterns. As one illustrative example, a time-series data set may be obtained that corresponds to central processing unit (CPU) usage. When a system administrator desires to have an anomaly detection process executed on the time-series data set, a first step in the anomaly detection process is to determine a normal history behavior for the time-series data set and a second step is then to determine data points that sit outside of the normal historical behavior. Thus, a seasonality pattern detection process may be performed to determine how the time-series data set is typically affected by time of day, day of week, month of year, etc. Based on the detected seasonality pattern, one or more thresholds may be set to determine which data points of the time-series data set are outside of the normal boundary established by the thresholds and are thus anomalies.

Example Graphical Representations of Silhouette-Based Seasonality Pattern Detection Referring again to the CPU usage example, a first example seasonality pattern may include a half-day pattern, e.g., 12-hour blocks such as (1) being "on," "in use," or a first usage pattern, and (2) being "off," or a second usage pattern, where the patterns rotate every 12 hours. As was discussed above and will be discussed with an illustrative example below with respect to FIGS. 10A-10B, the silhouette-based methodology may include dividing the CPU usage time-series data set into subsequences according to the first example seasonality pattern, e.g., into 12-hour blocks of "on" and "off." Next, a clustering process is performed that clusters the subsequences into clusters (e.g., based on the seasonality pattern(s) being evaluated as discussed above), and following the clustering, a silhouette score is computed for each subsequence. An overall silhouette score for the first example seasonality pattern may be determined using one of a plurality of statistical functions (e.g., average of silhouette scores, median, average/medium of a middle percentage, etc.). In one exemplary example, the overall silhouette score is computed as the median of the silhouette scores of all subsequences. In some examples, when the overall silhouette score is high (indicating a high quality clustering), the subsequences containing anomalies will have a relatively low silhouette score.

Figure 10A:
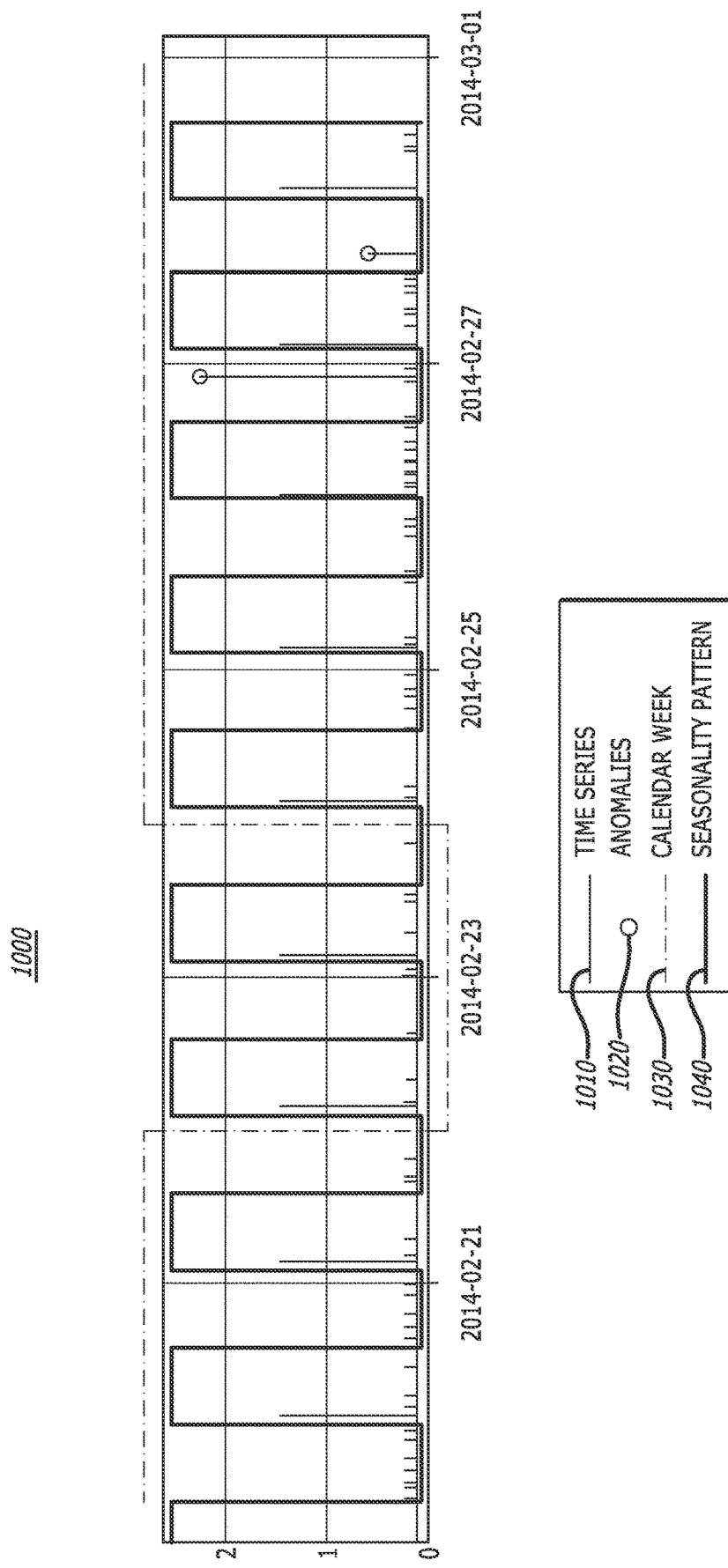
FIG. 10A is a graphical representation of a seasonality pattern corresponding to a sample time-series data and detected anomalies of the time-series data set according to some examples.

FIG. 10A is a graphical representation of a seasonality pattern corresponding to a sample time-series data and detected anomalies of the time-series data set is shown according to some examples. FIG. 10A illustrates a sample graphical representation 1000 of a time-series data set 1010 plotted over time, e.g., a set of days spanning February and March of 2014. The graphical representation 1000 also includes a set of anomalies 1020, an indication of the calendar week 1030 (e.g., upper value represents Monday-Friday and lower value represents Saturday-Sunday), and a seasonality pattern 1040 that is being evaluating according to the time-series data set. As shown in FIG. 10A, the seasonality pattern 1040 is a half-day pattern, e.g., 12-hour blocks where the upper value indicates working hours and the lower values indicate off hours. As is shown, the time-series data set 1010 includes a daily spike in value. FIG. 10A provides a basic visual understanding as to how a first example seasonality pattern is applied to a time-series data set.

Figure 10B:
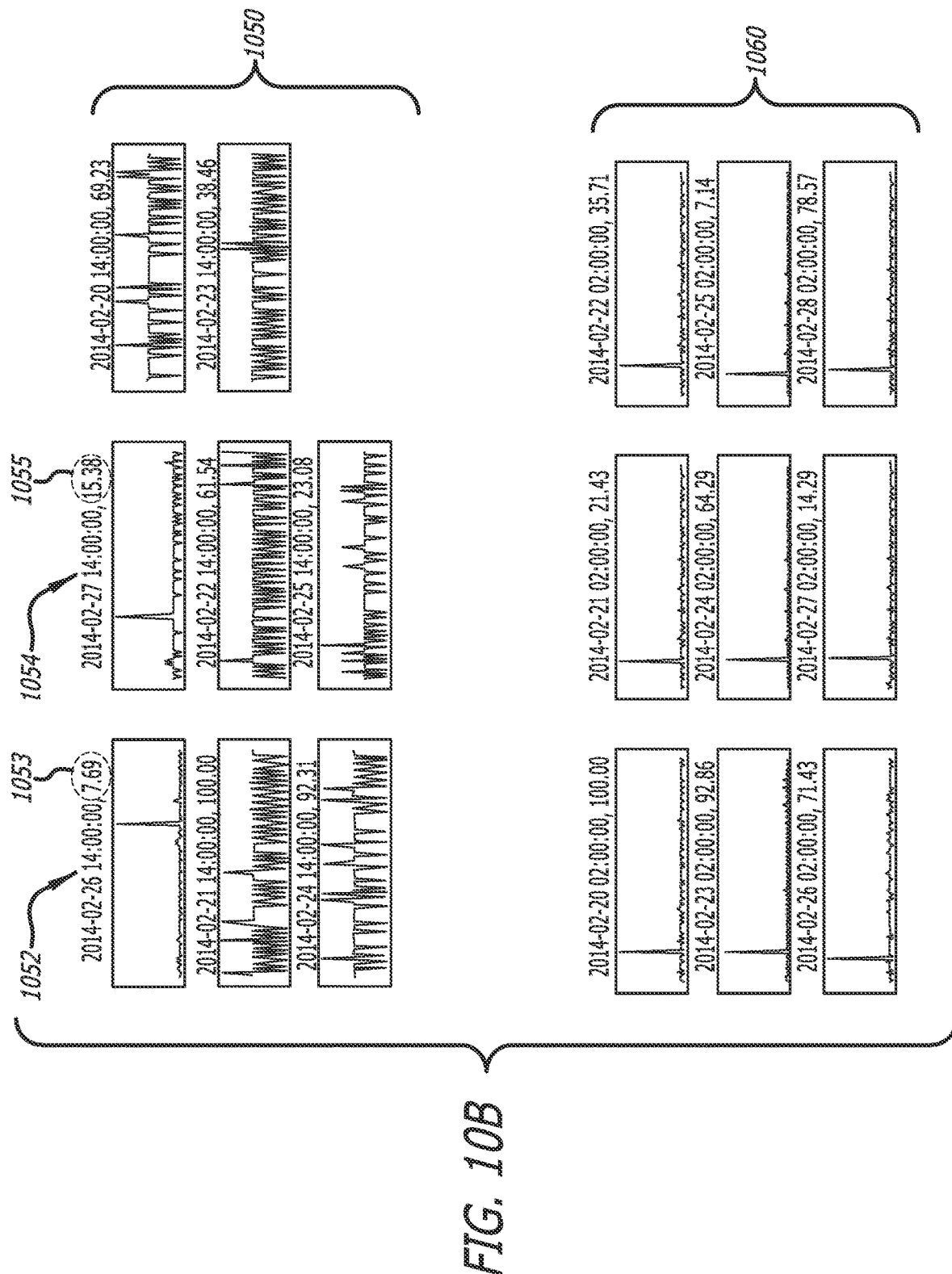
FIG. 10B is a graphical representation of a first cluster of subsequences and a second cluster of subsequences of the time-series data set of FIG. 10A according to some examples.

Referring now to FIG. 10B, a graphical representation of a first cluster of subsequences and a second cluster of subsequences of the time-series data set of FIG. 10A is shown according to some examples. FIG. 10B illustrates a point in the silhouette-based methodology at which the time-series data set 1010 has been divided into subsequences according to the seasonality pattern 1040 and where the subsequences have been clustered into clusters 1050, 1060. As illustrated in FIG. 10B, the two clusters correspond to a candidate seasonality pattern 1040 where the cluster 1050 includes subsequences pertaining to 12-hr blocks, e.g., time-series data captured daily starting at 14:00 (2:00 pm) and the cluster 1060 includes subsequences pertaining to 12-hr blocks, e.g., time-series data captured daily starting at 2:00 (2:00 am). For example, the subsequences of the cluster 1050 correspond to a first usage pattern, and the subsequences of the cluster 1060 correspond to a second usage pattern (e.g., including a daily usage spike).

FIG. 10B also illustrates a date and timestamp for each subsequence as well as the computed silhouette score. The date, timestamp (start time of subsequence), and silhouette score all appear directly above the corresponding subsequence. For example, a first subsequence 1052 within the cluster 1050 includes a silhouette score 1053 of 7.69 and a second subsequence 1054 includes a silhouette score 1055 of 15.38. Relative to the silhouette scores of the other subsequences of both clusters 1050, 1060, the low silhouette scores 1053, 1055 indicate that the subsequences 1052, 1054 are likely to include anomalies.

As noted above, the silhouette-based methodology includes further operations of determining an overall silhouette score for the seasonality pattern, such as determining the median silhouette score of all subsequences. The process is then repeated for a plurality of candidate seasonality patterns and the overall silhouette scores of each are compared to one other, whereby the candidate seasonality pattern having the highest overall silhouette score may be selected as the seasonality pattern that corresponds to the time-series data set.

Figure 13:
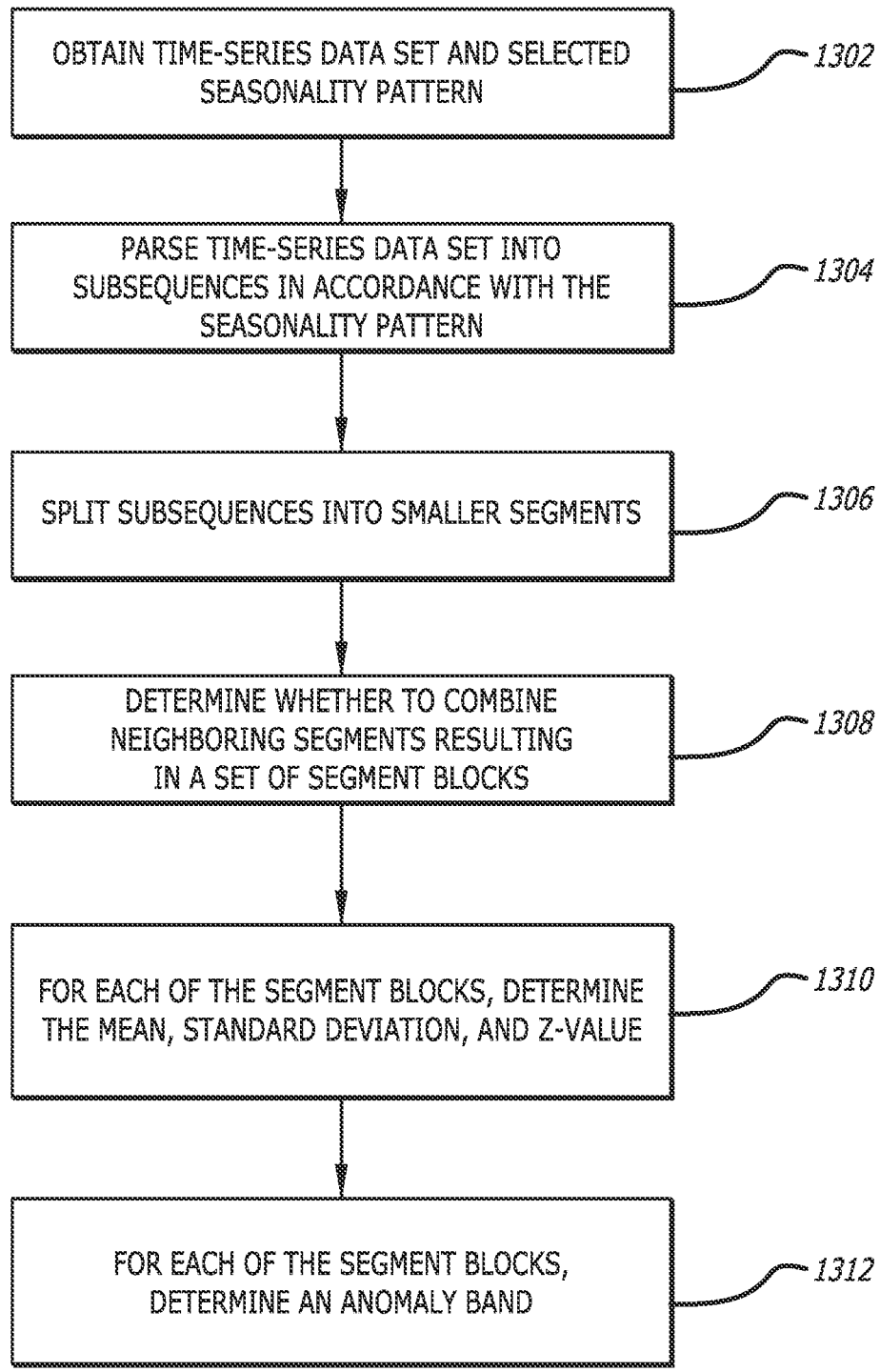
FIG. 13 is a flow diagram illustrating an embodiment of an anomaly band detection process implemented by the anomaly detection subsystem of FIGS. 1A-1C according to some examples.

Once the seasonality pattern corresponding to a time-series data set has been determined, the anomaly detection process described herein includes determining an anomaly band thereby creating boundaries around the historically normal behavior. As a result, data points of the time-series that lie outside of the anomaly band may be considered anomalous. The anomaly band may comprise one or more thresholds. In one example, the anomaly band may comprise upper and lower thresholds. In another example, the anomaly band may include just an upper threshold where the anomaly band comprises all values less than or equal to the upper threshold (or just all values less than). In a third example, the anomaly band may include just a lower threshold where the anomaly band comprises all values great than or equal to the lower threshold (or just all values greater than). As discussed in FIG. 13, the method for determining an anomaly band disclosed herein utilizes the subsequences generated when determining an overall silhouette score for the corresponding silhouette pattern (e.g., FIGS. 9-10B). Thus, the anomaly band detection methodology discussed in FIG. 13 provides a computational improvement over other anomaly band detection methods when paired with the seasonality pattern detection process described.

FIGS. 10A-10B illustrate one example seasonality pattern and how a time-series data set may be dividing into subsequences, where a silhouette score is determined for each subsequence and the mean or median of the silhouette scores of the subsequences may be used to represent the silhouette score for the seasonality pattern generally. FIGS. 10A-10B illustrate a half-day pattern (e.g., 12-hr blocks). However, the disclosure is not intended to be so limiting. As a result, the following provides additional examples, including a weekly pattern, an hour block pattern, and a work hour pattern.

A. Weekly Pattern

In a weekly pattern example, the first step of evaluating the possible weekly pattern is to divide the input time-series data set into a collection of subsequences of length one-day. The next step is to label subsequences into clusters so that silhouette score can be used to quantify the clustering quality. In this example, the complex combination search on all possible labeling methods on the collection of subsequences is avoided. Instead, the labeling (clustering) method for evaluating the weekly pattern is to label the 1-day-long sub-sequences into two clusters, weekdays and weekends, based on day-of-week.

Additionally, one method for handling time-series data sets where the off-days are NOT synchronized to the calendar weekend is to repeatedly evaluate the weekly pattern for various possible off-day combinations. For example, one method may be assuming off-days occur next to each other, evaluating weekly candidate patterns where each day of the week is used as a possible start day for the off-days, and selecting the weekly candidate pattern with the highest silhouette score of the possible weekly candidate patterns. It should be understood that the weekly patterns are not limited to those referenced above. For example, the off-days need not be subsequent days and the off-days not are not limited or restrict to two days.

B. Hour Block Pattern

As an alternative to a weekly pattern having clusters of five days "on" (working) and two days "off" (not working), an hour block pattern may be evaluated against a time-series data set, where hour blocks alternative between states, e.g., on/off. The hour block pattern is not limited to single hour blocks but may be any number of hours: 1, 2, 3, 4, 5, 6, 12, etc. The methodology for evaluating an hour-block pattern is the similar to evaluating the weekly pattern example with two differences: (1) instead of dividing the time-series data set into day-long subsequences, the length of the subsequences is the length of possible hour-block; and (2) multiple possible hour-block lengths are evaluated, and then one of them is picked as the candidate hour-block pattern based on which has the highest silhouette score (e.g., hour blocks of 1, 2, 3, etc., hours are evaluated).

When evaluating a given hour-block pattern, e.g., 3-hour blocks, the time-series data set is divided into 3-hour blocks, and then clustered according to the state (values) of the data points within the subsequences. In some examples, the subsequences may be clustered into two clusters, e.g., representing states of "on" and "off." In other examples, the subsequences may be clustered into three or more clusters, e.g., representing three or more states.

In some examples, when evaluating a plurality of hour-block patterns (e.g., 1, 2, 3 hours) to determine which hour-block pattern to select as a seasonality pattern candidate, the evaluation may include selecting: (i) the hour-block pattern having the highest silhouette score when the difference between its score and the hour-block patterns of longer hour-blocks is larger than a threshold, e.g., 20%, or (ii) the hour-block pattern of a longer hour-block.

C. Work Hour Pattern

In this proposed approach, the work-hour pattern is simplified to a half-day pattern so that the lengths of subsequences are equal, e.g., 12-hour blocks. Here the same methodology is applied with two distinctions. First, the time-series data set is divided into subsequences of half-day length, and labeled alternatively as work-hour vs off-hour. Second, the start hour of the half-day work-hour is found by picking the one with the highest score. For instance, the half-days need not start at 12 am and 12 pm, but may be 8 am and 8 pm, or 6 am and 6 pm, etc. The start time of each half-day may be determined by evaluating each option (e.g., starting at 12 am/12 pm, 1am/1 pm, 2 am/2 pm, etc.) and selecting the work hour pattern with the start times having the highest silhouette score.

Time Policy Recommendation

In addition to assessing a single seasonality pattern (e.g., weekly pattern with Sat-Sun as "off-days" or a 2-hour block pattern alternating between "on" and "off" states), a time policy may be determined that is a combination of seasonality patterns. The analyses described above may be performed, through execution of logic, in parallel or in serial, depending on the availability or expense of computing resources, to determine whether two or more seasonality patterns apply to a time-series data set. For instance, a time-series data set may comprises data that follows a 2-hour block pattern on weekdays but is generally "off" on weekends; thus, a 2-hour block pattern in combination with a weekly pattern may form the time policy utilized when performing anomaly detection on the time-series data set.

In one example, any of the seasonality patterns described above (or otherwise included within the disclosure) may be analyzed resulting in determination of a silhouette score representing the applicability of the seasonality pattern to the time-series data set. Additionally, a determination may be made as to whether the seasonality pattern applies based on whether the silhouette score of a seasonality pattern satisfies a threshold comparison. In some examples, the a seasonality pattern applies when the silhouette score is greater than or equal to 0.2. In examples in which two or more seasonality patterns of a particular type (e.g., multiple hour block patterns), the seasonality pattern having the highest silhouette score for that particular type is selected.

Figure 11A:
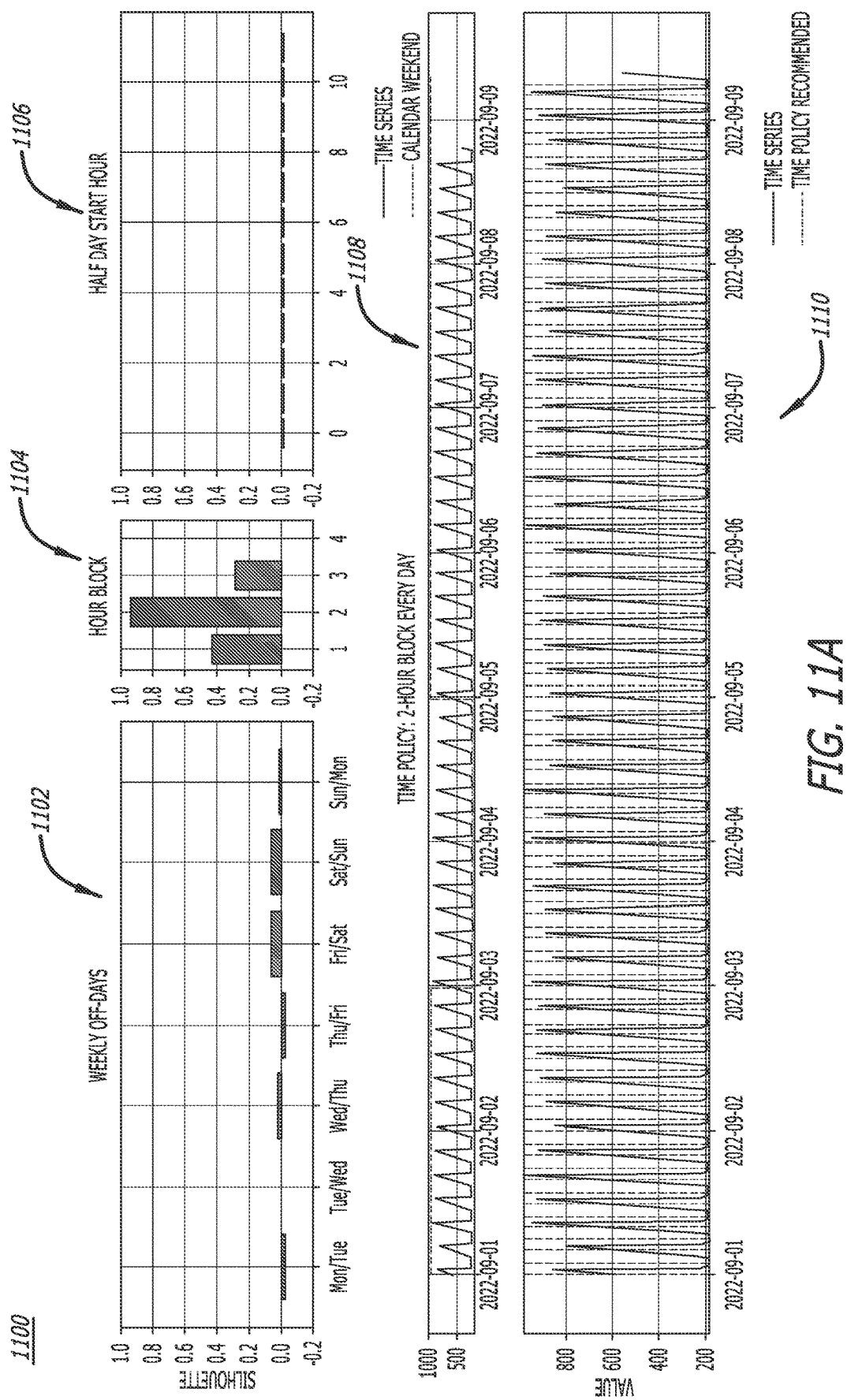
FIGS. 11A-11D are graphical representations of results of evaluating multiple seasonality patterns in accordance with determining a time policy according to some examples.

The following are several examples showing silhouette scores generated from evaluating multiple seasonality patterns and the resulting time policy recommendations for example time-series data sets. As a first example, FIG. 11A illustrates a first example time-series data set and the results of the evaluation of multiple seasonality patterns including: (1) weekly patterns with two consecutive off-days, (2) hour-block patterns, and (3) half-day patterns with varying start hours. Further, the weekly patterns evaluated include weekly off-days of: Mon/Tue, Tue/Wed, Wed/Thu, Thu/Fri, Fri/Sat, Sat/Sun, and Sun/Mon. The hour-block patterns evaluated include hour-blocks of 1, 2, 3, and 4 hours. The half-day start hour patterns evaluated include offsets of: 0-10, where an offset of 0 refers to a start time for each half-day block of 12 am/12 pm, an offset of 1 refers to a start time for each half-day block of 1am/1 pm, etc. It is noted that the evaluation of the same seasonality patterns described above are discussed with respect to FIGS. 11B-11D as well.

Referring to FIG. 11A, an illustration of a first example time-series data set and corresponding results following the evaluation of multiple seasonality patterns in view of the first example time-series data set is shown according to some examples. FIG. 11A illustrates a set of graphical representations pertaining to the evaluation of and silhouette score generation for a plurality of seasonality patterns (collectively, 1100). In particular, the first example time-series data set illustrated may represent a sensed transaction response time (e.g., time respond to a transaction such as a query execution request in seconds). Following determination of the silhouette scores for a plurality of seasonality patterns as described above, the silhouette scores for weekly off-day patterns are shown in graph 1102, the silhouette scores for hour-block patterns are shown in graph 1104, and the silhouette scores for half-day start hour patterns are shown in graph 1106.

Using a threshold silhouette score of 0.2 as the threshold for determining whether a seasonality pattern applies to the time-series data set, graph 1108 illustrates a 2-hour block time-policy that is applied every day of the week. As the graph 1102 indicates, there were no weekly-off day patterns having consecutive "off-days" that had a silhouette score of at least 0.2; thus, the determination is that the time policy is applied every day. The graph 1104 indicates that there were three hour-block patterns that had a silhouette score of at least 0.2, a determination was made as to which hour-block pattern to select. As described above, in one example, the determination may be the hour-block pattern having the highest silhouette score. In an alternative example, the determination may favor longer hour-block patterns and select the longest hour-block pattern having a silhouette score that is greater than or equal 0.2 so long as a shorter hour-block pattern does not have a silhouette score that is at least a percentage greater (e.g., favor longer hour-block patterns unless a shorter hour-block pattern has a significantly greater silhouette score). Here, the two-hour block pattern was selected given it has the greatest silhouette score. Finally, graph 1106 shows that none of the half-day start hour patterns evaluated have a silhouette score greater than or equal to 0.2; thus, a half-day start hour pattern is not included in the time policy. Graph 1110 illustrates the first example time-series data set and the determined time policy of a 2-hour block pattern that is applied every day.

Figure 11B:
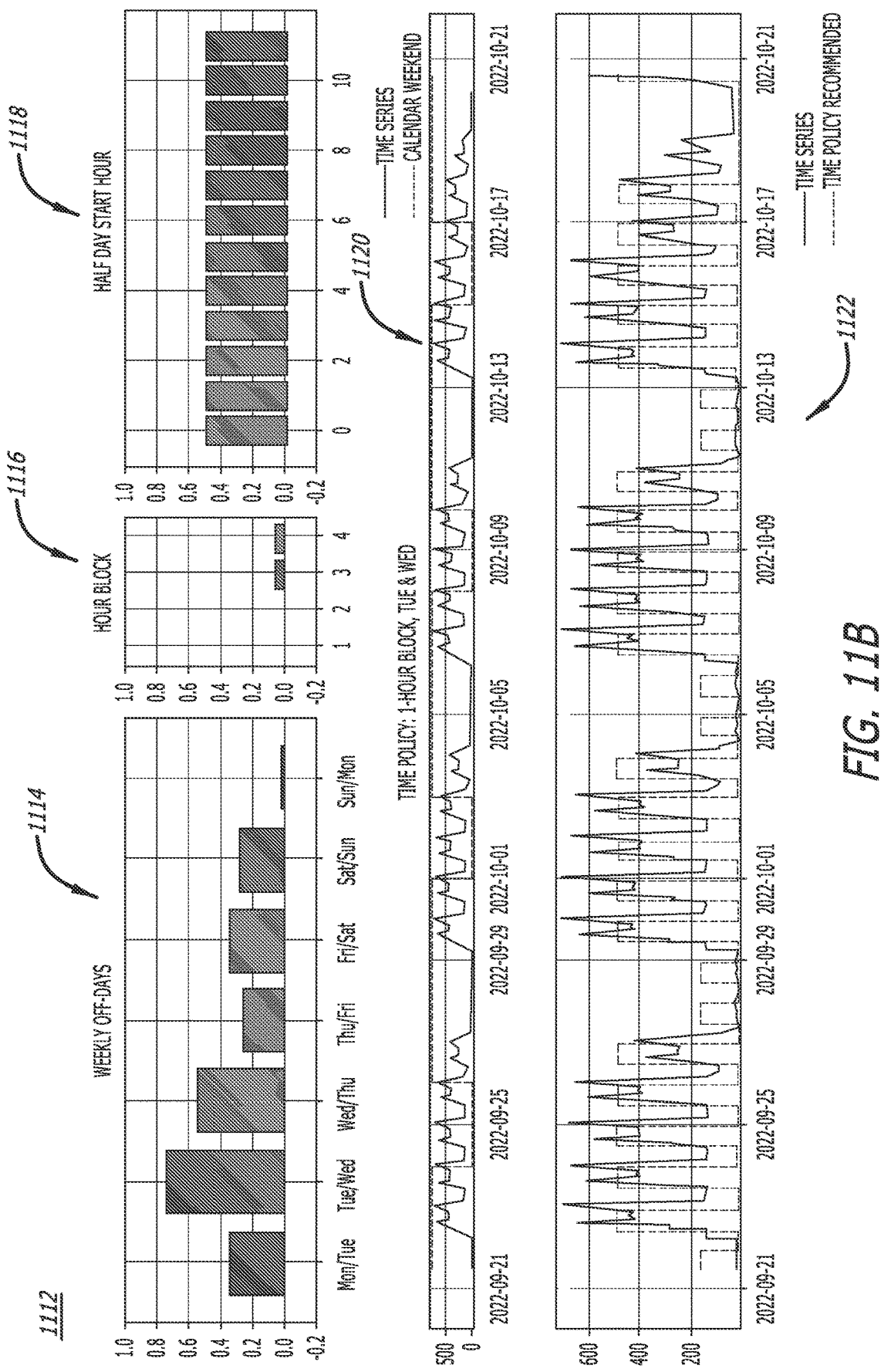

Referring now to FIG. 11B, an illustration of a second example time-series data set and corresponding results following the evaluation of multiple seasonality patterns in view of the second example time-series data set is shown according to some examples. FIG. 11B illustrates a set of graphical representations pertaining to the evaluation of and silhouette score generation for a plurality of seasonality patterns (collectively, 1112). In particular, the second example time-series data set illustrated may represent a sensed transaction response time (e.g., time respond to a transaction such as a query execution request in seconds). Following determination of the silhouette scores for a plurality of seasonality patterns as described above, the silhouette scores for weekly off-day patterns are shown in graph 1114, the silhouette scores for hour-block patterns are shown in graph 1116, and the silhouette scores for half-day start hour patterns are shown in graph 1118.

Using a threshold silhouette score of 0.2 as the threshold for determining whether a seasonality pattern applies to the time-series data set, graph 1120 illustrates a 1-hour block time-policy that is applied from 11 am-11 pm on Thursday-Monday with Tuesday and Wednesday being "off days." As the graph 1114 indicates, the weekly off-day pattern having the greatest silhouette score was the weekly off-day pattern having consecutive "off-days" of Tuesday-Wednesday. Although there were multiple weekly off-day patterns having a silhouette score above 0.2, the pattern having the greatest silhouette score is selected for the set of weekly off-day patterns. The graph 1116 indicates that no hour-block patterns (hours of 1, 2, 3, 4) had a silhouette score greater than or equal to 0.2 Finally, graph 1118 shows that each of the half-day start hour patterns evaluated have a silhouette score greater than or equal to 0.2; thus, the half-day start hour pattern having the greatest silhouette score is included in the time policy (offset of 11, e.g., 11 am-11 pm being "on" or "working hours"). Graph 1122 illustrates the second example time-series data set and the determined time policy of a 1-hour block pattern applied over a half-day pattern (at times referred to as work hours and off hours) with working hours being 11 am-11 pm that is applied Thursday to Monday.

Figure 11C:
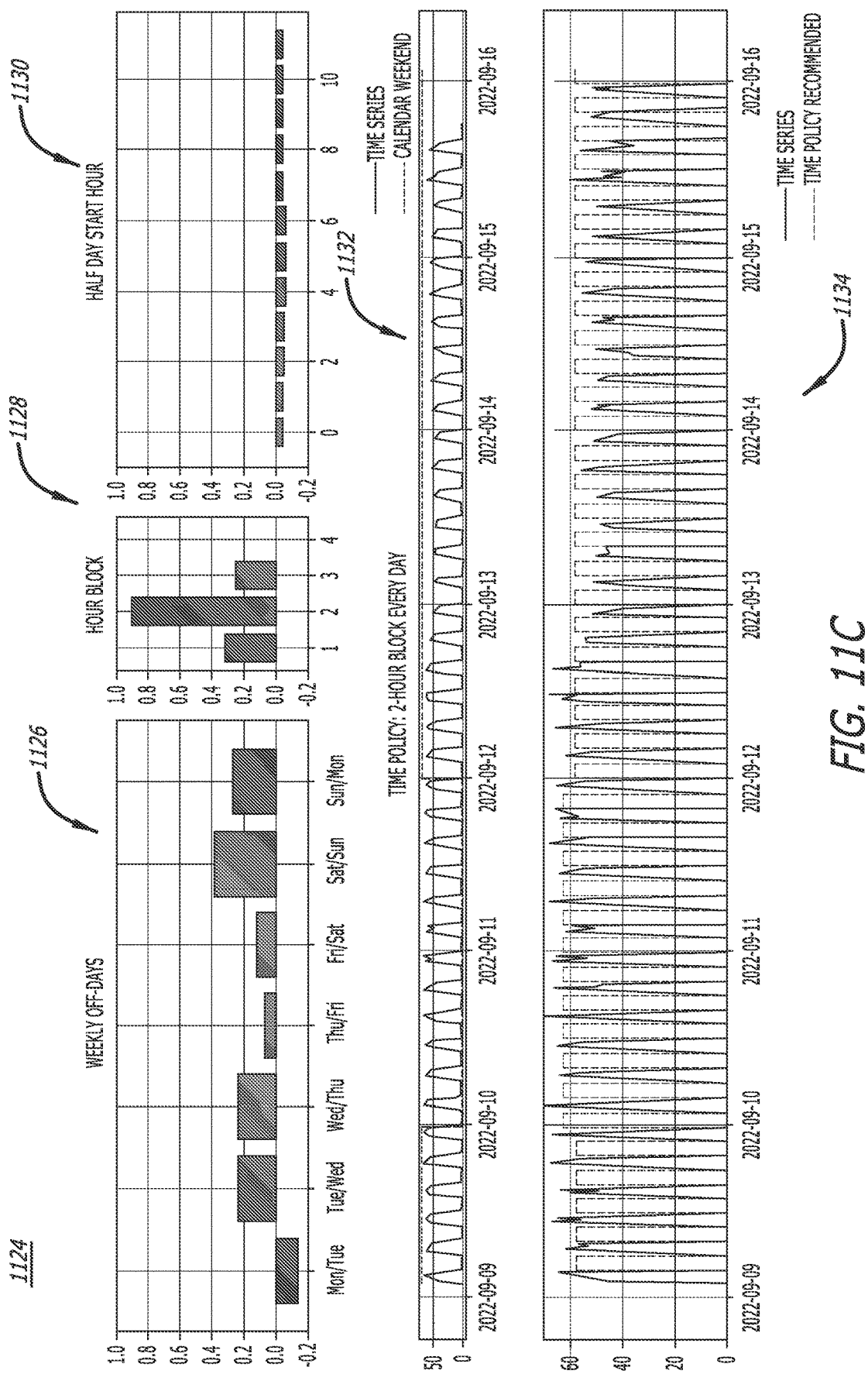

Referring now to FIG. 11C, an illustration of a third example time-series data set and corresponding results following the evaluation of multiple seasonality patterns in view of the third example time-series data set is shown according to some examples. FIG. 11C illustrates a set of graphical representations pertaining to the evaluation of and silhouette score generation for a plurality of seasonality patterns (collectively, 1124). In particular, the third example time-series data set illustrated may represent a number of webserver errors. Following determination of the silhouette scores for a plurality of seasonality patterns as described above, the silhouette scores for weekly off-day patterns are shown in graph 1138, the silhouette scores for hour-block patterns are shown in graph 1140, and the silhouette scores for half-day start hour patterns are shown in graph 1142.

Using a threshold silhouette score of 0.2 as the threshold for determining whether a seasonality pattern applies to the time-series data set, graph 1132 illustrates a 2-hour block time-policy that is applied Monday-Friday. As the graph 1126 indicates, the weekly-off day pattern of Sat-Sun as off-days had the greatest silhouette score of at least 0.2. The graph 1128 indicates that there were three hour-block patterns that had a silhouette score of at least 0.2, and here, the two-hour block pattern was selected given it has the greatest silhouette score. Finally, graph 1130 shows that none of the half-day start hour patterns evaluated have a silhouette score greater than or equal to 0.2; thus, a half-day start hour pattern is not included in the time policy. Graph 1134 illustrates the third example time-series data set and the determined time policy of a 2-hour block pattern that is applied Monday-Friday.

Figure 11D:
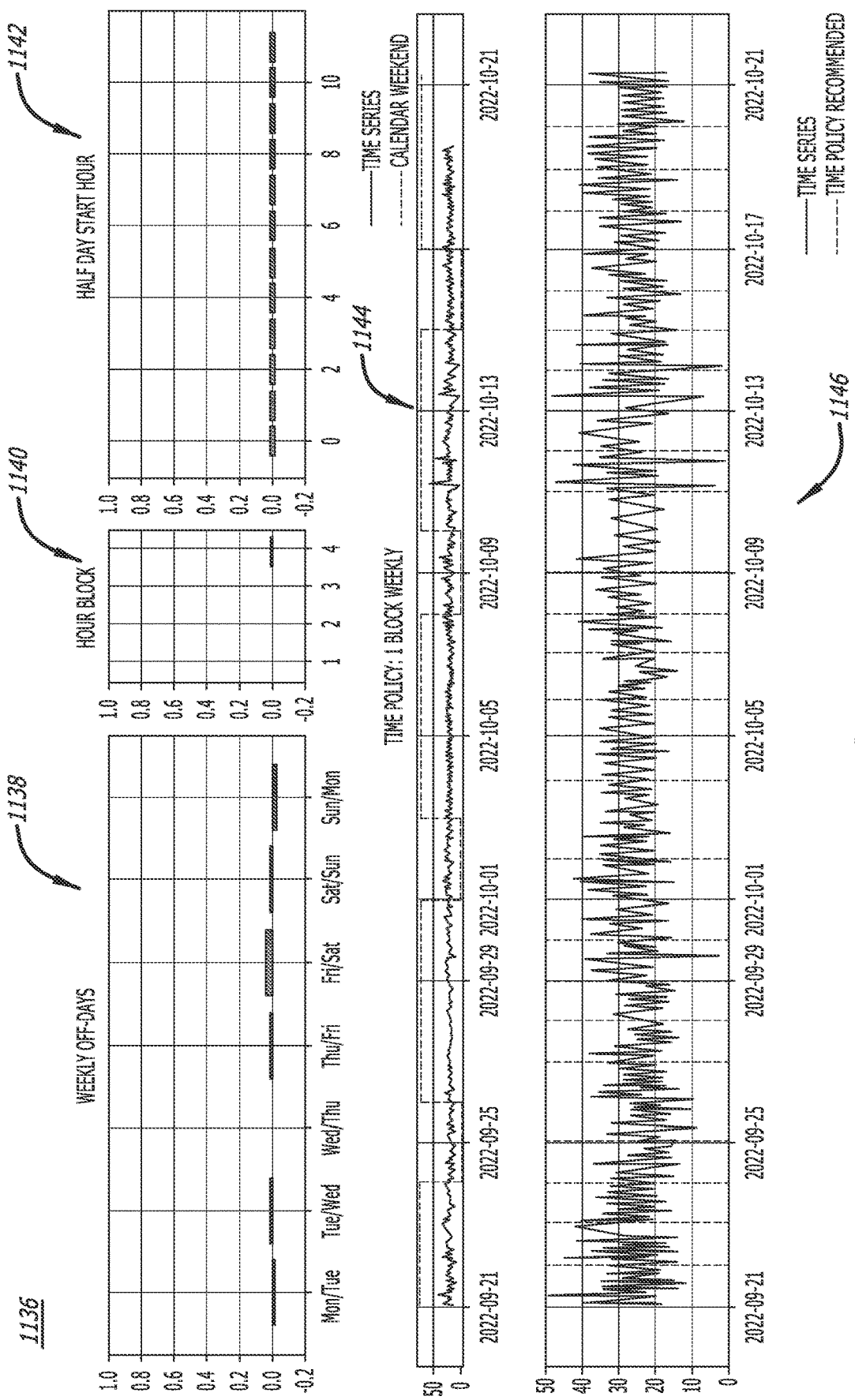

Referring now to FIG. 11D, an illustration of a fourth example time-series data set and corresponding results following the evaluation of multiple seasonality patterns in view of the fourth example time-series data set is shown according to some examples. FIG. 11D illustrates a set of graphical representations pertaining to the evaluation of and silhouette score generation for a plurality of seasonality patterns (collectively, 1136). In particular, the fourth example time-series data set illustrated may represent a number of webpage frontend errors. Following determination of the silhouette scores for a plurality of seasonality patterns as described above, the silhouette scores for weekly off-day patterns are shown in graph 1138, the silhouette scores for hour-block patterns are shown in graph 1140, and the silhouette scores for half-day start hour patterns are shown in graph 1142.

Using a threshold silhouette score of 0.2 as the threshold for determining whether a seasonality pattern applies to the time-series data set, graph 1144 illustrates a week long block time-policy that is applied every day and the graph 1146 illustrates a day long block applied every day. As the graphs 1144, 1144 illustrate, the time-series data set does not follow a seasonality pattern and the graphs 1138, 1140, and 1142 all provide silhouette scores reflecting such. As a result, a default time policy pattern may be selected, e.g., a day long block pattern with no off-days and no offset.

Much of the disclosure focuses on detection of a seasonality pattern for a particular time-series data set using the silhouette-based method (or silhouette-score method). As illustrated in FIGS. 11A-11B, a plurality of seasonality patterns may be combined to form a time policy. Thus, it should be understood that any of the examples discussed herein pertaining to a single seasonality pattern apply equally to time policy (e.g., the combination of a plurality of seasonality patterns). This process is illustrated in and described with respect to FIG. 12 below.

Figure 12:
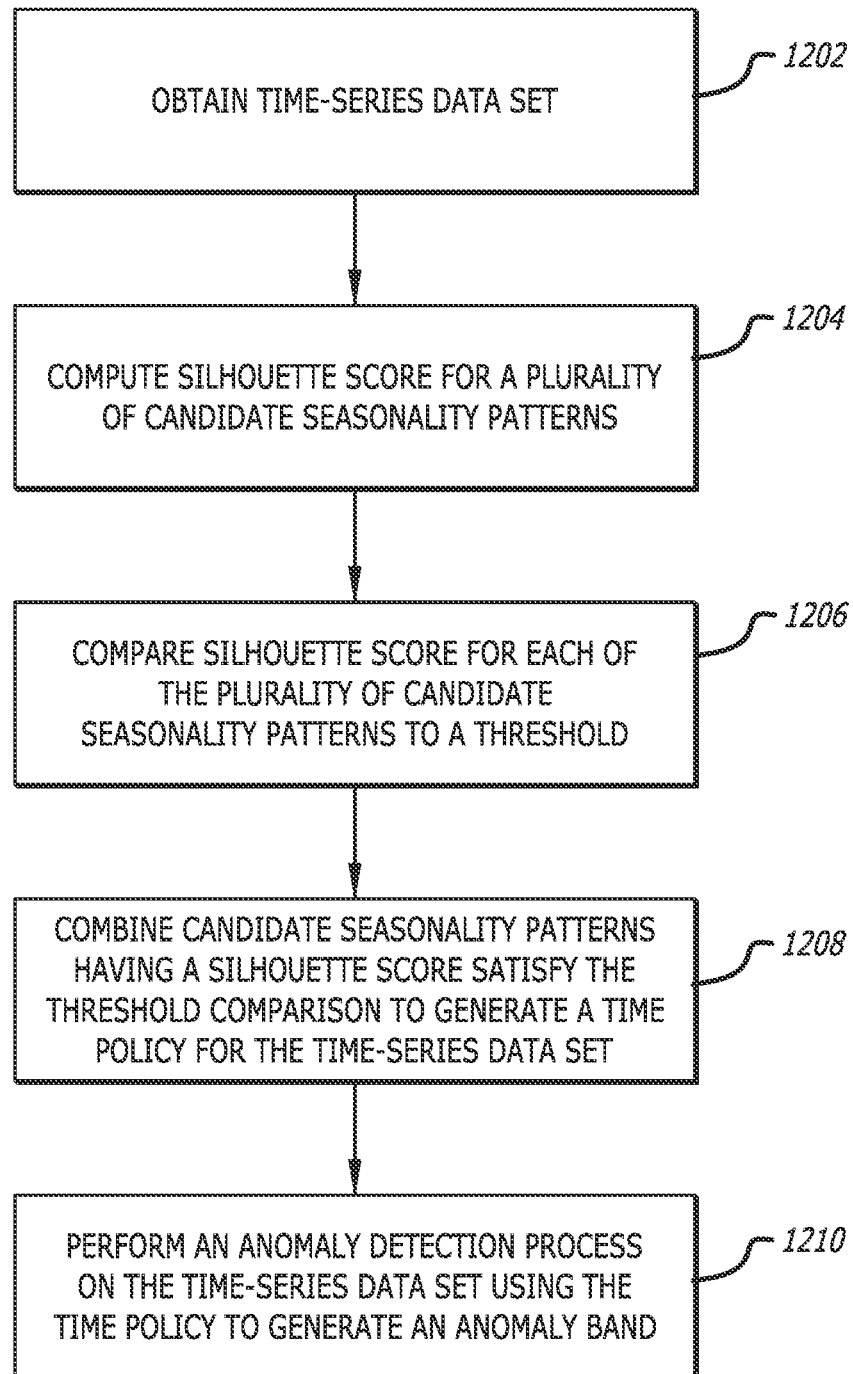
FIG. 12 is a flow diagram illustrating an embodiment of an anomaly band detection process implemented by the anomaly detection subsystem of FIGS. 1A-1C is shown according to some examples.

Referring now to FIG. 12, a flow diagram illustrating an embodiment of an anomaly band detection process implemented by the anomaly detection subsystem of FIGS. 1A-1C is shown according to some examples. FIG. 12 illustrates an example process 1200 for determining whether to combine two or more seasonality patterns into a time policy for a time-series data set. The example process 1200 may be implemented, for example, by a computing device that comprises one or more processors and non-transitory computer-readable medium. The non-transitory computer readable medium may store instructions that, when executed by the processor(s), cause the processor(s) to perform the operations of the illustrated process 1200.

Each block illustrated in FIG. 12 represents an operation of the process 1200. It should be understood that not every operation illustrated in FIG. 12 is required. In fact, certain operations may be optional to complete aspects of the method 1200. The method 1200 begins with an operation of obtaining a time-series data set (block 1202). As discussed above, a silhouette score may then be determined for each of a plurality of seasonality patterns in view of the time-series data set, which may then be compared to a threshold (blocks 1204, 1206). In particular, the plurality of seasonality patterns may be divided into types such as a weekly off-days pattern type or an hour-block pattern type as used in examples discussed above. In some example, a single seasonality pattern may be selected from a particular group, where the selection criteria is discussed above.

The method 1200 continues by combining the seasonality patterns that have a silhouette score the satisfies the threshold comparison resulting in generation of a time policy for the time-series data set (block 1208). Subsequently, an anomaly detection process may be performed on the time-series where an anomaly band is generated using the time policy (block 1210).

Detailed Operational Flow of Anomaly Band Determination

Referring now to FIG. 13, a flow diagram illustrating an embodiment of an anomaly band detection process implemented by the anomaly detection subsystem of FIGS. 1A-1C is shown according to some examples. FIG. 13 illustrates an example process 1300 for determining an anomaly band for a time-series data set according to a seasonality pattern of the time-series data set. The example process 1300 may be implemented, for example, by a computing device that comprises one or more processors and non-transitory computer-readable medium. The non-transitory computer readable medium may store instructions that, when executed by the processor(s), cause the processor(s) to perform the operations of the illustrated process 1300.

Each block illustrated in FIG. 13 represents an operation of the process 1300. It should be understood that not every operation illustrated in FIG. 13 is required. In fact, certain operations may be optional to complete aspects of the method 1300. The method 1300 begins with an operation of obtaining a time-series data and the seasonality pattern corresponding to the time-series data set (block 1302). The time-series data set is then parsed (divided) into subsequences in accordance with the seasonality pattern (block 1304). Parsing or dividing the time-series data set into subsequences according to a seasonality pattern is described and illustrated with respect to FIGS. 9-10B. As noted above, when the anomaly band detection process (method 1300) follows the seasonality pattern detection process described above with respect to FIGS. 9-10B, the subsequences previously generated may be utilized.

As illustrated in FIG. 10B, a silhouette score is generated for each subsequence and as noted above, the silhouette score provides an indication as to whether the subsequence is likely to include an anomaly. Thus, in determining the anomaly band, the subsequences including only "normal" or expected behavior should be used and the subsequences including anomalies should be excluded. As such is not known in advance, one method of improving the likelihood of only using "normal data" (e.g., subsequences including only normal or benign data points) is to utilize the subsequences having a silhouette score within the top X % of all silhouette scores, where X may be 10 or 15 in some implementations. The subsequences likely to include an anomaly typically have lower silhouette scores (e.g., see FIG. 10B, the silhouette scores 1053, 1055 for the subsequences 1052, 1054 that include anomalies compared to the silhouette scores of the other subsequences within the cluster 1050). Thus, by selecting "normal data" being the subsequences having a silhouette score within the top X % of all silhouette scores the use for in operations 1306-1312, the method 1300 has a high likelihood of generating an anomaly band without including the anomalies present in the time-series data set.

The subsequences may then be divided into smaller components, e.g., segments (block 1306). The intent in further dividing the subsequences into smaller segments is to tightly fit the anomaly band around the time-series data. For example and with reference to FIG. 10A, the 12-hr seasonality pattern may serve as the seasonality pattern, however, the value of the time-series data set at the CPU spike differs significantly from the rest of the 12-hour block, thus an anomaly band that merely uses the 12-hour block seasonality pattern (e.g., a high value corresponding to the CPU for one 12-hour block and a low value for a second 12-hour block) will likely fail to detect several anomalies as the anomaly band would not be tightly fit to the actual-time series data set. In one example, the segments may comprise 1-hour blocks.

Once the subsequences have been divided into small segments, an operation is performed that includes determining whether neighboring segments should be combined (block 1308). Determining whether to combine neighboring segments may include, first, determining the mean and standard deviation of the values of the data points within each segment. Second, for each splitting point (e.g., where one segment ends and the next begins), compare the difference of the two neighboring segments' mean with the minimum of the standard deviation of the two segments. The above may be summarized as:

If abs (mean$_1$–mean$_2$)<$a$*min (std$_1$–std$_2$), then: the neighboring segments are combined (i.e., the splitting point is abandoned)

The value 'a' represents a constant, which may be predetermined empirically, and 'std' refers to standard deviation. The collection of the remaining splitting points defines the splitting of the segment blocks.

For each of the segment blocks, the mean, standard deviation, and Z-value are determined (block 1310). The z-value is a multiplier of the standard deviation and is determined to be the minimum multiplier such that all data points of the normal behavior are contained inside the range [mean–z-value*std, mean+z-value*std]. The anomaly band is then determined for each block segment with the upper band set to (mean+z*std) and the lower band set to (mean–z*std) (block 1312). In some implementations, for each point 'x' in the dataset of normal points, the z-value can be computed as [abs (x–mean)/std], where abs ( ) refers to an absolute value.

Thus, to "apply" the anomaly band to the entire time-series data set, the entire time-series data set is partitioned into subsequences based on the seasonality pattern and for each subsequence, a mean and a standard deviation is determined (not just the top X % discussed above when determining the anomaly band). Then, the z-value is determined for each datapoint. Datapoints with a z-value larger than the boundary will be reported as anomalies.

Figure 14A:
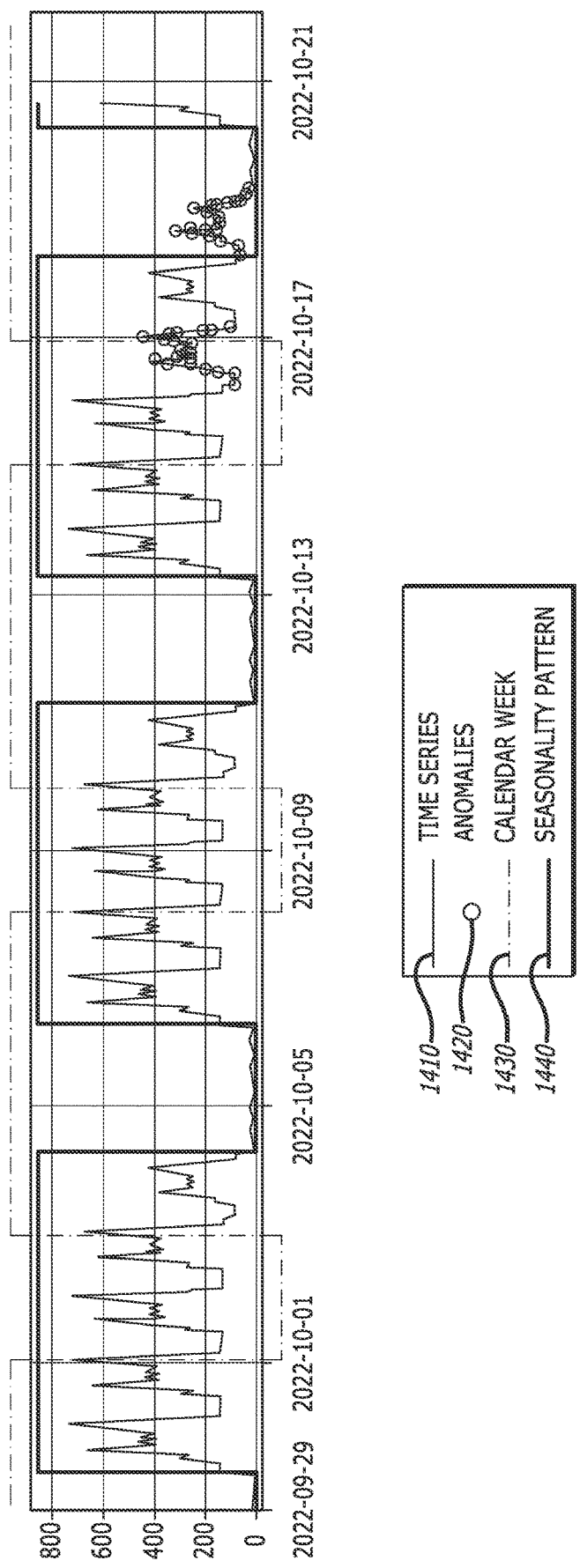
FIG. 14A is a graphical representation of a seasonality pattern corresponding to a sample time-series data and detected anomalies of the time-series data set according to some examples.
Figure 14B:
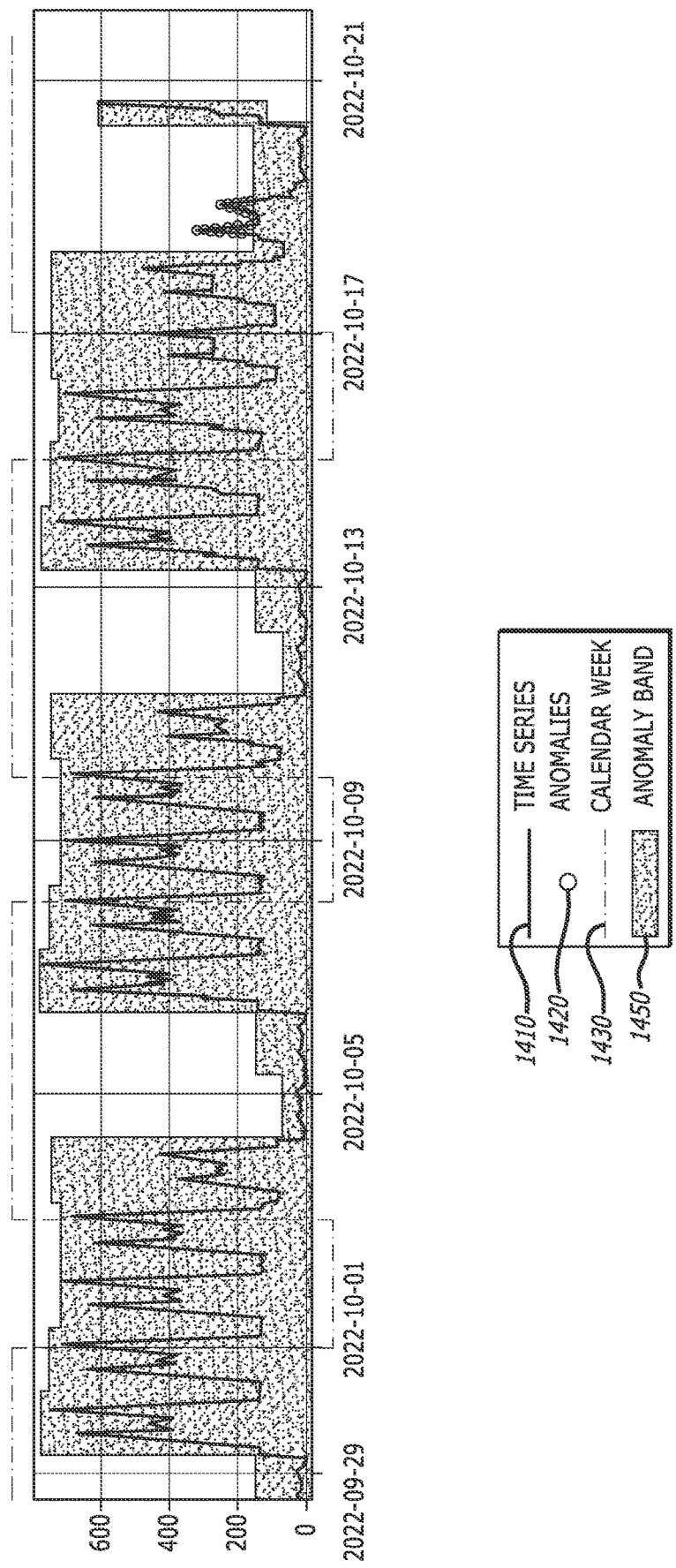
FIG. 14B is a graphical representation of a first anomaly band applied to the time-series data and the corresponding detected anomalies according to some examples.
Figure 14C:
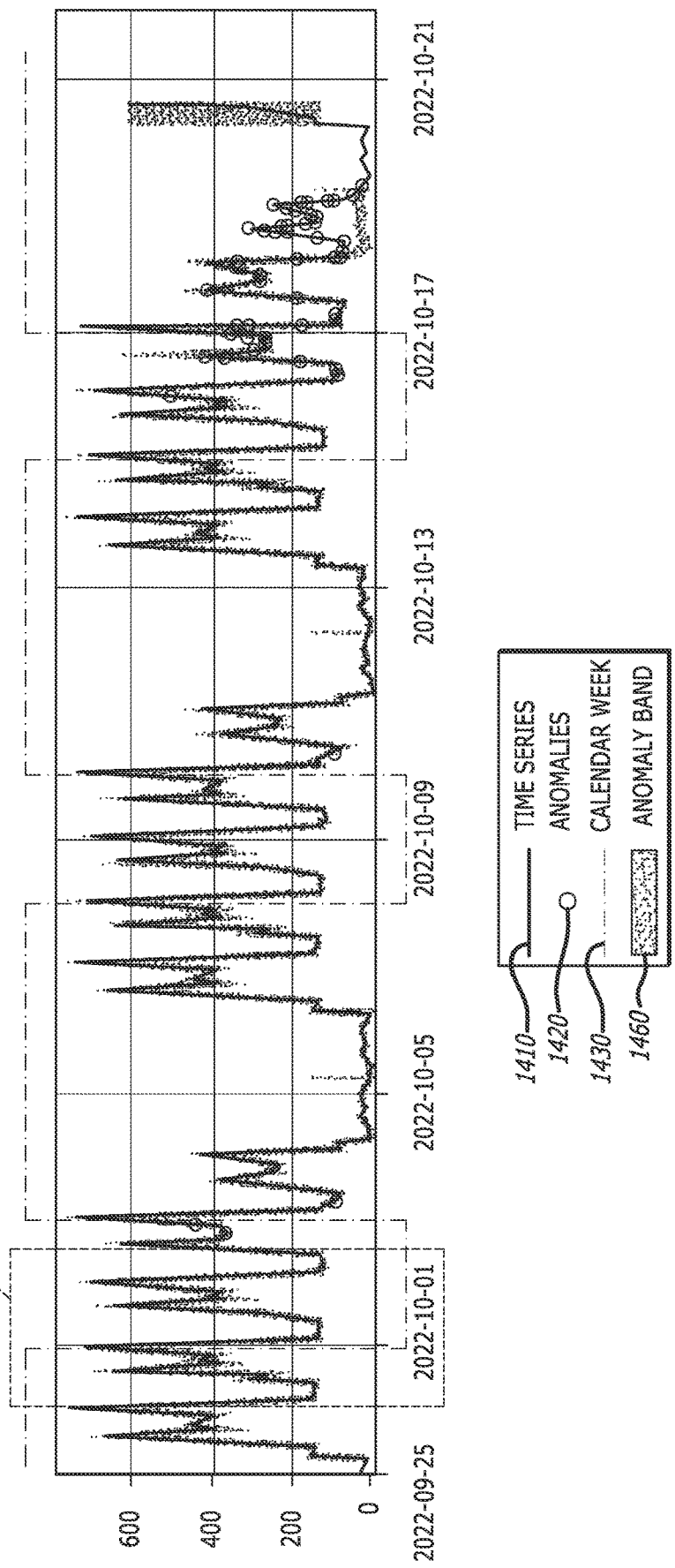
FIG. 14C is a graphical representation of a second anomaly band applied to the time-series data and the corresponding detected anomalies according to some examples.
Figure 14D:
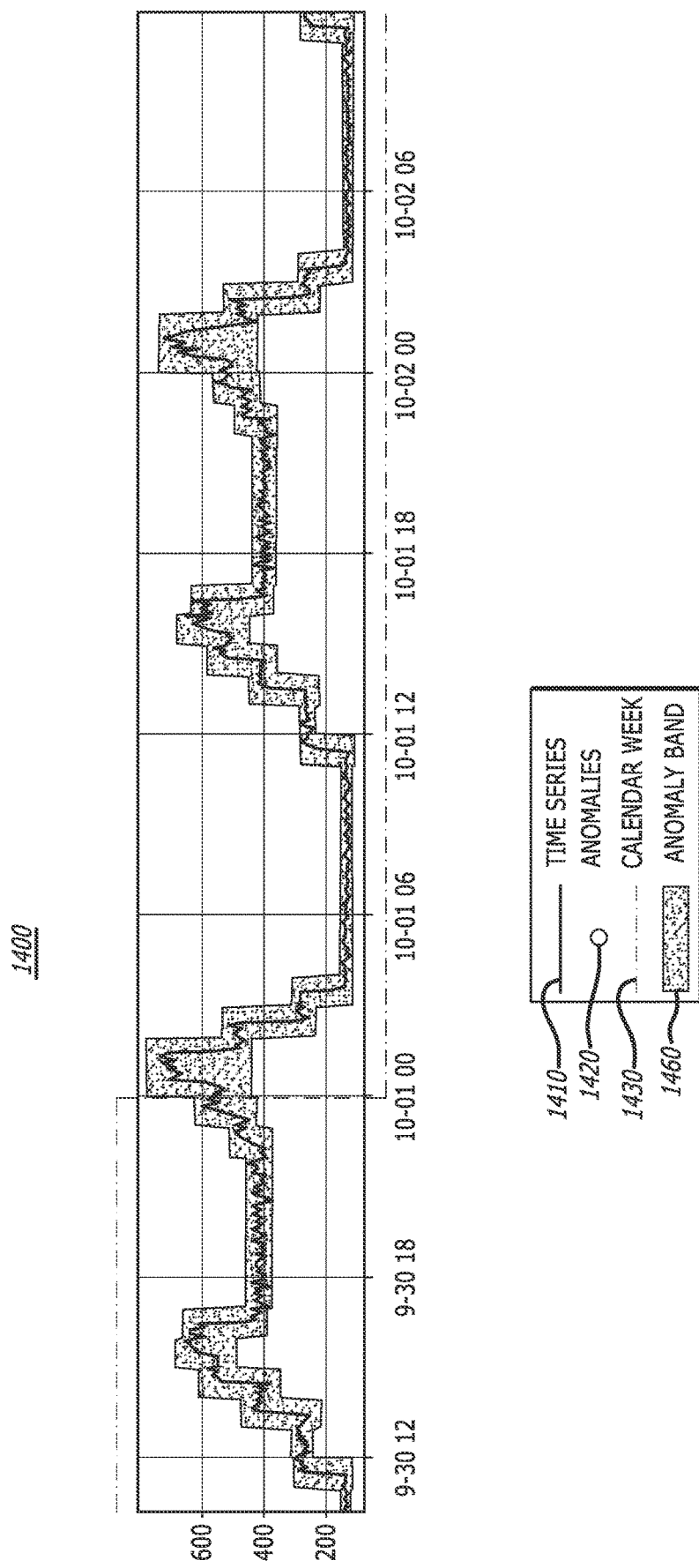
FIG. 14D is a graphical representation of a subsection of the second anomaly band applied of FIG. 14C according to some examples.

Example Graphical Representations of Silhouette-Based Seasonality Pattern Detection FIGS. 14A-14D illustrate the method 1300 of FIG. 13 in a graphical form. In particular, FIG. 14A illustrates a sample time-series data set with values of the data points ranging from 0 to approximately 780 (or slightly below 800) over the timeframe of a portion of September 2022 through a portion of October 2022. FIG. 14B represents a first anomaly band applied to the time-series data set of FIG. 14A, e.g., an anomaly band that corresponds to a weekly seasonality pattern broken into 24-hour blocks. Differently, FIGS. 14C-14D represent a second anomaly band applied to the time-series data set of FIG. 14A that is determined in accordance with the method 1300. As is seen by visually comparing the anomaly bands of FIGS. 14B-14C, the anomaly band of FIG. 14C fits much tighter to the time-series data set, e.g., is more responsive to how the time-series data set variances from a historical normal behavior as such is performed on a 1-hour basis and not a 24-hour basis. Additionally, the anomaly band as applied in FIG. 14B detects far less anomalies than the anomaly band of FIG. 14C, which illustrates that a looser anomaly band may result in numerous false negatives.

FIG. 14A is a graphical representation of a seasonality pattern corresponding to a sample time-series data and detected anomalies of the time-series data set is shown according to some examples. The graphical illustration 1400 of FIG. 14A illustrates a sample time-series data set 1410, a seasonality pattern 1440 corresponding to the time-series data set 1410, and a set of anomalies (anomalous data points) 1420. As one example, the seasonality pattern 1440 may be a result of the method 900 in which the silhouette-based methodology was utilized to determine the seasonality pattern 1440, which may a weekly pattern with two off-days on Tuesday and Wednesday. An outline of a calendar week 1430 is included to illustrate that the seasonality pattern 1440 is not synchronous to the calendar week 1430.

FIG. 14B is a graphical representation of a first anomaly band applied to the time-series data and the corresponding detected anomalies is shown according to some examples. The first anomaly band 1450 corresponds to a 24-hour subsequences being used to determine the anomaly band, e.g., which may involve determining the mean, standard deviation, and Z-value for each subsequence such that the anomaly band is the range [mean–z*std, mean+z*std] for each subsequence. Thus, the range with the 24-hour subsequence is rather large. As a result, the number of detected anomalies are smaller than the actual number of anomalies, e.g., only a portion of the anomalies 1420 seen in FIG. 14A are detected using the first anomaly band of FIG. 14B.

FIG. 14C is a graphical representation of a second anomaly band applied to the time-series data and the corresponding detected anomalies is shown according to some examples. The second anomaly band 1460 is based on the same seasonality pattern as shown in FIG. 14A but is generated following method 1300 of FIG. 13 in which the 24-hr subsequences are broken down into 1-hr segments and then operations are taken to determine whether to combine neighboring segments as discussed with FIG. 13 (e.g., block 1308). Once the segment blocks have been determined, the second anomaly band is generated by determining the mean, standard deviation, and Z-value for each segment block such that the anomaly band is the range [mean−z*std, mean+z*std] for each segment block. The second anomaly band 1460 has a much tighter fit to the time-series data set 1410 than the first anomaly band 1450. The second anomaly band 1460 also detects the full set of anomalies 1420 as indicated in FIG. 14A.

FIG. 14D is a graphical representation of a subsection of the second anomaly band applied of FIG. 14C is shown according to some examples. FIG. 14D illustrates a subsection of FIG. 14C such that the upper and lower bounds of the second anomaly band 1460 are visible. It may be understood that the subsection illustrated in FIG. 14D includes segment blocks comprised of different lengths, e.g., 1 hour, 2 hour, 4 hour, etc. For instance, the 24 hour period shown in FIG. 14D may illustrate that the 24 hour subsequence is split into thirteen 1 hour segments, one 2 hour segment, one 4 hour segment, and one 5 hour segment.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 15:
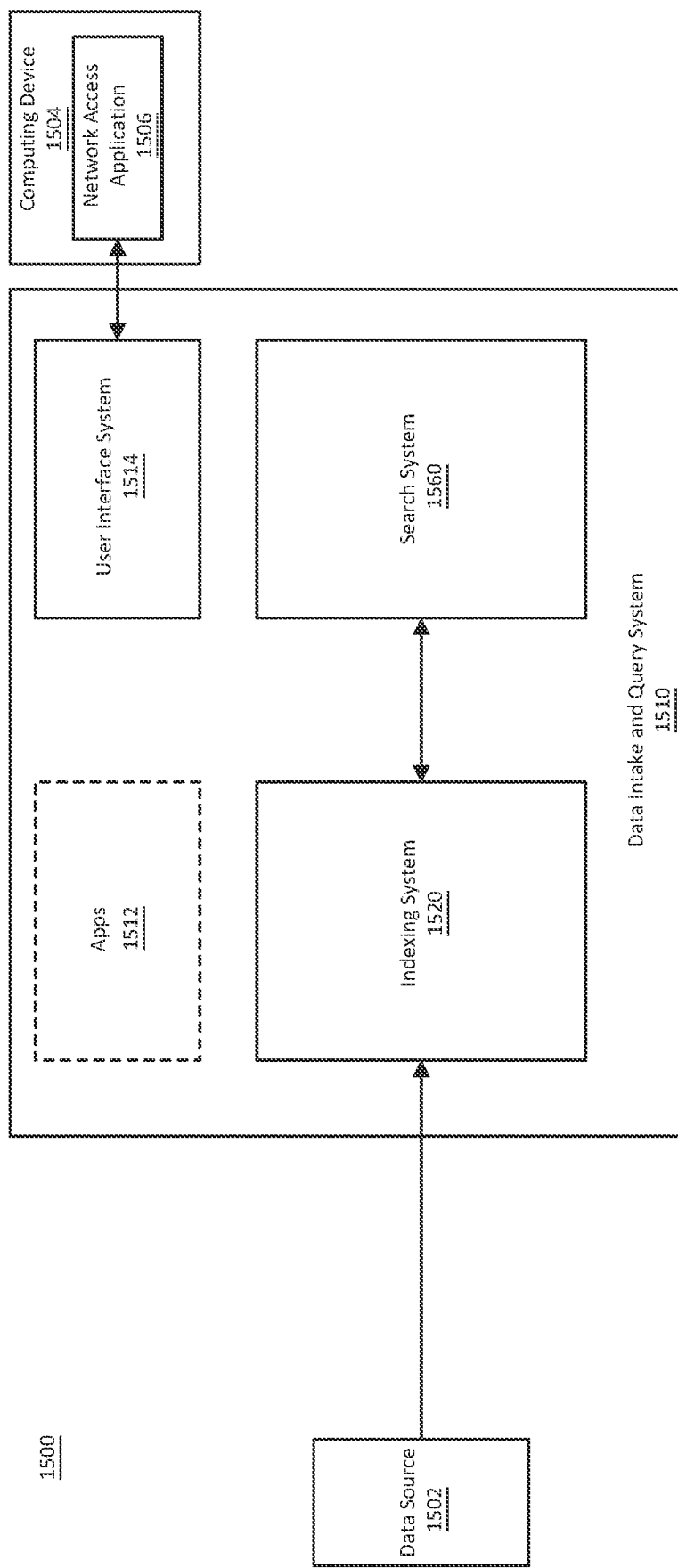
FIG. 15 is a block diagram illustrating an example computing environment that includes a data intake and query system according to some examples.

FIG. 15 is a block diagram illustrating an example computing environment 1500 that includes a data intake and query system 1510. The data intake and query system 1510 obtains data from a data source 1502 in the computing environment 1500, and ingests the data using an indexing system 1520. A search system 1560 of the data intake and query system 1510 enables users to navigate the indexed data. Though drawn with separate boxes in FIG. 15, in some implementations the indexing system 1520 and the search system 1560 can have overlapping components. A computing device 1504, running a network access application 1506, can communicate with the data intake and query system 1510 through a user interface system 1514 of the data intake and query system 1510. Using the computing device 1504, a user can perform various operations with respect to the data intake and query system 1510, such as administration of the data intake and query system 1510, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 1510 can further optionally include apps 1512 that extend the search, analytics, and/or visualization capabilities of the data intake and query system 1510.

The data intake and query system 1510 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 1510 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 1510 can be executed on a single computing device, or execution of the program code can be distributed over multiple computing devices. For example, the program code can include instructions for both indexing and search components (which may be part of the indexing system 1520 and/or the search system 1560, respectively), which can be executed on a computing device that also provides the data source 1502. As another example, the program code can be executed on one computing device, where execution of the program code provides both indexing and search components, while another copy of the program code executes on a second computing device that provides the data source 1502. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 1502 of the computing environment 1500 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 1502 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 1520 obtains machine date from the data source 1502 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 1520 does not require prior knowledge of the structure of incoming data (e.g., the indexing system 1520 does not need to be provided with a schema describing the data). Additionally, the indexing system 1520 retains a copy of the data as it was received by the indexing system 1520 such that the original data is always available for searching (e.g., no data is discarded, though, in some examples, the indexing system 1520 can be configured to do so).

The search system 1560 searches the data stored by the indexing 1520 system. As discussed in greater detail below, the search system 1560 enables users associated with the computing environment 1500 (and possibly also other users) to navigate the data, generate reports, and visualize search results in "dashboards" output using a graphical interface. Using the facilities of the search system 1560, users can obtain insights about the data, such as retrieving events from an index, calculating metrics, searching for specific conditions within a rolling time window, identifying patterns in the data, and predicting future trends, among other examples. To achieve greater efficiency, the search system 1560 can apply map-reduce methods to parallelize searching of large volumes of data. Additionally, because the original data is available, the search system 1560 can apply a schema to the data at search time. This allows different structures to be applied to the same data, or for the structure to be modified if or when the content of the data changes. Application of a schema at search time may be referred to herein as a late-binding schema technique.

The user interface system 1514 provides mechanisms through which users associated with the computing environment 1500 (and possibly others) can interact with the data intake and query system 1510. These interactions can include configuration, administration, and management of the indexing system 1520, initiation and/or scheduling of queries that are to be processed by the search system 1560, receipt or reporting of search results, and/or visualization of search results. The user interface system 1514 can include, for example, facilities to provide a command line interface or a web-based interface.

Users can access the user interface system 1514 using a computing device 1504 that communicates with data intake and query system 1510, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 1500. For example, a person can log in as a particular user and, using the user's digital information, can access the data intake and query system 1510. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 1504 can provide a human-machine interface through which a person can have a digital presence in the computing environment 1500 in the form of a user. The computing device 1504 is an electronic device having one or more processors and a memory capable of storing instructions for execution by the one or more processors. The computing device 1504 can further include input/output (I/O) hardware and a network interface. Applications executed by the computing device 1504 can include a network access application 1506, such as a web browser, which can use a network interface of the client computing device 1504 to communicate, over a network, with the user interface system 1514 of the data intake and query system 1510. The user interface system 1514 can use the network access application 1506 to generate user interfaces that enable a user to interact with the data intake and query system 1510. A web browser is one example of a network access application. A shell tool can also be used as a network access application. In some examples, the data intake and query system 1510 is an application executing on the computing device 1506. In such examples, the network access application 1506 can access the user interface system 1514 without going over a network.

The data intake and query system 1510 can optionally include apps 1512. An app of the data intake and query system 1510 is a collection of configurations, knowledge objects (a user-defined entity that enriches the data in the data intake and query system 1510), views, and dashboards that may provide additional functionality, different techniques for searching the data, and/or additional insights into the data. The data intake and query system 1510 can execute multiple applications simultaneously. Example applications include an information technology service intelligence application, which can monitor and analyze the performance and behavior of the computing environment 1500, and an enterprise security application, which can include content and searches to assist security analysts in diagnosing and acting on anomalous or malicious behavior in the computing environment 1500.

Though FIG. 15 illustrates only one data source, in practical implementations, the computing environment 1500 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 1500, the data intake and query system 1510 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 1500 can include on-prem and cloud-based computing resources, or only cloud-based resources. For example, an entity may have on-prem computing devices and a private cloud. In this example, the entity operates the data intake and query system 1510 and can choose to execute the data intake and query system 1510 on an on-prem computing device or in the cloud. In another example, a provider entity operates the data intake and query system 1510 in a public cloud and provides the functionality of the data intake and query system 1510 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 1510. In some implementations, the entity providing the data intake and query system 1510 is itself subscribing to the cloud services of a cloud service provider. As an example, a first entity provides computing resources under a public cloud service model, a second entity subscribes to the cloud services of the first provider entity and uses the cloud computing resources to operate the data intake and query system 1510, and a third entity can subscribe to the services of the second provider entity in order to use the functionality of the data intake and query system 1510. In this example, the data sources are associated with the third entity, users accessing the data intake and query system 1510 are associated with the third entity, and the analytics and insights provided by the data intake and query system 1510 are for purposes of the third entity's operations.

Figure 16:
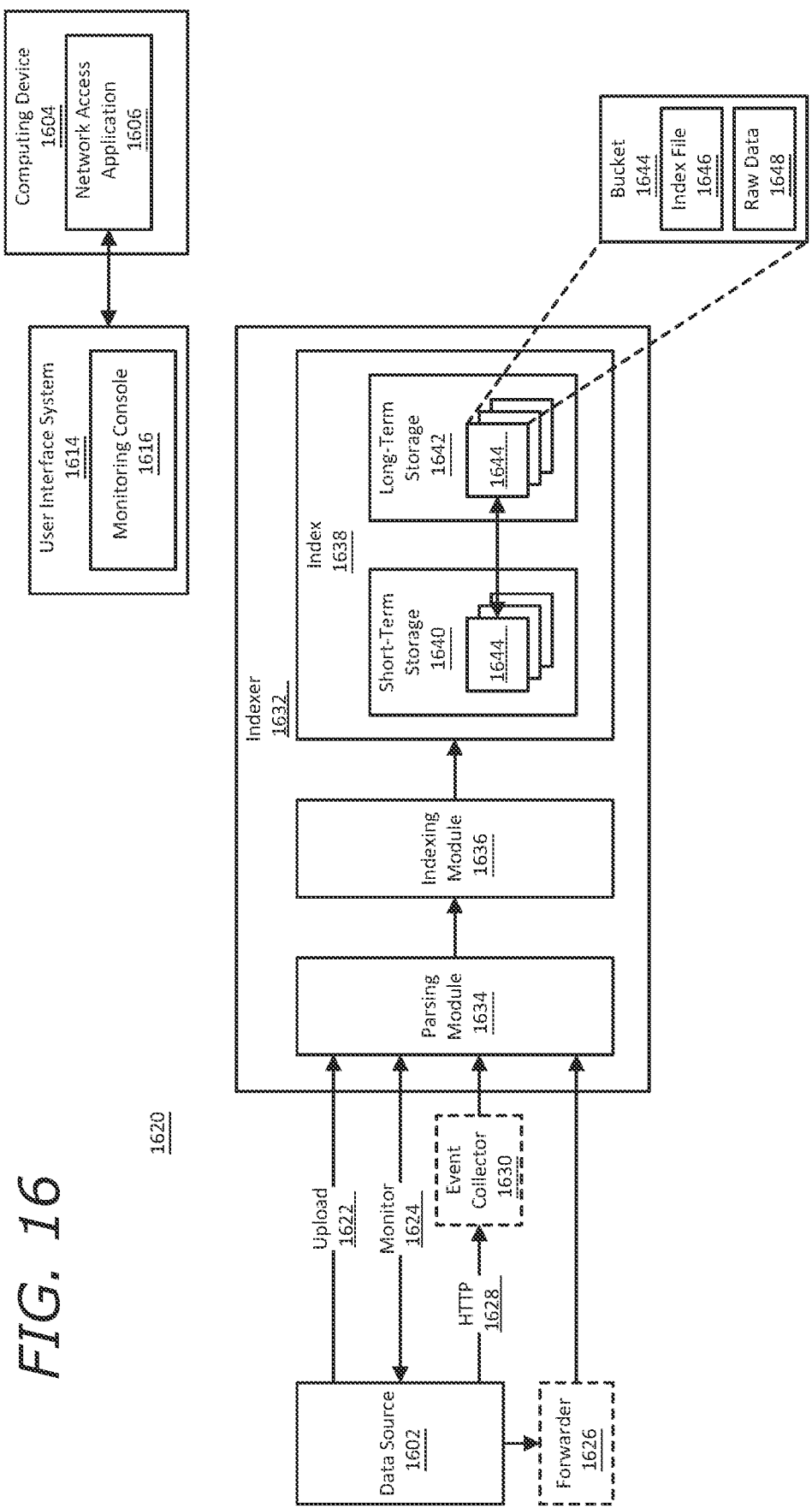
FIG. 16 is a block diagram illustrating in greater detail an example of an indexing system of a data intake and query system, such as the data intake and query system of FIG. 15 according to some examples.

FIG. 16 is a block diagram illustrating in greater detail an example of an indexing system 1620 of a data intake and query system, such as the data intake and query system 1510 of FIG. 15. The indexing system 1620 of FIG. 16 uses various methods to obtain machine data from a data source 1602 and stores the data in an index 1638 of an indexer 1632. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 1620 enables the data intake and query system to obtain the machine data produced by the data source 1602 and to store the data for searching and retrieval.

Users can administer the operations of the indexing system 1620 using a computing device 1604 that can access the indexing system 1620 through a user interface system 1614 of the data intake and query system. For example, the computing device 1604 can be executing a network access application 1606, such as a web browser or a terminal, through which a user can access a monitoring console 1616 provided by the user interface system 1614. The monitoring console 1616 can enable operations such as: identifying the data source 1602 for data ingestion; configuring the indexer 1632 to index the data from the data source 1632; configuring a data ingestion method; configuring, deploying, and managing clusters of indexers; and viewing the topology and performance of a deployment of the data intake and query system, among other operations. The operations performed by the indexing system 1620 may be referred to as "index time" operations, which are distinct from "search time" operations that are discussed further below.

The indexer 1632, which may be referred to herein as a data indexing component, coordinates and performs most of the index time operations. The indexer 1632 can be implemented using program code that can be executed on a computing device. The program code for the indexer 1632 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 1632. In some implementations, the indexer 1632 executes on the computing device 1604 through which a user can access the indexing system 1620. In some implementations, the indexer 1632 executes on a different computing device than the illustrated computing device 1604.

The indexer 1632 may be executing on the computing device that also provides the data source 1602 or may be executing on a different computing device. In implementations wherein the indexer 1632 is on the same computing device as the data source 1602, the data produced by the data source 1602 may be referred to as "local data." In other implementations the data source 1602 is a component of a first computing device and the indexer 1632 executes on a second computing device that is different from the first computing device. In these implementations, the data produced by the data source 1602 may be referred to as "remote data." In some implementations, the first computing device is "on-prem" and in some implementations the first computing device is "in the cloud." In some implementations, the indexer 1632 executes on a computing device in the cloud and the operations of the indexer 1632 are provided as a service to entities that subscribe to the services provided by the data intake and query system.

For a given data produced by the data source 1602, the indexing system 1620 can be configured to use one of several methods to ingest the data into the indexer 1632. These methods include upload 1622, monitor 1624, using a forwarder 1626, or using HyperText Transfer Protocol (HTTP 1628) and an event collector 1630. These and other methods for data ingestion may be referred to as "getting data in" (GDI) methods.

Using the upload 1622 method, a user can specify a file for uploading into the indexer 1632. For example, the monitoring console 1616 can include commands or an interface through which the user can specify where the file is located (e.g., on which computing device and/or in which directory of a file system) and the name of the file. The file may be located at the data source 1602 or maybe on the computing device where the indexer 1632 is executing. Once uploading is initiated, the indexer 1632 processes the file, as discussed further below. Uploading is a manual process and occurs when instigated by a user. For automated data ingestion, the other ingestion methods are used.

The monitor 1624 method enables the indexing system 1602 to monitor the data source 1602 and continuously or periodically obtain data produced by the data source 1602 for ingestion by the indexer 1632. For example, using the monitoring console 1616, a user can specify a file or directory for monitoring. In this example, the indexing system 1602 can execute a monitoring process that detects whenever the file or directory is modified and causes the file or directory contents to be sent to the indexer 1632. As another example, a user can specify a network port for monitoring. In this example, a monitoring process can capture data received at or transmitting from the network port and cause the data to be sent to the indexer 1632. In various examples, monitoring can also be configured for data sources such as operating system event logs, performance data generated by an operating system, operating system registries, operating system directory services, and other data sources.

Monitoring is available when the data source 1602 is local to the indexer 1632 (e.g., the data source 1602 is on the computing device where the indexer 1632 is executing). Other data ingestion methods, including forwarding and the event collector 1630, can be used for either local or remote data sources.

A forwarder 1626, which may be referred to herein as a data forwarding component, is a software process that sends data from the data source 1602 to the indexer 1632. The forwarder 1626 can be implemented using program code that can be executed on the computer device that provides the data source 1602. A user launches the program code for the forwarder 1626 on the computing device that provides the data source 1602. The user can further configure the forwarder 1626, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 1626 can provide various capabilities. For example, the forwarder 1626 can send the data unprocessed or can perform minimal processing on the data before sending the data to the indexer 1632. Minimal processing can include, for example, adding metadata tags to the data to identify a source, source type, and/or host, among other information, dividing the data into blocks, and/or applying a timestamp to the data. In some implementations, the forwarder 1626 can break the data into individual events (event generation is discussed further below) and send the events to a receiver. Other operations that the forwarder 1626 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 1630 provides an alternate method for obtaining data from the data source 1602. The event collector 1630 enables data and application events to be sent to the indexer 1632 using HTTP 1628. The event collector 1630 can be implemented using program code that can be executing on a computing device. The program code may be a component of the data intake and query system or can be a standalone component that can be executed independently of the data intake and query system and operates in cooperation with the data intake and query system.

To use the event collector 1630, a user can, for example using the monitoring console 1616 or a similar interface provided by the user interface system 1614, enable the event collector 1630 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 1602 as an alternative method to using a username and password for authentication.

To send data to the event collector 1630, the data source 1602 is supplied with a token and can then send HTTP 1628 requests to the event collector 1630. To send HTTP 1628 requests, the data source 1602 can be configured to use an HTTP client and/or to use logging libraries such as those supplied by Java, JavaScript, and .NET libraries. An HTTP client enables the data source 1602 to send data to the event collector 1630 by supplying the data, and a Uniform Resource Identifier (URI) for the event collector 1630 to the HTTP client. The HTTP client then handles establishing a connection with the event collector 1630, transmitting a request containing the data, closing the connection, and receiving an acknowledgment if the event collector 1630 sends one. Logging libraries enable HTTP 1628 requests to the event collector 1630 to be generated directly by the data source. For example, an application can include or link a logging library, and through functionality provided by the logging library manage establishing a connection with the event collector 1630, transmitting a request, and receiving an acknowledgement.

An HTTP 1628 request to the event collector 1630 can contain a token, a channel identifier, event metadata, and/or event data. The token authenticates the request with the event collector 1630. The channel identifier, if available in the indexing system 1620, enables the event collector 1630 to segregate and keep separate data from different data sources. The event metadata can include one or more key-value pairs that describe the data source 1602 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 1630 extracts events from HTTP 1628 requests and sends the events to the indexer 1632. The event collector 1630 can further be configured to send events to one or more indexers. Extracting the events can include associating any metadata in a request with the event or events included in the request. In these implementations, event generation by the indexer 1632 (discussed further below) is bypassed, and the indexer 1632 moves the events directly to indexing. In some implementations, the event collector 1630 extracts event data from a request and outputs the event data to the indexer 1632, and the indexer generates events from the event data. In some implementations, the event collector 1630 sends an acknowledgement message to the data source 1602 to indicate that the event collector 1630 has received a particular request form the data source 1602, and/or to indicate to the data source 1602 that events in the request have been added to an index.

The indexer 1632 ingests incoming data and transforms the data into searchable knowledge in the form of events. In the data intake and query system, an event is a single piece of data that represents activity of the component represented in FIG. 16 by the data source 1602. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 1632 can include a parsing module 1634 and an indexing module 1636 for generating and storing the events. The parsing module 1634 and indexing module 1636 can be modular and pipelined, such that one component can be operating on a first set of data while the second component is simultaneously operating on a second sent of data. Additionally, the indexer 1632 may at any time have multiple instances of the parsing module 1634 and indexing module 1636, with each set of instances configured to simultaneously operate on data from the same data source or from different data sources. The parsing module 1634 and indexing module 1636 are illustrated in FIG. 16 to facilitate discussion, with the understanding that implementations with other components are possible to achieve the same functionality.

The parsing module 1634 determines information about incoming event data, where the information can be used to identify events within the event data. For example, the parsing module 1634 can associate a source type with the event data. A source type identifies the data source 1602 and describes a possible data structure of event data produced by the data source 1602. For example, the source type can indicate which fields to expect in events generated at the data source 1602 and the keys for the values in the fields, and possibly other information such as sizes of fields, an order of the fields, a field separator, and so on. The source type of the data source 1602 can be specified when the data source 1602 is configured as a source of event data. Alternatively, the parsing module 1634 can determine the source type from the event data, for example from an event field in the event data or using machine learning techniques applied to the event data.

Other information that the parsing module 1634 can determine includes timestamps. In some cases, an event includes a timestamp as a field, and the timestamp indicates a point in time when the action represented by the event occurred or was recorded by the data source 1602 as event data. In these cases, the parsing module 1634 may be able to determine from the source type associated with the event data that the timestamps can be extracted from the events themselves. In some cases, an event does not include a timestamp and the parsing module 1634 determines a timestamp for the event, for example from a name associated with the event data from the data source 1602 (e.g., a file name when the event data is in the form of a file) or a time associated with the event data (e.g., a file modification time). As another example, when the parsing module 1634 is not able to determine a timestamp from the event data, the parsing module 1634 may use the time at which it is indexing the event data. As another example, the parsing module 1634 can use a user-configured rule to determine the timestamps to associate with events.

The parsing module 1634 can further determine event boundaries. In some cases, a single line (e.g., a sequence of characters ending with a line termination) in event data represents one event while in other cases, a single line represents multiple events. In yet other cases, one event may span multiple lines within the event data. The parsing module 1634 may be able to determine event boundaries from the source type associated with the event data, for example from a data structure indicated by the source type. In some implementations, a user can configure rules the parsing module 1634 can use to identify event boundaries.

The parsing module 1634 can further extract data from events and possibly also perform transformations on the events. For example, the parsing module 1634 can extract a set of fields (key-value pairs) for each event, such as a host or hostname, source or source name, and/or source type. The parsing module 1634 may extract certain fields by default or based on a user configuration. Alternatively or additionally, the parsing module 1634 may add fields to events, such as a source type or a user-configured field. As another example of a transformation, the parsing module 1634 can anonymize fields in events to mask sensitive information, such as social security numbers or account numbers. Anonymizing fields can include changing or replacing values of specific fields. The parsing component 1634 can further perform user-configured transformations.

The parsing module 1634 outputs the results of processing incoming event data to the indexing module 1636, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 1632 can be configured to identify searchable segments that are parts of fields, searchable segments that are entire fields, or both. The parsing module 1634 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 1646, to find event data that matches a search query. In some implementations, segmentation can alternatively be performed by the forwarder 1626. Segmentation can also be disabled, in which case the indexer 1632 will not build a lexicon for the event data. When segmentation is disabled, the search system searches the event data directly.

Building index data structures generates the index 1638. The index 1638 is a storage data structure on a storage device (e.g., a disk drive or other physical device for storing digital data). The storage device may be a component of the computing device on which the indexer 1632 is operating (referred to herein as local storage) or may be a component of a different computing device (referred to herein as remote storage) that the indexer 1638 has access to over a network. The indexer 1632 can manage more than one index and can manage indexes of different types. For example, the indexer 1632 can manage event indexes, which impose minimal structure on stored data and can accommodate any type of data. As another example, the indexer 1632 can manage metrics indexes, which use a highly structured format to handle the higher volume and lower latency demands associated with metrics data.

The indexing module 1636 organizes files in the index 1638 in directories referred to as buckets. The files in a bucket 1644 can include raw data files, index files, and possibly also other metadata files. As used herein, "raw data" means data as when the data was produced by the data source 1602, without alteration to the format or content. As noted previously, the parsing component 1634 may add fields to event data and/or perform transformations on fields in the event data. Event data that has been altered in this way is referred to herein as enriched data. A raw data file 1648 can include enriched data, in addition to or instead of raw data. The raw data file 1648 may be compressed to reduce disk usage. An index file 1646, which may also be referred to herein as a "time-series index" or tsidx file, contains metadata that the indexer 1632 can use to search a corresponding raw data file 1648. As noted above, the metadata in the index file 1646 includes a lexicon of the event data, which associates each unique keyword in the event data with a reference to the location of event data within the raw data file 1648. The keyword data in the index file 1646 may also be referred to as an inverted index. In various implementations, the data intake and query system can use index files for other purposes, such as to store data summarizations that can be used to accelerate searches.

A bucket 1644 includes event data for a particular range of time. The indexing module 1636 arranges buckets in the index 1638 according to the age of the buckets, such that buckets for more recent ranges of time are stored in short-term storage 1640 and buckets for less recent ranges of time are stored in long-term storage 1642. Short-term storage 1640 may be faster to access while long-term storage 1642 may be slower to access. Buckets may be moves from short-term storage 1640 to long-term storage 1642 according to a configurable data retention policy, which can indicate at what point in time a bucket is old enough to be moved.

A bucket's location in short-term storage 1640 or long-term storage 1642 can also be indicated by the bucket's status. As an example, a bucket's status can be "hot," "warm," "cold," "frozen," or "thawed." In this example, hot bucket is one to which the indexer 1632 is writing data and the bucket becomes a warm bucket when the index 1632 stops writing data to it. In this example, both hot and warm buckets reside in short-term storage 1640. Continuing this example, when a warm bucket is moved to long-term storage 1642, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 1620 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 1620 through the monitoring console 1616 provided by the user interface system 1614. Using the monitoring console 1616, the user can configure and monitor an index cluster, and see information such as disk usage by an index, volume usage by an indexer, index and volume size over time, data age, statistics for bucket types, and bucket settings, among other information.

Figure 17:
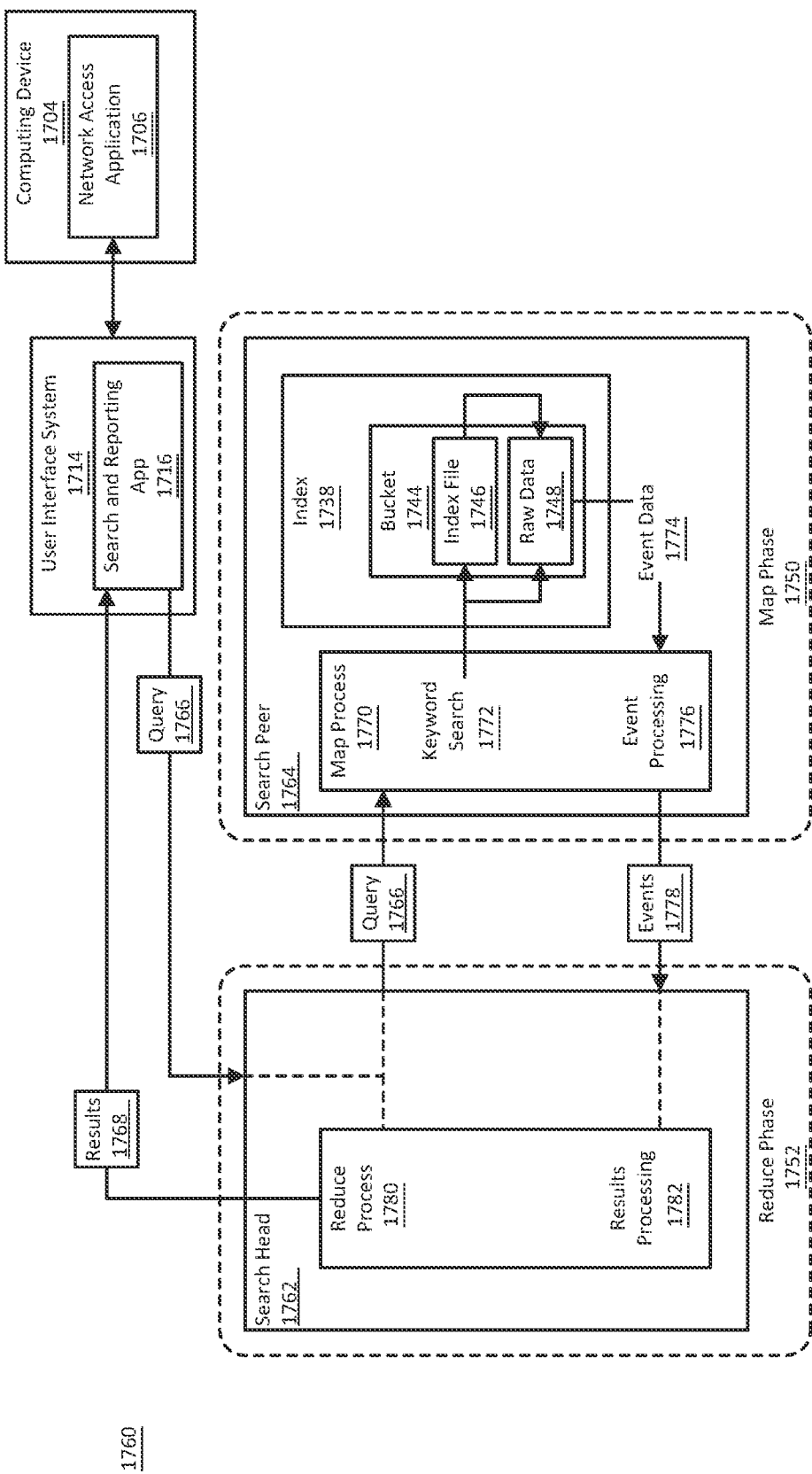
FIG. 17 is a block diagram illustrating in greater detail an example of the search system of a data intake and query system, such as the data intake and query system of FIG. 15 according to some examples.

FIG. 17 is a block diagram illustrating in greater detail an example of the search system 1760 of a data intake and query system, such as the data intake and query system 1510 of FIG. 15. The search system 1760 of FIG. 17 issues a query 1766 to a search head 1762, which sends the query 1766 to a search peer 1764. Using a map process 1770, the search peer 1764 searches the appropriate index 1738 for events identified by the query 1766 and sends events 1778 so identified back to the search head 1762. Using a reduce process 1782, the search head 1762 processes the events 1778 and produces results 1768 to respond to the query 1766. The results 1768 can provide useful insights about the data stored in the index 1738. These insights can aid in the administration of information technology systems, in security analysis of information technology systems, and/or in analysis of the development environment provided by information technology systems.

The query 1766 that initiates a search is produced by a search and reporting app 1716 that is available through the user interface system 1714 of the data intake and query system. Using a network access application 1706 executing on a computing device 1704, a user can input the query 1766 into a search field provided by the search and reporting app 1716. Alternatively or additionally, the search and reporting app 1716 can include pre-configured queries or stored queries that can be activated by the user. In some cases, the search and reporting app 1716 initiates the query 1766 when the user enters the query 1766. In these cases, the query 1766 maybe referred to as an "ad-hoc" query. In some cases, the search and reporting app 1716 initiates the query 1766 based on a schedule. For example, the search and reporting app 1716 can be configured to execute the query 1766 once per hour, once per day, at a specific time, on a specific date, or at some other time that can be specified by a date, time, and/or frequency. These types of queries maybe referred to as scheduled queries.

The query 1766 is specified using a search processing language. The search processing language includes commands or search terms that the search peer 1764 will use to identify events to return in the search results 1768. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 1766 to include sequential commands, where a subsequent command may operate on the results of a prior command. As an example, sequential commands may be separated in the query 1766 by a vertical line ("|" or "pipe") symbol.

In addition to one or more search commands, the query 1766 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 1766 occurs in two broad phases: a map phase 1750 and a reduce phase 1752. The map phase 1750 takes place across one or more search peers. In the map phase 1750, the search peers locate event data that matches the search terms in the search query 1766 and sorts the event data into field-value pairs. When the map phase 1750 is complete, the search peers send events that they have found to one or more search heads for the reduce phase 1752. During the reduce phase 1752, the search heads process the events through commands in the search query 1766 and aggregate the events to produce the final search results 1768.

A search head, such as the search head 1762 illustrated in FIG. 17, is a component of the search system 1760 that manages searches. The search head 1762, which may also be referred to herein as a search management component, can be implemented using program code that can be executed on a computing device. The program code for the search head 1762 can be stored on a non-transitory computer-readable medium and from this medium can be loaded or copied to the memory of a computing device. One or more hardware processors of the computing device can read the program code from the memory and execute the program code in order to implement the operations of the search head 1762.

Upon receiving the search query 1766, the search head 1762 directs the query 1766 to one or more search peers, such as the search peer 1764 illustrated in FIG. 17. "Search peer" is an alternate name for "indexer" and a search peer may be largely similar to the indexer described previously. The search peer 1764 may be referred to as a "peer node" when the search peer 1764 is part of an indexer cluster. The search peer 1764, which may also be referred to as a search execution component, can be implemented using program code that can be executed on a computing device. In some implementations, one set of program code implements both the search head 1762 and the search peer 1764 such that the search head 1762 and the search peer 1764 form one component. In some implementations, the search head 1762 is an independent piece of code that performs searching and no indexing functionality. In these implementations, the search head 1762 may be referred to as a dedicated search head.

The search head 1762 may consider multiple criteria when determining whether to send the query 1766 to the particular search peer 1764. For example, the search system 1760 may be configured to include multiple search peers that each have duplicative copies of at least some of the event data and are implanted using different hardware resources q. In this example, the sending the search query 1766 to more than one search peer allows the search system 1760 to distribute the search workload across different hardware resources. As another example, search system 1760 may include different search peers for different purposes (e.g., one has an index storing a first type of data or from a first data source while a second has an index storing a second type of data or from a second data source). In this example, the search query 1766 may specify which indexes to search, and the search head 1762 will send the query 1766 to the search peers that have those indexes.

To identify events 1778 to send back to the search head 1762, the search peer 1764 performs a map process 1770 to obtain event data 1774 from the index 1738 that is maintained by the search peer 1764. During a first phase of the map process 1770, the search peer 1764 identifies buckets that have events that are described by the time indicator in the search query 1766. As noted above, a bucket contains events whose timestamps fall within a particular range of time. For each bucket 1744 whose events can be described by the time indicator, during a second phase of the map process 1770, the search peer 1764 performs a keyword search 1774 using search terms specified in the search query 1766. The search terms can be one or more of keywords, phrases, fields, Boolean expressions, and/or comparison expressions that in combination describe events being searched for. When segmentation is enabled at index time, the search peer 1764 performs the keyword search 1772 on the bucket's index file 1746. As noted previously, the index file 1746 includes a lexicon of the searchable terms in the events stored in the bucket's raw data 1748 file. The keyword search 1772 searches the lexicon for searchable terms that correspond to one or more of the search terms in the query 1766. As also noted above, the lexicon incudes, for each searchable term, a reference to each location in the raw data 1748 file where the searchable term can be found. Thus, when the keyword search identifies a searchable term in the index file 1746 that matches a search term in the query 1766, the search peer 1764 can use the location references to extract from the raw data 1748 file the event data 1774 for each event that include the searchable term.

In cases where segmentation was disabled at index time, the search peer 1764 performs the keyword search 1772 directly on the raw data 1748 file. To search the raw data 1748, the search peer 1764 may identify searchable segments in events in a similar manner as when the data was indexed. Thus, depending on how the search peer 1764 is configured, the search peer 1764 may look at event fields and/or parts of event fields to determine whether an event matches the query 1766. Any matching events can be added to the event data 1774 read from the raw data 1748 file. The search peer 1764 can further be configured to enable segmentation at search time, so that searching of the index 1738 causes the search peer 1764 to build a lexicon in the index file 1746.

The event data 1774 obtained from the raw data 1748 file includes the full text of each event found by the keyword search 1772. During a third phase of the map process 1770, the search peer 1764 performs event processing 1776 on the event data 1774, with the steps performed being determined by the configuration of the search peer 1764 and/or commands in the search query 1766. For example, the search peer 1764 can be configured to perform field discovery and field extraction. Field discovery is a process by which the search peer 1764 identifies and extracts key-value pairs from the events in the event data 1774. The search peer 1764 can, for example, be configured to automatically extract the first 100 fields (or another number of fields) in the event data 1774 that can be identified as key-value pairs. As another example, the search peer 1764 can extract any fields explicitly mentioned in the search query 1766. The search peer 1764 can, alternatively or additionally, be configured with particular field extractions to perform.

Other examples of steps that can be performed during event processing 1776 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 1764 sends processed events 1778 to the search head 1762, which performs a reduce process 1780. The reduce process 1780 potentially receives events from multiple search peers and performs various results processing 1782 steps on the received events. The results processing 1782 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 1782 can further include applying commands from the search query 1766 to the events. The query 1766 can include, for example, commands for evaluating and/or manipulating fields (e.g., to generate new fields from existing fields or parse fields that have more than one value). As another example, the query 1766 can include commands for calculating statistics over the events, such as counts of the occurrences of fields, or sums, averages, ranges, and so on, of field values. As another example, the query 1766 can include commands for generating statistical values for purposes of generating charts of graphs of the events.

The reduce process 1780 outputs the events found by the search query 1766, as well as information about the events. The search head 1762 transmits the events and the information about the events as search results 1768, which are received by the search and reporting app 1716. The search and reporting app 1716 can generate visual interfaces for viewing the search results 1768. The search and reporting app 1716 can, for example, output visual interfaces for the network access application 1706 running on a computing device 1704 to generate.

The visual interfaces can include various visualizations of the search results 1768, such as tables, line or area charts, Chloropleth maps, or single values. The search and reporting app 1716 can organize the visualizations into a dashboard, where the dashboard includes a panel for each visualization. A dashboard can thus include, for example, a panel listing the raw event data for the events in the search results 1768, a panel listing fields extracted at index time and/or found through field discovery along with statistics for those fields, and/or a timeline chart indicating how many events occurred at specific points in time (as indicated by the timestamps associated with each event). In various implementations, the search and reporting app 1716 can provide one or more default dashboards. Alternatively or additionally, the search and reporting app 1716 can include functionality that enables a user to configure custom dashboards.

The search and reporting app 1716 can also enable further investigation into the events in the search results 1716. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 1766. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 18:
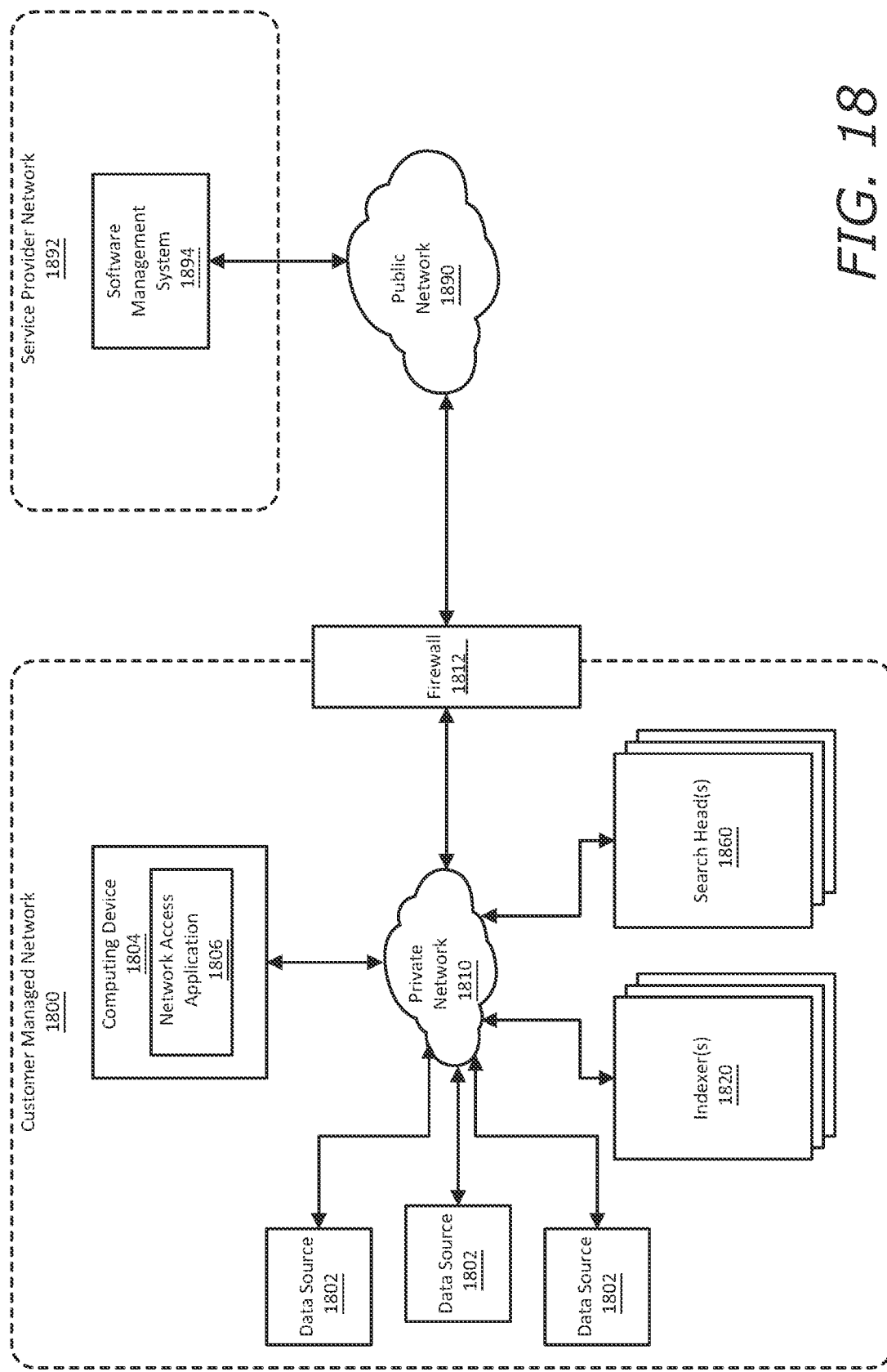
FIG. 18 illustrates an example of a self-managed network 1800 that includes a data intake and query system according to some examples.

FIG. 18 illustrates an example of a self-managed network 1800 that includes a data intake and query system. "Self-managed" in this instance means that the entity that is operating the self-managed network 1800 configures, administers, maintains, and/or operates the data intake and query system using its own compute resources and people. Further, the self-managed network 1800 of this example is part of the entity's on-premise network and comprises a set of compute, memory, and networking resources that are located, for example, within the confines of an entity's data center. These resources can include software and hardware resources. The entity can, for example, be a company or enterprise, a school, government entity, or other entity. Since the self-managed network 1800 is located within the customer's on-prem environment, such as in the entity's data center, the operation and management of the self-managed network 1800, including of the resources in the self-managed network 1800, is under the control of the entity. For example, administrative personnel of the entity have complete access to and control over the configuration, management, and security of the self-managed network 1800 and its resources.

The self-managed network 1800 can execute one or more instances of the data intake and query system. An instance of the data intake and query system may be executed by one or more computing devices that are part of the self-managed network 1800. A data intake and query system instance can comprise an indexing system and a search system, where the indexing system includes one or more indexers 1820 and the search system includes one or more search heads 1860.

As depicted in FIG. 18, the self-managed network 1800 can include one or more data sources 1802. Data received from these data sources may be processed by an instance of the data intake and query system within self-managed network 1800. The data sources 1802 and the data intake and query system instance can be communicatively coupled to each other via a private network 1810.

Users associated with the entity can interact with and avail themselves of the functions performed by a data intake and query system instance using computing devices. As depicted in FIG. 18, a computing device 1804 can execute a network access application 1806 (e.g., a web browser), that can communicate with the data intake and query system instance and with data sources 1802 via the private network 1810. Using the computing device 1804, a user can perform various operations with respect to the data intake and query system, such as management and administration of the data intake and query system, generation of knowledge objects, and other functions. Results generated from processing performed by the data intake and query system instance may be communicated to the computing device 1804 and output to the user via an output system (e.g., a screen) of the computing device 1804.

The self-managed network 1800 can also be connected to other networks that are outside the entity's on-premise environment/network, such as networks outside the entity's data center. Connectivity to these other external networks is controlled and regulated through one or more layers of security provided by the self-managed network 1800. One or more of these security layers can be implemented using firewalls 1812. The firewalls 1812 form a layer of security around the self-managed network 1800 and regulate the transmission of traffic from the self-managed network 1800 to the other networks and from these other networks to the self-managed network 1800.

Networks external to the self-managed network can include various types of networks including public networks 1890, other private networks, and/or cloud networks provided by one or more cloud service providers. An example of a public network 1890 is the Internet. In the example depicted in FIG. 18, the self-managed network 1800 is connected to a service provider network 1892 provided by a cloud service provider via the public network 1890.

In some implementations, resources provided by a cloud service provider may be used to facilitate the configuration and management of resources within the self-managed network 1800. For example, configuration and management of a data intake and query system instance in the self-managed network 1800 may be facilitated by a software management system 1894 operating in the service provider network 1892. There are various ways in which the software management system 1894 can facilitate the configuration and management of a data intake and query system instance within the self-managed network 1800. As one example, the software management system 1894 may facilitate the download of software including software updates for the data intake and query system. In this example, the software management system 1894 may store information indicative of the versions of the various data intake and query system instances present in the self-managed network 1800. When a software patch or upgrade is available for an instance, the software management system 1894 may inform the self-managed network 1800 of the patch or upgrade. This can be done via messages communicated from the software management system 1894 to the self-managed network 1800.

The software management system 1894 may also provide simplified ways for the patches and/or upgrades to be downloaded and applied to the self-managed network 1800. For example, a message communicated from the software management system 1894 to the self-managed network 1800 regarding a software upgrade may include a Uniform Resource Identifier (URI) that can be used by a system administrator of the self-managed network 1800 to download the upgrade to the self-managed network 1800. In this manner, management resources provided by a cloud service provider using the service provider network 1892 and which are located outside the self-managed network 1800 can be used to facilitate the configuration and management of one or more resources within the entity's on-prem environment. In some implementations, the download of the upgrades and patches may be automated, whereby the software management system 1894 is authorized to, upon determining that a patch is applicable to a data intake and query system instance inside the self-managed network 1800, automatically communicate the upgrade or patch to self-managed network 1800 and cause it to be installed within self-managed network 1800.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above.

Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method, comprising:
obtaining a time-series data set;
performing a data regularity check on the time-series data set;
responsive to the data regularity check not satisfying a data regularity threshold, performing a data aggregation process to regularize the time-series data set;
dividing the time-series data set into a set of subsequences based on a first candidate seasonality pattern;
clustering the set of subsequences in accordance with the first candidate seasonality pattern;
determining a silhouette score measuring a quality of the clustering, wherein the silhouette score indicates how well the first candidate seasonality pattern fits the time-series data set;
establishing an anomaly band for the time-series data set based on the first candidate seasonality pattern when the silhouette score satisfies a threshold comparison; and
detecting one or more anomalies within the time-series data set that are outside of the anomaly band.

2. The method of claim 1, wherein the first candidate seasonality pattern is a set of parameters corresponding to values of data points comprising the time-series data set indicating an expected pattern of the values of the data points.

3. The method of claim 1, wherein the first candidate seasonality pattern defines a methodology for dividing the time-series data set based on one or more of time of day or day of week.

4. The method of claim 1, wherein computing the silhouette score for the first candidate seasonality pattern includes (i) computing a silhouette score for data points of the time-series data set, and (ii) determining a mean or a medium of the silhouette scores for the data points.

5. The method of claim 4, wherein computing the silhouette score for the first data point of the data points comprising the time-series data set includes:
determining, for each cluster, an average distance between the first data point and data points belonging to clusters to which the first data point does not belong,
dividing (a) a difference between (i) a minimum of the average distances between the first data point and the data points belonging to the clusters to which the first data point does not belong, and (ii) an average distance between the first data point and the other data points belonging to a cluster to which the first data point does belong, by (b) a maximum of (i) the minimum of the average distances between the first data point and the data points belonging to the clusters to which the first data point does not belong, and (ii) the average distance between the first data point and the other data points belonging to the cluster to which the first data point does belong.

6. The method of claim 1, wherein the anomaly band includes an upper threshold and a lower threshold relative to the time-series data set.

7. The method of claim 1, wherein the time-series data set includes machine generated data from within a networked environment and comprises a set of data points each associated with a timestamp.

8. A computing device, comprising:
a processor; and
a non-transitory computer-readable medium having stored thereon instructions that, when executed by the processor, cause the processor to perform operations including:
obtaining a time-series data set;
performing a data regularity check on the time-series data set;
responsive to the data regularity check not satisfying a data regularity threshold, performing a data aggregation process to regularize the time-series data set;
dividing the time-series data set into a set of subsequences based on a first candidate seasonality pattern;
clustering the set of subsequences in accordance with the first candidate seasonality pattern;
determining a silhouette score measuring a quality of the clustering, wherein the silhouette score indicates how well the first candidate seasonality pattern fits the time-series data set;
establishing an anomaly band for the time-series data set based on the first candidate seasonality pattern when the silhouette score satisfies a threshold comparison; and
detecting one or more anomalies within the time-series data set that are outside of the anomaly band.

9. The computing device of claim 8, wherein the first candidate seasonality pattern is a set of parameters corresponding to values of data points comprising the time-series data set indicating an expected pattern of the values of the data points.

10. The computing device of claim 8, wherein the first candidate seasonality pattern defines a methodology for dividing the time-series data set based on one or more of time of day or day of week.

11. The computing device of claim 8, wherein computing the silhouette score for the first candidate seasonality pattern includes (i) computing a silhouette score for data points of the time-series data set, and (ii) determining a mean or a medium of the silhouette scores for the data points.

12. The computing device of claim 11, and wherein computing a silhouette score for a first data point of the data points comprising the time-series data set includes:
determining, for each cluster, an average distance between the first data point and data points belonging to clusters to which the first data point does not belong,
dividing (a) a difference between (i) a minimum of the average distances between the first data point and the data points belonging to the clusters to which the first data point does not belong, and (ii) an average distance between the first data point and the other data points belonging to a cluster to which the first data point does belong, by (b) a maximum of (i) the minimum of the average distances between the first data point and the data points belonging to the clusters to which the first data point does not belong, and (ii) the average distance between the first data point and the other data points belonging to the cluster to which the first data point does belong.

13. The computing device of claim 8, wherein the anomaly band includes an upper threshold and a lower threshold relative to the time-series data set.

14. The computing device of claim 8, wherein the time-series data set includes machine generated data from within a networked environment and comprises a set of data points each associated with a timestamp.

15. A non-transitory computer-readable medium having stored thereon instructions that, when executed by one or more processors, cause the one or more processor to perform operations including:
obtaining a time-series data set;
performing a data regularity check on the time-series data set;
responsive to the data regularity check not satisfying a data regularity threshold, performing a data aggregation process to regularize the time-series data set;
dividing the time-series data set into a set of subsequences based on a first candidate seasonality pattern;
clustering the set of subsequences in accordance with the first candidate seasonality pattern;
determining a silhouette score measuring a quality of the clustering, wherein the silhouette score indicates how well the first candidate seasonality pattern fits the time-series data set;
establishing an anomaly band for the time-series data set based on the first candidate seasonality pattern when the silhouette score satisfies a threshold comparison; and
detecting one or more anomalies within the time-series data set that are outside of the anomaly band.

16. The non-transitory computer-readable medium of claim 15, wherein the first candidate seasonality pattern is a set of parameters corresponding to values of data points comprising the time-series data set indicating an expected pattern of the values of the data points.

17. The non-transitory computer-readable medium of claim 15, wherein the first candidate seasonality pattern defines a methodology for dividing the time-series data set based on one or more of time of day or day of week.

18. The non-transitory computer-readable medium of claim 15, wherein computing the silhouette score for the first candidate seasonality pattern includes (i) computing a silhouette score for data points of the time-series data set, and (ii) determining a mean or a medium of the silhouette scores for the data points; and
wherein computing the silhouette score for the first data point of the data points comprising the time-series data set includes:
determining, for each cluster, an average distance between the first data point and data points belonging to clusters to which the first data point does not belong,
dividing (a) a difference between (i) a minimum of the average distances between the first data point and the data points belonging to the clusters to which the first data point does not belong, and (ii) an average distance between the first data point and the other data points belonging to a cluster to which the first data point does belong, by (b) a maximum of (i) the minimum of the average distances between the first data point and the data points belonging to the clusters to which the first data point does not belong, and (ii) the average distance between the first data point and the other data points belonging to the cluster to which the first data point does belong.

19. The non-transitory computer-readable medium of claim 15, wherein the anomaly band includes an upper threshold and a lower threshold relative to the time-series data set.

20. The non-transitory computer-readable medium of claim 15, wherein the time-series data set includes machine generated data from within a networked environment and comprises a set of data points each associated with a timestamp.

\* \* \* \* \*